US010655032B2

(12) United States Patent
Umebayashi et al.

(10) Patent No.: US 10,655,032 B2
(45) Date of Patent: May 19, 2020

(54) INK JET RECORDING METHOD

(71) Applicant: FUJIFILM CORPORATION, Minato-ku, Tokyo (JP)

(72) Inventors: Tsutomu Umebayashi, Kanagawa (JP); Ichiro Koyama, Kanagawa (JP); Shota Suzuki, Kanagawa (JP); Noriaki Sato, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 16/164,694

(22) Filed: Oct. 18, 2018

(65) Prior Publication Data
US 2019/0048218 A1 Feb. 14, 2019

Related U.S. Application Data

(63) Continuation of application No. PCT/JP2017/014551, filed on Apr. 7, 2017.

(30) Foreign Application Priority Data

Apr. 25, 2016 (JP) .................. 2016-087064

(51) Int. Cl.
  *C09D 11/40* (2014.01)
  *C09D 11/322* (2014.01)
  (Continued)

(52) U.S. Cl.
  CPC ............ *C09D 11/40* (2013.01); *B41J 11/002* (2013.01); *B41M 5/0023* (2013.01);
  (Continued)

(58) Field of Classification Search
  CPC ..... C09D 11/40; C09D 11/033; C09D 11/037; C09D 11/101; C09D 11/324; C09D 11/38;
  (Continued)

(56) References Cited

U.S. PATENT DOCUMENTS

2006/0170745 A1* 8/2006 Deroover ............ C09D 11/101
                                                           347/100
2010/0112219 A1   5/2010 Yokohama et al.
(Continued)

FOREIGN PATENT DOCUMENTS

JP   2010-106141 A   5/2010
JP   2011-190406 A   9/2011
(Continued)

OTHER PUBLICATIONS

Extended European Search Report dated Mar. 13, 2019, issued in corresponding EP Patent Application No. 17789229.6.
(Continued)

*Primary Examiner* — Yaovi M Ameh
(74) *Attorney, Agent, or Firm* — Solaris Intellectual Property Group, PLLC

(57) ABSTRACT

Provided is an ink jet recording method, including a step of jetting, on a substrate, an ink composition A that contains a microcapsule having at least a polymerizable compound within the microcapsule, a high boiling solvent, water, and a colorant, and an ink composition B that contains a microcapsule having at least a polymerizable compound within the microcapsule, a high boiling solvent, water, and carbon black; and a step of heating the ink composition A and the ink composition B which have been jetted on the substrate, in which absorbance $ABS_A$ of the ink composition A and absorbance $ABS_B$ of the ink composition B satisfy Formula (1), and a concentration $M_A$ of the high boiling solvent contained in the ink composition A and a concentration $M_B$ of the high boiling solvent in the ink composition B satisfy Formula (2).

$ABS_A < ABS_B$   Formula (1)

$M_A < M_B$   Formula (2)

14 Claims, 2 Drawing Sheets

(51) Int. Cl.
  B41M 7/00      (2006.01)
  B41J 11/00     (2006.01)
  B41M 5/00      (2006.01)
  C09D 11/033    (2014.01)
  C09D 11/037    (2014.01)
  C09D 11/101    (2014.01)
  C09D 11/324    (2014.01)
  C09D 11/38     (2014.01)

(52) U.S. Cl.
  CPC ........... *B41M 7/009* (2013.01); *C09D 11/033* (2013.01); *C09D 11/037* (2013.01); *C09D 11/101* (2013.01); *C09D 11/322* (2013.01); *C09D 11/324* (2013.01); *C09D 11/38* (2013.01)

(58) Field of Classification Search
  CPC ... C09D 11/322; B41M 7/009; B41M 5/0023; B41J 11/002
  See application file for complete search history.

(56) References Cited

U.S. PATENT DOCUMENTS

2014/0002556 A1    1/2014   Sato et al.
2015/0315397 A1*   11/2015  Toyoda .................. B41J 2/21
                                                    347/37
2017/0022379 A1    1/2017   Loccufier et al.

FOREIGN PATENT DOCUMENTS

| JP | 2014-5421 A | 1/2014 |
| JP | 2014-34113 A | 2/2014 |
| JP | 2014-111374 A | 6/2014 |
| JP | 2015-193144 A | 11/2015 |
| WO | 2015/158748 A1 | 10/2015 |
| WO | WO-2015158748 A1 * | 10/2015 ............ B01J 13/06 |

OTHER PUBLICATIONS

English language translation of the following: Office action dated Apr. 16, 2019 from the JPO in a Japanese patent application No. 2018-514237 corresponding to the instant patent application.
International Search Report issued in International Application No. PCT/JP2017/014551 dated Jun. 27, 2017.
Written Opinion of the ISA issued in International Application No. PCT/JP2017/014551 dated Jun. 27, 2017.
English language translation of the following: Office action dated Nov. 27, 2019 from the SIPO in a Chinese patent application No. 201780025411.8 corresponding to the instant patent application.

* cited by examiner

INK JET RECORDING METHOD

CROSS-REFERENCE TO RELATED APPLICATIONS

This application is a continuation application of International Application No. PCT/JP2017/014551, filed Apr. 7, 2017, the disclosure of which is incorporated herein by reference in its entirety. Further, this application claims priority from Japanese Patent Application No. 2016-087064, filed Apr. 25, 2016, the disclosure of which is incorporated herein by reference in its entirety.

BACKGROUND OF THE INVENTION

1. Field of the Invention

The present invention relates to an ink jet recording method.

2. Description of the Related Art

As methods for recording an image on a substrate, there are an electrophotographic method, a sublimation-type thermal transfer method, a fusion-type thermal transfer method, an ink jet method, and the like. The ink jet recording method has advantages such as being able to be performed with an inexpensive device and incurring low running costs because ink can be efficiently used.

As one of the ink jet recording methods, there is an ink jet recording method in which, after ink jetted on a substrate is heated by being irradiated with infrared rays, an ink jet ink that can be cured by being irradiated with active energy rays such as ultraviolet rays is used.

As examples of the ink jet recording method, there has been proposed an ink jet recording method including a step of jetting an ink jet ink that contains water, a photopolymerization initiator, and a capsule in which a surround of a core is covered with a polymer shell, in which the shell of the capsule has a crosslinked structure, and the core contains at least one chemically reactive compound that is irradiated with ultraviolet rays so as to form a reaction product; a step of heating the ink jet ink jetted on a substrate by irradiation with infrared rays; and a step of curing the ink by irradiation with ultraviolet rays (UV) (for example, refer to WO2015/158748A).

In addition, as another ink jet recording method, there has been proposed an image recording method including a step of applying an ink that contains a pigment, a resin fine particle, and a water-soluble and volatile solvent with a high boiling point, to a recording medium, and a step of heating the recording medium to a temperature equal to or higher than a lowest temperature at which the resin fine particle forms a film (for example, refer to JP2014-34113A).

SUMMARY OF THE INVENTION

In the aqueous ink composition which can be cured by irradiation with active energy rays, depending on a difference in colors and types of a colorant contained in the ink composition, absorbance at wavelengths of 800 nm to 1400 nm of the ink composition is different, and therefore an evaporation rate of water in the ink composition is different in a heating step performed before a step of irradiating the active energy rays.

In a case of using a single color ink as in WO2015/158748A, an interaction between colors does not affect images, but in a case where ink compositions of two or more colors, in which the evaporation rate of water is different, are applied to the same substrate so as to be heated, there is a case where one of the ink compositions is fixed on the substrate first and the other ink composition fixed later. In particular, in a case where aqueous ink compositions which contain a capsule as described in WO2015/158748A are used in combination of two or more colors, a difference occurs in the evaporation rate of water in the ink compositions due to color tone of the ink composition. In a case where the ink composition is fixed on the substrate, in the ink composition to be fixed later, there is a tendency that a change in shape of liquid droplets is likely to be caused, and color bleeding is likely to be generated. The color bleeding refers to a phenomenon in which a desired color cannot be obtained because adjacent ink compositions of two colors are mixed with each other.

In addition, in the case where the aqueous ink compositions which contain the capsule as described in WO2015/158748A are used as the ink compositions of two or more colors, in particular, in a case where a combination of black ink containing carbon black which easily generates heat by absorbing heat and ink of another color is used, there is a case where a temperature of the ink composition of the black ink is excessively increased by heating, and thus microcapsules are destroyed. In the case where the microcapsules contained in the ink composition are destroyed, an amount of the microcapsules contributing to fixation of the ink composition decreases, making it difficult for the ink composition to be fixed on the substrate. In addition, in the ink composition containing the destroyed microcapsules, the shape of the liquid droplets is likely to be changed on the substrate compared to the ink composition containing undestroyed microcapsules, and therefore, in a case where the black ink and the other color ink are applied on the same substrate, there is a tendency that the liquid droplets of the black ink easily spread out and the color bleeding is easily generated.

On the other hand, as a method for recording an image by heating the ink composition, for example, an image recording method described in JP2014-34113A has been known. In the image recording method described in JP2014-34113A, resin fine particles contained in ink are heated to a temperature equal to or higher than a lowest temperature at which a film is formed so as to form the film, and therefore an image is recorded. In a case of using this method for an ink composition containing microcapsules, a temperature of the ink composition becomes excessively high due to heating, and the microcapsules are destroyed in some cases. In the ink composition containing the destroyed microcapsules, the shape of the liquid droplets is likely to be changed on the substrate compared to the ink composition containing the undestroyed microcapsules, and therefore, in a case where the black ink containing carbon black which easily generates heat by absorbing heat and another color ink are applied on the same substrate, there is a tendency that the liquid droplets of the black ink easily spread out and the color bleeding is easily generated.

In view of the above circumstances, in one embodiment of the present invention, there is provided an ink jet recording method by which generation of color bleeding in an image is suppressed in a case where a polychromic image is recorded using a plurality of types of aqueous ink compositions.

An embodiment of the present invention includes the following aspects.

<1> An ink jet recording method, comprising a step of jetting, on a substrate, an ink composition A that contains a microcapsule having at least a polymerizable compound within the microcapsule, a high boiling solvent, water, and a colorant, and an ink composition B that contains a microcapsule having at least a polymerizable compound within the microcapsule, a high boiling solvent, water, and carbon black; and a step of heating the ink composition A and the ink composition B which have been jetted on the substrate, in which absorbance $ABS_A$ of the ink composition A and absorbance $ABS_B$ of the ink composition B satisfy Formula (1), and a concentration $M_A$ of the high boiling solvent contained in the ink composition A and a concentration $M_B$ of the high boiling solvent in the ink composition B satisfy Formula (2).

$$ABS_A < ABS_B \quad \text{Formula (1)}$$

$$M_A < M_B \quad \text{Formula (2)}$$

In Formula (1), $ABS_A$ and $ABS_B$ respectively represent an average value of the absorbance of each of the ink composition A and the ink composition B in wavelengths of 800 nm to 1400 nm.

In Formula (2), $M_A$ or $M_B$ represents the concentration of the high boiling solvent contained in the ink composition A or the ink composition B with respect to a total mass of each ink composition on a mass basis.

<2> The ink jet recording method according to <1>, in which, in the heating step, the ink composition A and the ink composition B are heated by irradiation with infrared rays.

<3> The ink jet recording method according to <1> or <2>, in which the $ABS_A$, the $ABS_B$, the $M_A$, and the $M_B$ satisfy Formula (3).

$$\{1+0.01\times(ABS_B/ABS_A)\}\times M_A < M_B < \{1+0.04\times(ABS_B/ABS_A)\}\times M_A \quad \text{Formula (3)}$$

<4> The ink jet recording method according to any one of <1> to <3>, in which the $ABS_A$, the $ABS_B$, the $M_A$, and the $M_B$ satisfy Formula (4).

$$\{1+0.015\times(ABS_B/ABS_A)\}\times M_A < M_B < \{1+0.03\times(ABS_B/ABS_A)\}\times M_A \quad \text{Formula (4)}$$

<5> The ink jet recording method according to any one of <1> to <4>, in which the $M_A$ is 5% by mass to 12% by mass with respect to the total mass of the ink composition A, and the $M_B$ is 7% by mass to 15% by mass with respect to the total mass of the ink composition B.

<6> The ink jet recording method according to any one of <1> to <5>, in which, in the heating step, the ink composition A and the ink composition B are heated under the same conditions.

<7> The ink jet recording method according to any one of <1> to <6>, in which the ink composition A contains 4.0% by mass to 6.0% by mass of a quinacridone-based pigment with respect the total mass of the ink composition A as the colorant, and the ink composition B contains 1.5% by mass to 2.5% by mass of the carbon black with respect to the total mass of the ink composition B.

<8> The ink jet recording method according to any one of <1> to <6>, in which the ink composition A contains 1.7% by mass to 3.1% by mass of a copper phthalocyanine-based pigment with respect the total mass of the ink composition A as the colorant, and the ink composition B contains 1.5% by mass to 2.5% by mass of the carbon black with respect to the total mass of the ink composition B.

<9> The ink jet recording method according to any one of <1> to <6>, in which the ink composition A contains 3.0% by mass to 4.4% by mass of a monoazo-based pigment with respect the total mass of the ink composition A as the colorant, and the ink composition B contains 1.5% by mass to 2.5% by mass of the carbon black with respect to the total mass of the ink composition B.

<10> The ink jet recording method according to any one of <1> to <9>, in which any of the high boiling solvents contained in the ink composition A and the ink composition B is a water-soluble solvent with a boiling point of 180° C. to 280° C.

<11> The ink jet recording method according to any one of <1> to <10>, in which the microcapsules contained in the ink composition A and the ink composition B contain a photopolymerization initiator within each of the microcapsules.

<12> The ink jet recording method according to any one of <1> to <11>, further comprising a step of light irradiating the ink composition A and the ink composition B which have been heated in the heating step.

<13> The ink jet recording method according to any one of <1> to <12>, in which the ink composition A contains an ink composition A1 that contains the microcapsule having at least the polymerizable compound within the microcapsule, the high boiling solvent, water, and a copper phthalocyanine-based pigment, an ink composition A2 that contains the microcapsule having at least the polymerizable compound within the microcapsule, the high boiling solvent, water, and a quinacridone-based pigment, and an ink composition A3 that contains the microcapsule having at least the polymerizable compound within the microcapsule, the high boiling solvent, water, and a monoazo-based pigment, in the jetting step, the ink composition A1, the ink composition A2, the ink composition A3, and the ink composition B are jetted on the substrate, in the heating step, the ink composition A1, the ink composition A2, the ink composition A3, and the ink composition B, which have been jetted on the substrate, are heated, and absorbance $ABS_{A1}$ of the ink composition A1, absorbance $ABS_{A2}$ of the ink composition A2, absorbance $ABS_{A3}$ of the ink composition A3, and the absorbance $ABS_B$ of the ink composition B satisfy Formula (5), Formula (6), and Formula (7), and a concentration $M_{A1}$ of the high boiling solvent contained in the ink composition A1, a concentration $M_{A2}$ of the high boiling solvent contained in the ink composition A2, a concentration $M_{A3}$ of the high boiling solvent contained in the ink composition A3, and the concentration $M_B$ of the high boiling solvent contained in the ink composition B satisfy Formula (8), Formula (9), and Formula.

$$ABS_{A1} < ABS_B \quad \text{Formula (5)}$$

$$ABS_{A2} < ABS_B \quad \text{Formula (6)}$$

$$ABS_{A3} < ABS_B \quad \text{Formula (7)}$$

$$M_{A1} < M_B \quad \text{Formula (8)}$$

$$M_{A2} < M_B \quad \text{Formula(9)}$$

$$M_{A3} < M_B \quad \text{Formula (10)}$$

In Formula (5), Formula (6), and Formula (7), $ABS_{A1}$, $ABS_{A2}$, $ABS_{A3}$, and $ABS_B$ respectively represent an average value of the absorbance of each of the ink composition A1, the ink composition A2, the ink composition A3, and the ink composition B in wavelengths of 800 nm to 1400 nm.

In Formula (8), Formula (9), and Formula (10), $M_{A1}$, $M_{A2}$, $M_{A3}$, or $M_B$ represents the concentration of the high boiling solvent contained in the ink composition A1, the ink composition A2, the ink composition A3, or the ink composition B with respect to a total mass of each ink composition on the mass basis.

According to one embodiment of the present invention, there is provided the ink jet recording method by which generation of color bleeding in an image is suppressed in a case where a polychromic image is recorded using a plurality of types of aqueous ink compositions.

DESCRIPTION OF THE PREFERRED EMBODIMENTS

Figure 1:
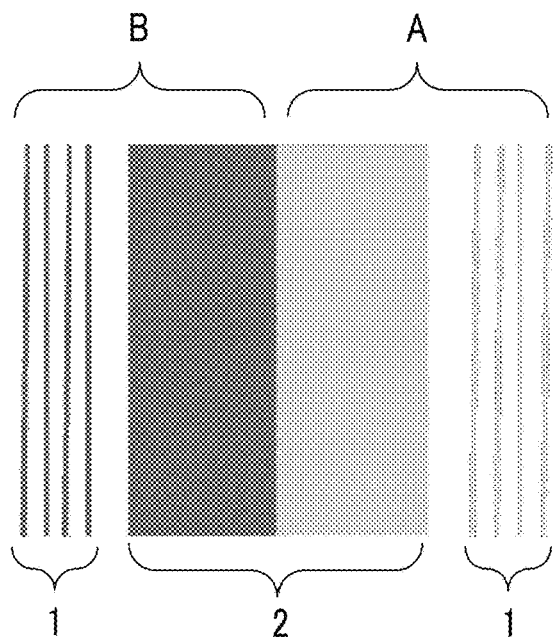
FIG. 1 is a view showing an image of a sample for evaluation in examples.

Hereinafter, specific embodiments of the present disclosure will be described in detail, but the present disclosure is not limited to the following embodiments. The embodiments can be carried out with appropriate modification within the scope of the object of the present disclosure.

In the present specification, a range of numerical values described using "to" means a range including the numerical values listed before and after "to" as a minimum value and a maximum value.

In the numerical value ranges described in a stepwise manner in the present specification, an upper limit value or a lower limit value described in a certain numerical value range may be replaced with an upper limit value or a lower limit value of the numerical value range of other stepwise description. In addition, in the numerical value ranges described in the present specification, an upper limit value or a lower limit value described in a certain numerical value range may be replaced with values shown indicated in examples.

In the present specification, in a case where there are a plurality of substances corresponding to each component in a composition, unless otherwise specified, the amount of each component in the composition means the total amount of the plurality of substances present in the composition.

In the present specification, the term "step" means not only an independent step, but also a step that cannot be clearly distinguished from other steps as long as the intended goal of the step is accomplished.

In the present specification, conceptually, "light" includes active energy rays such as γ-rays, β-rays, electron beams, ultraviolet rays, and visible rays.

In the present specification, the ultraviolet rays are referred to as "Ultra Violet (UV) light" in some cases.

In the present specification, the infrared rays are referred to as "infrared (IR) light" in some cases.

In the present specification, the light emitted from a Light Emitting Diode (LED) light source is referred to as "LED light" in some cases.

In the present specification, "(meth)acrylic acid" conceptually includes both the acrylic acid and the methacrylic acid, "(meth)acrylate" conceptually includes both the acrylate and the methacrylate, and "(meth)acryloyl group" conceptually includes both the acryloyl group and the methacryloyl group.

<<Ink Jet Recording Method>>

An ink jet recording method includes a step of jetting, on a substrate, an ink composition A that contains a microcapsule having at least a polymerizable compound within the microcapsule, a high boiling solvent, water, and a colorant, and an ink composition B that contains a microcapsule having at least a polymerizable compound within the microcapsule, a high boiling solvent, water, and carbon black; and a step of heating the ink composition A and the ink composition B which have been jetted on the substrate, in which absorbance $ABS_A$ of the ink composition A and absorbance $ABS_B$ of the ink composition B satisfy Formula (1), and a concentration $M_A$ of the high boiling solvent contained in the ink composition A and a concentration $M_B$ of the high boiling solvent in the ink composition B satisfy Formula (2).

$$ABS_A < ABS_B \quad \text{Formula (1)}$$

$$M_A < M_B \quad \text{Formula (2)}$$

In Formula (1), $ABS_A$ and $ABS_B$ respectively represent an average value of the absorbance of each of the ink composition A and the ink composition B in wavelengths of 800 nm to 1400 nm.

In Formula (2), $M_A$ or $M_B$ represents the concentration of the high boiling solvent contained in the ink composition A or the ink composition B with respect to a total mass of each ink composition on a mass basis.

Details of the action mechanism in the present disclosure are not clear, but it is presumed as follows.

In the aqueous ink composition which can be cured by irradiation with active energy rays, there is a case where, depending on a difference in colors and types of the colorant contained in the ink composition, absorbance at wavelengths of 800 nm to 1400 nm of the ink composition is different, and an evaporation rate of water in the ink is different in a heating step performed before a step of irradiating the active energy rays. In particular, in a case where aqueous ink compositions which contain a capsule as described in WO2015/158748A are used in combination of two or more colors, a difference occurs in the evaporation rate of water in the ink compositions due to color tone of the ink composition. In a case where ink compositions of two or more colors, in which the evaporation rate of water is different, are applied on the same substrate so as to be heated, one of the ink compositions is fixed to the substrate first and the other ink composition fixed later, and therefore the color bleeding is likely to be generated in a case where the polychromic image is recorded. In addition, in the case where two or more colors of the aqueous ink compositions which contains the capsule as described in WO2015/158748A are combined, in a case where the combination of the ink compositions are a combination of black ink containing carbon black which easily generates heat by absorbing heat and ink of another color, the liquid droplets of the black ink easily spread out and the color bleeding is easily generated.

In the ink described in JP2014-34113A, resin fine particles are heated so as to form a film, and thus an image is recorded, but in a case where the same method is used in an ink composition containing microcapsules, the microcapsules are destroyed, and therefore the ink composition becomes unlikely to be fixed on the substrate. The destruction of the microcapsules by heating is particularly likely to occur in the black ink containing the carbon black which easily generates heat by absorbing heat. Therefore, in a case where the black ink and inks of other colors are applied on the same substrate, the liquid droplets of the black ink easily spread out and the color bleeding is easily generated.

In the ink jet recording method of the present disclosure, heating is performed after jetting, on a substrate, an ink composition A that contains a microcapsule, a high boiling solvent, water, and a colorant, and an ink composition B that contains a microcapsule, a high boiling solvent, water, and carbon black. Accordingly, water contained in the ink composition A and the ink composition B evaporates, and thus the concentration of the high boiling solvent is increased, and therefore the zeta potential of all of the ink composition A and the ink composition B is lowered, charge repulsion of the microcapsules dispersed by charge repulsion on a surface becomes weak, and thus the microcapsules aggregate. As a result, since the ink composition A and the ink composition B are thickened, the ink composition A and the ink composition B are fixed to the substrate.

In this case, since the absorbance of the ink composition A and the ink composition B and the concentration of the high boiling solvent satisfy Formula (1) and Formula (2), in the ink composition B which contains the carbon black and in which the destruction of the microcapsules due to heating is likely to occur, the microcapsules can aggregate before the destruction of the microcapsules occur. Therefore, it is possible to fix the ink composition B while suppressing a change in shape of the liquid droplet in the substrate of the ink composition B. As a result, it is considered that, by the ink jet recording method of the present disclosure, an image in which occurrence of the color bleeding is suppressed is recorded.

<Jetting Step>

The ink jet recording method includes a step of jetting, on a substrate, an ink composition A that contains a microcapsule having at least a polymerizable compound within the microcapsule, a high boiling solvent, water, and a colorant, and an ink composition B that contains a microcapsule having at least a polymerizable compound within the microcapsule, a high boiling solvent, water, and carbon black.

The high boiling solvent, water, and the colorant may be contained in the microcapsule, and may be contained in the ink composition, without being contained within the microcapsule. In addition, in a case where the ink composition further contains a sensitizer or other additives, the sensitizer or the other components may be contained within the microcapsule, and may be contained in the ink composition, without being contained within the microcapsule.

The ink jet recording method can form a desired image on a substrate by jetting the ink composition A and the ink composition B on the substrate.

Between the ink composition A and the ink composition B used in the ink jet recording method of the present disclosure, the absorbance and the concentration of the high boiling solvent satisfy relationships of Formula (1) and Formula (2).

The absorbance $ABS_A$ and the absorbance $ABS_B$ of the ink composition A and the ink composition B satisfy Formula (1), and the concentration $M_A$ and the concentration $M_B$ of the high boiling solvents satisfy Formula (2), and therefore the ink composition can be fixed on the substrate while suppressing destruction of the microcapsules by heating in the ink composition A and the ink composition B. Particularly, the microcapsules can aggregate before the destruction of the microcapsules by heating in the ink composition B occurs. As a result, color bleeding can be suppressed.

The absorbance $ABS_A$ of the ink composition A and the absorbance $ABS_B$ of the ink composition B satisfy Formula (1).

$$ABS_A < ABS_B \qquad \text{Formula (1)}$$

In Formula (1), $ABS_A$ and $ABS_B$ respectively represent an average value of the absorbance of each of the ink composition A and the ink composition B in wavelengths of 800 nm to 1400 nm.

The absorbance in wavelengths of 800 nm to 1400 nm can be measured by a method to be described later.

The absorbance is measured by preparing a diluted solution obtained by diluting the ink composition of a measurement target with ultrapure water by 1000 times by mass, placing the diluted solution into a quartz cell having an optical path length of 0.2 mm, and adding the ultrapure water in a control cell. The measurement is carried out under the following conditions using a spectrophotometer (for example, V-7200 by JASCO Corporation).

—Condition—

Measurement wavelength: 800 nm to 1400 nm

Measurement interval: every 1 nm

An average value of the absorbance at wavelengths of 800 nm to 1400 nm measured as above is calculated by using Mathematical Formula (A).

$$ABS(800\text{-}140) = \frac{\sum_{\lambda=800}^{601} ABS(\lambda)}{601} \qquad \text{Formula (A)}$$

The condition in which the absorbance $ABS_A$ of the ink composition A and the absorbance $ABS_B$ of the ink composition B satisfy Formula (1) (that is, the absorbance of ink composition A is smaller than that of the ink composition B) indicates that, in a case where infrared rays of the same light amount (light having wavelengths of 800 nm to 1400 nm) are injected into the ink composition A and the ink composition B, a temperature of the composition is unlikely to be increased on the ink composition A side, and a temperature of the composition is likely to be increased on the ink composition B side.

In the ink composition A and the ink composition B in the present disclosure, a value of the absorbance generally depends on the types and contents of the colorant or the carbon black contained in the ink composition.

The concentration $M_A$ of the high boiling solvent in the ink composition A and the concentration $M_B$ of the high boiling solvent in the ink composition B satisfy Formula (2).

$$M_A < M_B \qquad \text{Formula (2)}$$

In Formula (2), $M_A$ or $M_B$ represents the concentration of the high boiling solvent contained in the ink composition A or the ink composition B with respect to a total mass of each ink composition on a mass basis.

The $M_A$ or the $M_B$ satisfies Formula (2), and therefore the zeta potential of the ink composition is likely to be lowered in the ink composition B side compared to the ink composition A in a case where the ink composition A and the ink composition are heated, and thus the microcapsules tend to aggregate easily. As a result, the microcapsules can aggregate before the destruction of the microcapsules in the ink composition B occurs, and therefore the color bleeding can be suppressed.

The $M_A$ in the ink composition A is preferably 1% by mass to 30% by mass with respect to a total mass of the ink composition A. In a case where the $M_A$ is 1% by mass or more, the jetting properties of the ink composition A are improved, and an image in which the color bleeding is further suppressed can be obtained. Whereas, in a case where the $M_A$ is 30% by mass or less, the ink composition A has further excellent film hardness, and an image in which granularity is excellent can be obtained. In addition, the same applies to the $M_B$ in the ink composition B.

The term "granularity" in the present specification means a state of spreading of liquid droplets of the ink composition in the formed image, and the phrase "granularity is excellent" refers to a state in which liquid droplet droplets of the ink composition in the image are spread in a desired size, and thus it is difficult to see a color of the substrate and there is no missing in the image.

The $M_A$ of the ink composition A is preferably 1% by mass to 20% by mass, more preferably 3% by mass to 18% by mass, and even more preferably 5% by mass to 12% by mass with respect to the total mass of the ink composition A, from the viewpoints of the film hardness, the jetting properties, the color bleeding, and the granularity.

The $M_B$ of the ink composition B is preferably 3% by mass to 25% by mass, more preferably 5% by mass to 20% by mass, even more preferably 7% by mass to 15% by mass, and particularly preferably 9% by mass to 16% by mass with respect to the total mass of the ink composition B, from the same viewpoints described above.

As a combination of the $M_A$ and the $M_B$, it is preferable that the $M_A$ is 5% by mass to 12% by mass with respect to the total mass of the ink composition A, and the $M_B$ is 7% by mass to 15% by mass with respect to the total mass of the ink composition B.

In the case of the above-describe combination of the $M_A$ and the $M_B$, in an image formed by the ink composition A and the ink composition B, the granularity is excellent, and the color bleeding is further suppressed.

The ink composition A and the ink composition B contain water, the high boiling solvents, and the microcapsules, water is evaporated by the heating step, the concentration of the high boiling solvent in the ink composition is increased, and thus the microcapsules aggregate, and the ink composition is fixed on the substrate. That is, as the concentrations of the high boiling solvents in the ink composition A and the ink composition B become high, the aggregation of the microcapsule is likely to occur, and therefore the fixation of the ink composition easily proceeds.

The $ABS_A$, the $ABS_B$, the $M_A$, and the $M_B$ in the ink composition A and the ink composition B preferably satisfy Formula (3).

$$(1+0.01\times(ABS_B/ABS_A))\times M_A < M_B < (1+0.04\times(ABS_B/ABS_A))\times M_A \quad \text{Formula (3)}$$

Formula (3) is a formula that expresses a preferable concentration of the high boiling solvents in the ink composition A having the absorbance $ABS_A$ and the ink composition B having the absorbance $ABS_B$ using the $M_A$ and the $M_B$, in which, in a case where the $M_B$ exceeds $(1+0.01\times(ABS_B/ABS_A))\times M_A$, the color bleeding is further suppressed. On the other hand, in a case where the $M_B$ is less than $(1+0.04\times(ABS_B/ABS_A))\times M_A$, the granularity is more improved. In addition, abrasion resistance of the formed image is also improved.

Coefficients indicated as "0.01" and "0.04" are empirically derived values through experiments.

Form the same viewpoints, the $ABS_A$, the $ABS_B$, the $M_A$, and the $M_B$ of the ink composition A and the ink composition B more preferably satisfy Formula (4). Formula (4) is a formula that expresses a particularly preferable concentration of the high boiling solvents in the ink composition A having the absorbance $ABS_A$ and the ink composition B having the absorbance $ABS_B$ using the $M_A$ and the $M_B$.

$$(1+0.015\times(ABS_B/ABS_A))\times M_A < M_B < (1+0.03\times(ABS_B/ABS_A))\times M_A \quad \text{Formula (4)}$$

Coefficients indicated as "0.015" and "0.03" are empirically derived values through experiments.

In a case where Formula (4) is satisfied, Formula (3) and Formula (2) are also satisfied, and in a case where Formula (3) is satisfied, Formula (2) is also satisfied.

Hereinafter, each component contained in the ink composition A and the ink composition B will be described in detail. The ink composition A and the ink composition B are collectively referred to as "ink composition".

[Ink Composition]

The ink composition A contains the microcapsule that contains at least the polymerizable compound within the microcapsule, the high boiling solvent, water, and the colorant.

The ink composition B contains the microcapsule that contains at least the polymerizable compound within the microcapsule, the high boiling solvent, water, and the carbon black.

The ink composition A and the ink composition B satisfy Formula (1) and Formula (2).

The component to be commonly contained in the ink composition A and the ink composition B may the same as or different from each other, and other components such as a sensitizer can be contained in addition to the above-described component.

In the ink jet recording method of the present disclosure, two kinds of the ink compositions may be used, or three or more kinds of the ink compositions may be used.

In the case where the two kinds of the ink compositions are used, two kinds of the ink compositions satisfying the relationship of the ink composition A and the ink composition B are used.

In the case where the three or more kinds of the ink compositions are used, in a case where any two kinds of the ink compositions are selected, it is enough that a relationship in which one of which is the ink composition A and the other is the ink composition B satisfies at least two kinds of the ink compositions among the three or more kinds of the ink compositions. In the case where the three or more kinds of the ink compositions are used, in the case where any two kinds of the ink compositions are selected, it is preferable that, in the relationship in which one of which is the ink composition A and the other is the ink composition B, the three or more kinds of the ink compositions satisfied in all ink compositions are used.

(Colorant)

The ink composition A contains at least one colorant.

The colorant in the ink composition A is preferably contained in the exterior of the microcapsule.

The colorant is not particularly limited and can be used by being arbitrarily selected from known coloring materials such as a pigment, a water-soluble dye, and a dispersed dye. It is more preferable that the aqueous dispersion contains a pigment among the above colorants, because the pigment has high weather fastness and excellent color reproducibility.

The pigment is not particularly limited and can be appropriately selected according to the purpose. Examples thereof include known organic pigments and inorganic pigments, resin particles stained with a dye, commercially available pigment dispersions, and surface-treated pigments (for example, those obtained by dispersing a pigment in water, a liquid compound, an insoluble resin, or the like as a dispersion medium and pigments of which the surface is treated with a resin, a pigment derivative, or the like).

Examples of the organic pigments and inorganic pigments include a yellow pigment, a red pigment, a magenta pigment, a blue pigment, a cyan pigment, a green pigment, an orange pigment, a purple pigment, a brown pigment, a black pigment, a white pigment, and the like.

In a case where a pigment is used as a colorant, if necessary, a pigment dispersant may be used at the time of preparing the pigment particles.

Regarding the coloring material such as a pigment and the pigment dispersant, paragraphs "0180" to "0200" in JP2014-040529A can be referred to as appropriate.

The absorbance $ABS_A$ of the ink composition A is determined by types and contents of the colorant.

As the colorant in the ink composition A, a yellow pigment, a magenta pigment, and a cyan pigment are preferable, and a quinacridone-based pigment, a copper phthalocyanine-based pigment, a monoazo pigment, and a disazo pigment are more preferable.

In the case where the colorant of the ink composition A is the pigment described above, it is easy to adjust the absorbance $ABS_A$.

Examples of the quinacridone-based pigment include C.I. Pigment Red 122, 202 (including a mixture with C.I. Pigment Violet 19), 207, 209, and the like.

Examples of the copper phthalocyanine-based pigment include C.I. Pigment Blue 15, 15:1, 15:2, 15:3, 15:4, 15:6, 16, 17:1, 75, and the like.

Examples of the monoazo pigment include C.I. Pigment Yellow 1, 2, 3, 4, 5, 10, 65, 73, 74, 75, 97, 98, 111, 116, 130, 167, 205, and the like.

Examples of the disazo pigment include C.I. Pigment Yellow 2, 13, 14, 16, 17, 55, 63, 77, 81, 83, 106, 124, 126, 127, 152, 155, 170, 172, 174, 176, 214, 219, and the like.

(Carbon Black)

The ink composition B contains at least one carbon black.

The carbon black in the ink composition B is preferably contained in the exterior of the microcapsule.

The carbon black is not particularly limited, and any known carbon black can be selected and used.

The absorbance $ABS_b$ of the ink composition B is determined by types and contents of the carbon black.

Examples of the carbon black include carbon black produced by a known method such as a contact method, a furnace method, and a thermal method.

Examples of a commercially available product of the carbon black include Raven 7000, Raven 5750, Raven 5250, Raven 500 ULTRA II, Raven 3500, Raven 2000, Raven 1500, Raven 1250, Raven 1200, Raven 1190 ULTRA II, Raven 1170, Raven 1255, Raven 1080, Raven 1060, Raven 700, and the like (hereinbefore, all "Raven" are registered trademarks, manufactured by Columbian Carbon Corporation), Regal 400R, Regal 330R, Regal 660R, Mogul L, Black Pearls L, Monarch 700, Monarch 800, Monarch 880, Monarch 900, Monarch 1000, Monarch 1100, Monarch 1300, Monarch 1400, and the like (hereinbefore, all "Monarch" are registered trademarks, manufactured by Cabot Corporation), Color Black FW1, Color Black FW2, Color Black FW2V, Color Black 18, Color Black FW182, Color Black FW200, Color Black S150, Color Black S160, Color Black S170, Printex 35, Printex U, Printex V, Printex 140U, Printex 140V, Special Black 6, Special Black 5, Special Black 4A, Special Black 4, and the like (hereinbefore, manufactured by Orion Engineered Carbons Co., Ltd.), No. 25, No. 33, No. 40, No. 45, No. 47, No. 52, No. 900, No. 2200B, No. 2300, MCF-88, MA600, MA7, MA8, MA100, and the like (hereinbefore, manufactured by Mitsubishi Chemical Corporation), and the like.

A content of the colorant in the ink composition A, and a content of the carbon black in the ink composition B can be appropriately selected, but is preferably 0.1% by mass to 30% by mass, more preferably 0.5% by mass to 20% by mass, and even more preferably 1.0% by mass to 10% by mass with respect to a total mass of each ink composition.

The content of the carbon black in the ink composition B is particularly preferably 1.5% by mass to 2.5% by mass with respect to the total mass of the ink composition B, from viewpoints of the color bleeding and the granularity.

In a case where the ink composition A contains the quinacridone-based pigment as the colorant, it is more preferable that the ink composition contains 4.0% by mass to 6.0% by mass of the quinacridone-based pigment with respect to the total mass of the ink composition A, and the ink composition B contains 1.5% by mass to 3.0% by mass of the carbon black with respect to the total mass of the ink composition B, and it is even more preferable that the ink composition A contains 4.0% by mass to 6.0% by mass of the quinacridone-based pigment with respect to the total mass of the ink composition A, and the ink composition B contains 1.5% by mass to 2.5% by mass of the carbon black with respect to the total mass of the ink composition B.

In a case where the ink composition A contains the copper phthalocyanine-based pigment as the colorant, it is more preferable that the ink composition contains 1.7% by mass to 3.1% by mass of the copper phthalocyanine-based pigment with respect to the total mass of the ink composition A, and the ink composition B contains 1.5% by mass to 3.0% by mass of the carbon black with respect to the total mass of the ink composition B, and it is even more preferable that the ink composition A contains 1.7% by mass to 3.1% by mass of the copper phthalocyanine-based pigment with respect to the total mass of the ink composition A, and the ink composition B contains 1.5% by mass to 2.5% by mass of the carbon black with respect to the total mass of the ink composition B.

In a case where the ink composition A contains the monoazo pigment as the colorant, it is more preferable that the ink composition contains 3.0% by mass to 4.5% by mass of the monoazo pigment with respect to the total mass of the ink composition A, and the ink composition B contains 1.5% by mass to 3.0% by mass of the carbon black with respect to the total mass of the ink composition B, and it is even more preferable that the ink composition A contains 3.0% by mass to 4.5% by mass of the monoazo pigment with respect to the total mass of the ink composition A, and the ink composition B contains 1.5% by mass to 2.5% by mass of the carbon black with respect to the total mass of the ink composition B.

(High Boiling Solvent)

The ink composition contains at least one high boiling solvent.

In the case where the ink composition contains the high boiling solvent, and the ink composition is jetted on the substrate and then subjected to a drying step, water in the ink composition is evaporated, a concentration of the high boiling solvent is increased, and thus the microcapsules aggregate. Therefore, the ink composition is fixed on the substrate.

The concentration $M_A$ of the high boiling solvent in the ink composition A and the concentration $M_B$ of the high boiling solvent in the ink composition B are as described above.

The high boiling solvent means a solvent having a boiling point higher than 100° C. A boiling point of the high boiling solvent is preferably higher than 100° C. and 400° C. or lower, more preferably 150° C. to 300° C., and even more preferably 180° C. to 280° C.

In a case where the boiling point exceeds 100° C., the jetting properties are excellent. On the other hand, in a case where the boiling point is 400° C. or lower, the film hardness is excellent.

The boiling point can be measured by vapor pressure measurement method (edited by Organic Synthetic Research Group, "New Edition Solvent Pocket Book", p. 48, Ohmsha (1994)).

In addition, the high boiling solvent is preferably a water-soluble solvent from viewpoint of aggregating properties of the microcapsules.

The term "water-soluble solvent" means a solvent in which an amount of dissolution in 100 g of distilled water at 25° C. exceeds 1 g.

Specific examples of the high boiling solvent are shown below. Numerical values in parenthesis indicate the boiling point (unit: ° C.).

Examples of the high boiling solvent include propylene glycol (188° C.), triethylene glycol (276° C.), propylene glycol-1-monobutyl ether (170° C.), glycerin (290° C.), 2-pyrrolidone (245° C.), diethylene glycol (245° C.), triethylene glycol (285° C.), dipropylene glycol (232° C.), 1,2-hexanediol (223° C.), diethylene glycol monoethyl ether (202° C.), diethylene glycol diethyl ether (230° C.), and the like.

Among the above-described solvents, from the viewpoint of compatibility of the ink jet jetting properties and rub resistance, it is preferable to use a combination of a solvent having a boiling point of 200° C. or lower and a solvent having a boiling point exceeding 200° C.

(Microcapsule)

The ink composition contains at least one microcapsule that contains at least a polymerizable compound within the microcapsule.

The microcapsule has a structure having a shell which is the outermost shell and a core that is a region contained within the shell, in which the core contains a polymerizable compound.

Whether a microcapsule is the microcapsule can be checked by coating the substrate with the ink composition containing the microcapsule and drying the same so as to obtain a sample for morphological observation, and then cutting the sample so as to observe the cut surface using an electron microscope and the like.

The microcapsule more preferably includes the shell that has the three-dimensional cross-linked structure containing at least one bond selected from a urethane bond or a urea bond, and the core that is contained within the shell and contains the polymerizable compound.

The ink composition contains the microcapsule, and thus is fixed on the substrate. Specifically, in a case where the water contained in the ink composition evaporates in the heating step and thus the concentration of the high boiling solvent is increased, the zeta potential of the ink composition is lowered, charge repulsion of the microcapsules dispersed by charge repulsion on a surface becomes weak and thus the microcapsules aggregate, and therefore the ink composition is thickened to be fixed on the substrate.

The microcapsules contained in the ink composition preferably have the same composition (for example, in a case where the microcapsule contained in the ink composition A has a composition in which the polymerizable compound is contained in the core, the microcapsule contained in the ink composition B also has a composition in which the polymerizable compound is contained in the same core as the polymerizable compound contained in the ink composition A). The microcapsules having the same composition refer to the microcapsules in which components constituting the shell are the same as each other, and the same component of the polymerizable compound is contained in the core. A content of each component in the shell and the core may not be the same.

In a case where the microcapsule contained in the ink composition A and the microcapsule contained in the ink composition B have the same composition, the film hardness of the ink composition is easily controlled by the concentration of the microcapsules contained in the ink composition. In addition, it is possible to reduce manufacturing and raw material cost in a case of manufacturing the ink.

From the same viewpoints as above, the microcapsules contained in the ink composition A and the ink composition B are preferably the same microcapsules (microcapsules having the same composition and in which the content of contained components is the same).

—Core of Microcapsule—

The microcapsule includes the core that contains the polymerizable compound and is contained in the interior of the shell to be described later. The core may contain components such as the photopolymerization initiator and the sensitizer, in addition to the polymerizable compound.

—Internal Content Rate—

The internal content rate (% by mass) of the polymerizable compound means the amount of the polymerizable compound contained in the core of the microcapsule (that is, the polymerizable compound contained in the interior of the microcapsule) with respect to the total amount of the polymerizable compounds in the ink composition in a case where the ink composition containing the microcapsule is prepared, and refers to a value obtained as below. Hereinafter, the polymerizable compound will be described with reference to an example.

—Method for Measuring Internal Content Rate (% by Mass) of Polymerizable Compound—

The operation described below is performed under the condition of a liquid temperature of 25° C.

The colorant or carbon black is removed from the ink composition by centrifugation, and then the following operation is performed on the ink composition from which the colorant or carbon black is removed (that is, the aqueous dispersion of microcapsule).

First, an aqueous dispersion which is a measurement target of the internal content rate (% by mass) of the polymerizable compound is prepared, and from the aqueous dispersion, two samples (hereinafter, referred to as "sample 1" and "sample 2") of the same mass are collected.

Tetrahydrofuran (THF) having a mass 100 times the mass of the total solid content in the sample 1 is added to and mixed with the sample 1, thereby preparing a diluted solution. The obtained diluted solution is subjected to centrifugation under the condition of 80,000 rounds per minute (round per minute; the same shall apply hereinafter) and 40 minutes. The supernatant (hereinafter, referred to as "supernatant 1") generated by the centrifugation is collected. It is considered that by this operation, all of the polymerizable compound contained in the sample 1 is extracted into the supernatant 1. The mass of the polymerizable compound contained in the collected supernatant 1 is measured by liquid chromatography (for example, a liquid chromatography device manufactured by Waters Corporation). The obtained mass of the polymerizable compound is taken as "total amount of polymerizable compound".

Furthermore, the sample 2 is subjected to centrifugation under the same conditions as in the centrifugation performed on the aforementioned diluted solution. The supernatant (hereinafter, referred to as "supernatant 2") generated by the centrifugation is collected. It is considered that by this operation, the polymerizable compound that was not contained in the interior of the microcapsule in the sample 2 (that is, the free polymerizable compound) is extracted into the supernatant 2. The mass of the polymerizable compound contained in the collected supernatant 2 is measured by liquid chromatography (for example, a liquid chromatography device manufactured by Waters Corporation). The obtained mass of the polymerizable compound is taken as "amount of the free polymerizable compound".

Based on the "total amount of polymerizable compound" and the "amount of free polymerizable compound" described above, the internal content rate (% by mass) of the polymerizable compound is calculated according to the equation shown below.

Internal content rate (% by mass) of polymerizable compound=((total amount of polymerizable compound−amount of free polymerizable compound)/total amount of polymerizable compound)×100

In a case where the ink composition contains two or more polymerizable compounds, internal content rates of all of the two or more polymerizable compounds may be obtained with a total amount of these two or more polymerizable compounds taken as "total amount of polymerizable compound" and a total free amount of the two or more polymerizable compounds taken as "amount of free polymerizable compound", and an internal content rate of any one of the polymerizable compound may be obtained with an amount of any one of the polymerizable compound taken as "total amount of polymerizable compound" and a free amount of any one of the polymerizable compound taken as "amount of free polymerizable compound".

Whether or not the components other than the polymerizable compound are contained in the interior of the microcapsule can be checked by the same method as the method for investigating whether or not the polymerizable compound is contained in the interior of the gel particles.

Here, for a compound having a molecular weight equal to or greater than 1,000, by measuring the masses of the compounds contained in the supernatant 1 and the supernatant 2 described above by gel permeation chromatography (GPC) and taking the masses as "total amount of compound" and "amount of free compound" respectively, the internal content rate (% by mass) of the compound is determined.

In the measurement by gel permeation chromatography (GPC), HLC (registered trademark)-8020 GPC (manufactured by Tosoh Corporation) may be used as a measurement device, three columns of TSKgel (registered trademark) Super Multipore HZ-H (4.6 mm ID×15 cm, manufactured by Tosoh Corporation) may be used as columns, and tetrahydrofuran (THF) may be used as an eluent. Furthermore, GPC can be performed using a differential refractive index (RI) detector under the measurement conditions of a sample concentration of 0.45% by mass, a flow rate of 0.35 ml/min, a sample injection amount of 10 μL, and a measurement temperature of 40° C.

A calibration curve can be prepared from 8 samples of "Standard Sample TSK standard, polystyrene" manufactured by Tosoh Corporation: "F-40", "F-20", "F-4", "F-1", "A-5000", "A-2500", "A-1000", and "n-propylbenzene".

In a case where the microcapsule contains the photopolymerization initiator within the microcapsule, an internal content rate of the photopolymerization initiator can be measured by the method same as that of the internal content rate of the polymerizable compound.

The internal content rate (% by mass) of the photopolymerization initiator in the ink composition is preferably equal to or higher than 10% by mass, more preferably equal to or higher than 50% by mass, even more preferably equal to or higher than 70% by mass, still more preferably equal to or higher than 80% by mass, yet more preferably equal to or higher than 90% by mass, much more preferably equal to or higher than 95% by mass, far more preferably equal to or higher than 97% by mass, and particularly preferably equal to or higher than 99% by mass, from the viewpoint of curing sensitivity of the film.

In a case where the ink composition contains two or more kinds of photopolymerization initiators, it is preferable that the internal content rate of at least one kind of photopolymerization initiator is within the above-described range.

—Polymerizable Compound—

The core of the microcapsule contains the polymerizable compound (that is, the compound having a polymerizable group). One kind of the polymerizable compounds may be used singly, or two or more kinds thereof may be used in combination.

The core containing the polymerizable compound is advantageous from the viewpoint of improving curing sensitivity of the film and film hardness. Particularly, a case in which the core contains two or more polymerizable compounds, and contains the di- or lower functional polymerizable compound and the tri- or higher functional polymerizable compound, is preferable because it becomes possible that hardness of a film to be formed by the ink composition is compatible with adhesiveness between the film and the substrate.

The polymerizable group of the polymerizable compound functions as the polymerizable group contained in the microcapsule.

The microcapsule has the polymerizable group, which makes it possible that microcapsules adjacent to each other are bonded to each other by irradiation with active energy rays so as to form a film.

The polymerizable group is not particularly limited as long as the polymerizable group is a group allowing a polymerization reaction to occur. As the polymerizable group, a group containing an ethylenic double bond is preferable, and a group containing at least one of a vinyl group and a 1-methylvinyl group is more preferable. As the polymerizable group, a (meth)acryloyl group is particularly preferable from the viewpoints of a polymerization reactivity and hardness of a formed film.

The polymerizable groups are preferably present in a surface portion of the microcapsule (a contact portion with a dispersion medium in a case where the microcapsule is dispersed by the dispersion medium, for example).

The polymerizable groups can be checked, for example, by Fourier transform infrared spectroscopy (FT-IR).

A content of the polymerizable compound (total amount in a case where two or more thereof are contained) contained in the core of the microcapsule is preferably 30% by mass to 75% by mass, more preferably 35% by mass to 65% by mass, and even more preferably 35% by mass to 60% by mass with respect to the total solid content of the microcapsule, from the viewpoint of compatibility of adhesiveness and hardness of the film.

In the case where the polymerizable compound contains the di- or lower functional polymerizable compound and the tri- or higher functional polymerizable compound, a proportion of the di- or lower functional polymerizable compound is preferably 50% by mass to 90% by mass, more preferably 50% by mass to 80% by mass, and even more preferably 55% by mass to 65% by mass, with respect to a total mass of the di- or lower functional polymerizable compound and the tri- or higher functional polymerizable compound.

With the proportion of the di- or lower functional polymerizable compound being 50% by mass or more, adhesiveness becomes excellent. Meanwhile, with the proportion of the di- or lower functional polymerizable compound being 90% by mass or less, film hardness becomes excellent.

The polymerizable compound contained in the core of the microcapsule may any one of a polymerizable monomer, a polymerizable oligomer, and a polymerizable polymer, but is preferably the polymerizable monomer from viewpoints that it is easy to move in the microcapsule and the polymerizable group is easily arranged at a position at which the polymerizable group easily reacts with a polymerizable group contained in an adjacent microcapsule.

The molecular weight of the polymerizable compound is, in terms of a weight-average molecular weight, preferably 100 to 100,000, more preferably 100 to 10,000, even more preferably 100 to 4,000, still more preferably 100 to 2,000, and particularly preferably 100 to 1,000.

The weight-average molecular weight is measured by the above-described gel permeation chromatography (GPC).

—Polymerizable Monomer—

In a case where the polymerizable compound is a polymerizable monomer, the polymerizable monomer is favorable from the viewpoint of improving curing sensitivity of the film and film hardness.

Particularly, a case in which the core contains the di- or lower functional polymerizable monomer and the tri- or higher functional polymerizable monomer as a polymerizable compound, is preferable because film hardness and adhesiveness are further improved.

The polymerizable monomer (hereinafter, will also be referred to as "internal polymerizable monomer") capable of being contained in the core of the microcapsule can be selected from a polymerizable monomer having a radically polymerizable ethylenically unsaturated bond (that is, a radically polymerizable monomer) and a polymerizable monomer having a cationic polymerizable group that can be cationically polymerized (that is, a cationic polymerizable monomer).

Examples of the radically polymerizable monomer include an acrylate compound, a methacrylate compound, a styrene compound, a vinylnaphthalene compound, an N-vinyl heterocyclic compound, unsaturated polyester, unsaturated polyether, unsaturated polyamide, and unsaturated urethane.

As the radically polymerizable monomer, a compound having an ethylenic unsaturated group is preferable.

One kind of the radically polymerizable monomer may be used alone, or two or more kinds thereof may be used in combination.

Examples of the acrylate compound include monofunctional acrylate compounds such as 2-hydroxyethyl acrylate, butoxyethyl acrylate, carbitol acrylate, cyclohexyl acrylate, tetrahydrofurfuryl acrylate, benzyl acrylate, tridecyl acrylate, 2-phenoxyethyl acrylate (PEA), bis(4-acryloxypolyethoxyphenyl)propane, oligoester acrylate, epoxy acrylate, isobornyl acrylate (IBOA), dicyclopentenyl acrylate, dicyclopentenyloxyethyl acrylate, dicyclopentanyl acrylate, cyclic trimethylolpropane formal acrylate, 2-(2-ethoxyethoxy)ethyl acrylate, 2-(2-vinyloxyethoxy)ethyl acrylate, octyl acrylate, decyl acrylate, isodecyl acrylate, lauryl acrylate, 3,3,5-trimethylcyclohexyl acrylate, 4-t-butylcyclohexyl acrylate, isoamyl acrylate, stearyl acrylate, isoamyl stearyl acrylate, isostearyl acrylate, 2-ethylhexyl diglycol acrylate, 2-hydroxybutyl acrylate, 2-acryloyloxyethylhydrophthalic acid, ethoxydiethylene glycol acrylate, methoxydiethyleneglycol acrylate, methoxypolyethylene glycol acrylate, methoxypropylene glycol acrylate, 2-hydroxy-3-phenoxypropyl acrylate, vinyl ether acrylate, 2-acryloyloxyethyl succinic acid, 2-acryloyloxy phthalic acid, 2-acryloxyethyl-2-hydroxyethyl phthalic acid, lactone modified acrylate, acryloyl morpholine, acrylamide, and substituted acrylamides such as N-methylol acrylamide and diacetone acrylamide;

difunctional acrylate compounds such as polyethylene glycol diacrylate, polypropylene glycol diacrylate, polytetramethylene glycol diacrylate, 1,3-butylene glycol diacrylate, 1,4-butanediol diacrylate, 1,6-hexanediol diacrylate (HDDA), 1,9-nonanediol diacrylate (NDDA), 1,10-decanediol diacrylate (DDDA), 3-methyl pentanediol diacrylate (3 MPDDA), neopentyl glycol diacrylate, tricyclodecanedimethanol diacrylate, bisphenol A ethylene oxide (EO) adduct diacrylate, bisphenol A propylene oxide (PO) adduct diacrylate, ethoxylated bisphenol A diacrylate, hydroxylated-neopentyl glycol diacrylate, propoxylated neopentyl glycol diacrylate, alkoxylated dimethylol tricyclodecane diacrylate, polytetramethylene glycol diacrylate, alkoxylated cyclohexanone dimethanol diacrylate, alkoxylated hexanediol diacrylate, dioxane glycol diacrylate, cyclohexanone dimethanol diacrylate, diethylene glycol diacrylate, neopentyl glycol diacrylate, tetraethylene glycol diacrylate, dipropylene glycol diacrylate, tripropylene glycol diacrylate (TPGDA), and neopentyl glycol propylene oxide adduct diacrylate; and tri- or higher functional acrylate compounds such as trimethylolpropane triacrylate, pentaerythritol triacrylate, dipentaerythritol tetraacrylate, ethoxylated isocyanuric acid triacrylate, ε-caprolactone modified tris-(2-acryloxyethyl) isocyanurate, ditrimethylolpropane tetraacrylate, dipentaerythritol pentaacrylate, dipentaerythritol hexaacrylate, ethoxylated trimethylolpropane triacrylate, propoxylated trimethylolpropane triacrylate, caprolactone modified trimethylolpropane triacrylate, pentaerythritol tetraacrylate, pentaerythritol ethoxy tetraacrylate, glycerin propoxy triacrylate, ethoxylated dipentaerythritol hexaacrylate, caprolactam modified dipentaerythritol hexaacrylate, propoxylated glycerin triacrylate, ethoxylated trimethylolpropane triacrylate, and propoxylated trimethylolpropane triacrylate.

Examples of the methacrylate compound include monofunctional methacrylate compounds such as methyl methacrylate, n-butyl methacrylate, allyl methacrylate, glycidyl methacrylate, benzyl methacrylate, dimethylaminomethyl methacrylate, methoxypolyethylene glycol methacrylate, methoxytriethylene glycol methacrylate, hydroxyethyl methacrylate, phenoxyethyl methacrylate, and cyclohexyl methacrylate;

difunctional methacrylate compounds such as polyethylene glycol dimethacrylate, polypropylene glycol dimethacrylate, 2,2-bis(4-methacryloxy polyethoxyphenyl)propane, and tetraethylene glycol dimethacrylate; and the like.

Examples of the styrene compound include styrene, p-methylstyrene, p-methoxystyrene, β-methyl styrene, p-methyl-β-methyl styrene, α-methylstyrene, and p-methoxy-β-methyl styrene.

Examples of the vinylnaphthalene compound include 1-vinylnaphthalene, methyl-1-vinylnaphthalene, β-methyl-1-vinylnaphthalene, 4-methyl-1-vinylnaphthalene, and 4-methoxy-1-vinylnaphthalene.

Examples of the N-vinyl heterocyclic compound include N-vinylcarbazole, N-vinylpyrrolidone, N-vinyl ethylacetamide, N-vinylpyrrole, N-vinylphenothiazine, N-vinylacetanilide, N-vinyl succinic acid imide, N-vinylphthalimide, N-vinylcaprolactam, and N-vinylimidazole.

Examples of other radically polymerizable monomers include N-vinyl amides such as allyl glycidyl ether, diallyl phthalate, triallyl trimellitate, and N-vinylformamide, and the like.

Among these radically polymerizable monomer, as the di- or lower functional polymerizable monomer, at least one kind selected from 1,6-hexanediol diacrylate (HDDA), 1,9-nonanediol diacrylate (NDDA), 1,10-decanediol diacrylate (DDDA), 3-methyl pentanediol diacrylate (3 MPDDA), neopentyl glycol diacrylate, tricyclodecanedimethanol diacrylate, diethylene glycol diacrylate, tetraethylene glycol diacrylate, dipropylene glycol diacrylate, tripropylene glycol diacrylate (TPGDA), cyclohexanone dimethanol diacrylate, alkoxylated hexanediol diacrylate, polyethylene glycol diacrylate, and polypropylene glycol diacrylate, is preferable.

In addition, as the tri- or higher functional polymerizable monomer, at least one kind selected from trimethylolpropane triacrylate, pentaerythritol triacrylate, dipentaerythritol tetraacrylate, ditrimethylolpropane tetraacrylate, dipentaerythritol pentaacrylate, dipentaerythritol hexaacrylate, ethoxylated trimethylolpropane triacrylate, propoxylated trimethylolpropane triacrylate, caprolactone modified trimethylolpropane triacrylate, pentaerythritol tetraacrylate, pentaerythritol ethoxytetraacrylate, glycerin propoxy triacrylate, ethoxylated dipentaerythritol hexaacrylate, caprolactam modified dipentaerythritol hexaacrylate, propoxylated glycerin triacrylate, ethoxylated trimethylolpropane triacrylate, and propoxylated trimethylolpropane triacrylate, is preferable.

As a combination of the di- or lower functional radically polymerizable monomer and the tri- or higher functional radically polymerizable monomer, a combination of a di- or lower functional acrylate compound and a tri- or higher functional acrylate compound is preferable, a combination of a difunctional acrylate compound and a tri- or higher functional acrylate compound is even more preferable, a combination of a difunctional acrylate compound and a tri- to octa-acrylate compound is still more preferable, and a combination of a difunctional acrylate compound and a tri- to hexa-acrylate compound is yet more preferable.

Furthermore, the most preferable combination thereof is a combination of, as a difunctional acrylate compound, at least one kind selected from 1,6-hexanediol diacrylate (HDDA), 1,9-nonanediol diacrylate (NDDA), 1,10-decanediol diacrylate (DDDA), 3-methylpentadiol diacrylate (3 MPDDA), neopentyl glycol diacrylate, tricyclodecane dimethanol diacrylate, diethylene glycol diacrylate, tetraethylene glycol diacrylate, dipropylene glycol diacrylate, tripropylene glycol diacrylate (TPGDA), cyclohexanone dimethanol diacrylate, polyethylene glycol diacrylate, and polypropylene glycol diacrylate, and, as a tri- to hexa-acrylate compound, at least one kind selected from trimethylolpropane triacrylate, pentaerythritol triacrylate, dipentaerythritol tetraacrylate, ditrimethylolpropane tetraacrylate, dipentaerythritol pentaacrylate, dipentaerythritol hexaacrylate, ethoxylated trimethylolpropane triacrylate, propoxylated trimethylolpropane triacrylate, pentaerythritol tetraacrylate, pentaerythritol ethoxytetraacrylate, glycerin propoxy triacrylate, ethoxylated dipentaerythritol hexaacrylate, caprolactam modified dipentaerythritol hexaacrylate, propoxylated glycerin triacrylate, ethoxylated trimethylolpropane triacrylate, and propoxylated trimethylolpropane triacrylate.

Examples of the cationic polymerizable monomer include an epoxy compound, a vinyl ether compound, and an oxetane compound.

As the cationic polymerizable monomer, a compounds having at least one olefin, thioether, acetal, thioxane, thietane, aziridine, N, O, S, or P-heterocyclic ring, aldehyde, lactam, or a cyclic ester group is preferable.

One kind of the cationically polymerizable monomer may be used alone, or two or more kinds thereof may be used in combination.

Examples of the epoxy compound include di- or lower functional epoxy compounds such as 1,4-butanediol diglycidyl ether, 3-(bis(glycidyloxymethyl)methoxy)-1,2-propanediol, limonene oxide, 2-biphenyl glycidyl ether, 3,4-epoxycyclohexylmethyl-3',4'-epoxycyclohexane carboxylate, epoxide derived from epichlorohydrin-bisphenol S, epoxidized styrene, epoxide derived from epichlorohydrin-bisphenol F, epoxide derived from epichlorohydrin-bisphenol A, epoxidized novolak, alicyclic polyepoxide, and the like.

Examples of the alicyclic diepoxide include a copolymer of an epoxide and a compound containing a hydroxyl group, such as glycol, polyol, and vinyl ether. Specifical examples thereof include 3,4-epoxycyclohexylmethyl-3',4'-epoxycycloethylcarboxylate, bis(3,4-epoxyhexylmethyl)adipate, limonene diepoxide, and diglycidyl ester of hexahydrophthalic acid.

In addition, examples of other epoxy compounds include tri- or higher functional epoxy compounds such as polyglycidyl ester of polybasic acid, polyglycidyl ether of polyol, polyglycidyl ether of polyoxyalkylene glycol, polyglycidyl ester of aromatic polyol, a urethane polyepoxy compound, and polyepoxy polybutadiene, and the like.

Examples of the vinyl ether compound include di- or lower functional vinyl ether compounds such as ethyl vinyl ether, n-butyl vinyl ether, isobutyl vinyl ether, octadecyl vinyl ether, cyclohexyl vinyl ether, butanediol divinyl ether, hydroxybutyl vinyl ether, cyclohexane dimethanol monovinyl ether, phenyl vinyl ether, p-methylphenyl vinyl ether, p-methoxyphenyl vinyl ether, methyl vinyl ether, β-methyl vinyl ether, β-chloro iso vinyl ether, diethylene glycol divinyl ether, triethylene glycol divinyl ether, n-propyl vinyl ether, isopropyl vinyl ether, dodecyl vinyl ether, diethylene glycol monovinyl ether, cyclohexane dimethanol divinyl ether, 4-(vinyloxy)butyl benzoate, bis[4-(vinyloxy)butyl] adipate, bis[4-(vinyloxy)butyl] succinate, 4-(vinyloxymethyl)cyclohexylmethyl benzoate, bis[4-(vinyloxy)butyl] isophthalate, bis[4-(vinyloxymethyl)cyclohexylmethyl] glutarate, 4-(vinyloxy)butyl steatite, bis[4-(vinyloxy)butyl] hexadiyl dicarbamate, bis[4-(vinyloxy)methyl]cyclohexyl]methyl]terephthalate, bis[4-(vinyloxy)methyl]cyclohexyl]methyl] isophthalate, bis[4-(vinyloxy)butyl](4-methyl-1,3-phenylene)-biscarbamate, bis[4-vinyloxy)butyl] (methylenedi-4,1-phenylene)biscarbamate, and 3-amino-1-propanol vinyl ether; and tri- or higher functional vinyl ether compounds such as tris[4-(vinyloxy)butyl]trimellitate.

Examples of the oxetane compound include 3-ethyl-3-hydroxymethyl-1-oxetane, 1,4-bis[3-ethyl-3-oxetanylmethoxy)methyl] benzene, 3-ethyl-3-phenoxymethyl-oxetane, bis([1-ethyl(3-oxetanyl)]methyl) ether, 3-ethyl-3-[(2-ethylhexyloxy)methyl] oxetane, 3-ethyl-[(triethoxysilylpropoxy)methyl] oxetane, and 3,3-dimethyl-2-(p-methoxyphenyl)-oxetane.

In addition to the radically polymerizable monomers exemplified above, it is possible to use the commercially available products described in "Cross-linking Agent Handbook" edited by Shinzo Yamashita (1981, TAISEI-SHUP- PAN CO., LTD.); "UV.EB Curing Handbook (raw materials)" edited by Kiyomi Kato (1985, Kobunshi Kankokai); "Application and Market of UV.EB Curing Technology" edited by RadTech Japan, p. 79, (1989, CMC); "Polyester Resin Handbook" written by Eichiro Takiyama, (1988, NIKKAN KOGYO SHIMBUN, LTD.) or to use radically polymerizable and cross-linkable monomers known in the technical field.

Furthermore, in addition to the cationic polymerizable monomers exemplified above, it is possible to use the compounds described in "Advances in Polymer Science" by J. V. Crivello et al., 62, pages 1 to 47 (1984), "Handbook of Epoxy Resins" by Lee et al., McGraw Hill Book Company, New York (1967), and "Epoxy Resin Technology" by P. F. Bruins et al. (1968).

In addition, as the polymerizable monomer, for example, the photocurable polymerizable monomers used in photopolymerizable compositions described in JP1995-159983A (JP-H07-159983A), JP1995-31399B (JP-H07-31399B), JP1996-224982A (JP-H08-224982A), JP1998-863A (JP-H10-863A), JP1997-134011A (JP-H09-134011A), JP2004-514014A, and the like are known. These monomers can also be suitably used in the microcapsule.

In addition, as the polymerizable monomer, a commercially available product on the market may be used, examples thereof include AH-600 (difunctional), AT-600 (difunctional), UA-306H (hexafunctional), UA-306T (hexafunctional), UA-306I (hexafunctional), UA-510H (decafunctional), UF-8001G (difunctional), and DAUA-167 (difunctional) (manufactured by KYOEISHA CHEMICAL Co., Ltd.), SR339A (PEA, monofunctional), SR506 (IBOA, monofunctional), CD262 (difunctional), SR238 (HDDA, difunctional), SR341 (3MPDDA, difunctional), SR508 (difunctional), SR306H (difunctional), CD560 (difunctional), SR833S (difunctional), SR444 (trifunctional), SR454 (trifunctional), SR492 (trifunctional), SR499 (trifunctional), CD501 (trifunctional), SR502 (trifunctional), SR9020 (trifunctional), CD9021 (trifunctional), SR9035 (trifunctional), SR494 (tetrafunctional), and SR399E (pentafunctional) (manufactured by Sartomer Arkema Inc.), A-NOD-N (difunctional NDDA), A-DOD-N (difunctional DDDA), A-200 (difunctional), APG-400 (difunctional), A-BPE-10 (difunctional), A-BPE-20 (difunctional), A-9300 (trifunctional), A-9300-1CL (trifunctional), A-TMPT (trifunctional), A-TMM-3L (trifunctional), A-TMMT (tetrafunctional), and AD-TMP (tetrafunctional) (Shin-Nakamura Chemical Co., Ltd.), UV-7510B (trifunctional) (Nippon Synthetic Chemical Industry Co., Ltd.), KAYARAD DCPA-30 (hexafunctional) and KAYARAD DPEA-12 (hexafunctional) (Nippon Kayaku Co., Ltd.), and LIGHT ACRYLATE NPA (difunctional) and LIGHT ACRYLATE 3EG-A (difunctional) (KYOEISHA CHEMICAL Co., Ltd.).

In addition, as the polymerizable monomer, it is possible to suitably use the commercially available products such as neopentyl glycol propylene oxide adduct diacrylate (NPG-PODA), SR531, SR285, and SR256 (manufactured by Sartomer Arkema Inc.), A-DHP (dipentaerythritol hexaacrylate, SHIN-NAKAMURA CHEMICAL CO., LTD.), ARONIX (registered trademark) M-156 (manufactured by TOAGO-SEI CO., LTD.), V-CAP (manufactured by BASF SE), VISCOAT #192 (manufactured by OSAKA ORGANIC CHEMICAL INDUSTRY LTD), and the like.

In a case of manufacturing the microcapsule, the polymerizable monomer is dissolved as an oil-phase component together with the components constituting the microcapsule, and a water-phase component is added to and mixed with the oil-phase component, followed by emulsification, and therefore the polymerizable monomer can be incorporated into the core of the microcapsule.

The molecular weight of the polymerizable monomer is, in terms of a weight-average molecular weight, preferably 100 to 4,000, more preferably 100 to 2,000, and even more preferably 100 to 1,000.

The weight-average molecular weight is measured by gel permeation chromatography (GPC).

The content of the polymerizable monomer in the total solid content of the microcapsule is preferably 0.1% by mass to 75% by mass, more preferably 0.5% by mass to 60% by mass, and even more preferably 1% by mass to 50% by mass. With the content within the above range, an image in which the cross-linking properties and the film hardness are favorable is obtained.

—Polymerizable Oligomer and Polymerizable Polymer—

A case in which the polymerizable compound is a polymerizable oligomer or a polymerizable polymer is advantageous from the viewpoints that cure shrinkage of the film is decreased and a deterioration in adhesiveness of the film on a substrate is suppressed.

Examples of the polymerizable oligomer and the polymerizable polymer include oligomers and polymers such as an acrylic resin, a urethane resin, polyester, polyether, polycarbonate, an epoxy resin, and polybutadiene.

In addition, examples thereof include resins such as epoxy acrylate, aliphatic urethane acrylate, aromatic urethane acrylate, and polyester acrylate may be used.

Among these, from the viewpoint of decreasing cure shrinkage, a resin which has a hard segment and a soft segment in combination and is capable of stress relaxation in a case of curing is preferable, and particularly, at least one oligomer or polymer selected from a urethane resin, a polyester resin, and an epoxy resin is more preferable.

As the polymerizable group, an ethylenically unsaturated group such as a (meth)acrylic group, a vinyl group, an allyl group, and a styryl group, an epoxy group, and the like are preferable, and from the viewpoint of polymerization reactivity, at least one group selected from a (meth)acrylic group, a vinyl group, and a styryl group is more preferable, and a (meth)acrylic group is particularly preferable.

The polymerizable oligomer and the polymerizable polymer may have only one kind of polymerizable group or have two or more kinds thereof.

These polymerizable groups can be introduced into polymers or oligomers by polymer reaction and copolymerization.

For example, by using a reaction between a polymer or an oligomer having a carboxy group on a side chain, and glycidyl methacrylate, or a reaction between a polymer or an oligomer having an epoxy group, and an ethylenically unsaturated group-containing carboxylic acid such as a methacrylic acid, the polymerizable groups can be introduced into polymers or oligomers. These groups may be used in combination.

As the polymerizable oligomer and the polymerizable polymer, a commercially available product on the market may be used. Examples of the commercially available product include acrylic resins such as (ACA) Z200M, (ACA) Z230AA, (ACA) Z251, and (ACA) Z254F (all of which are manufactured by DAICEL-ALLNEX LTD.), and HA7975D (Hitachi Chemical Co., Ltd.);

urethane resins such as EBECRYL (registered trademark) 8402, EBECRYL (registered trademark) 8405, EBECRYL (registered trademark) 9270, EBECRYL (registered trademark) 8311, EBECRYL (registered trademark) 8701, KRM 8667, and KRM 8528 (all of which are manufactured by DAICEL-ALLNEX LTD.), CN964, CN9012, CN968, CN996, CN975, and CN9782 (all of which are manufactured by Sartomer Arkema Inc.), UV-6300B, UV-7600B, UV-7605B, UV-7620EA, and UV-7630B (all of which are manufactured by Nippon Synthetic Chemical Industry Co., Ltd.), U-6HA, U-15HA, U-108A, U-200PA, and UA-4200 (all of which are manufactured by Shin-Nakamura Chemical Co., Ltd.), TL2300, HA4863, TL2328, TL2350, and HA7902-1 (all of which are manufactured by Hitachi Chemical Co., Ltd.), and 8UA-017, 8UA-239, 8UA-239H, 8UA-140, 8UA-585H, 8UA-347H, and 8UX-015A (all of which are manufactured by TAISEI FINE CHEMICAL CO., LTD.);

polyester resins such as CN294, CN2254, CN2260, CN2271E, CN2300, CN2301, CN2302, CN2303, and CN2304 (all of which are manufactured by Sartomer Arkema Inc.), and EBECRYL (registered trademark) 436, EBECRYL (registered trademark) 438, EBECRYL (registered trademark) 446, EBECRYL (registered trademark) 524, EBECRYL (registered trademark) 525, EBECRYL (registered trademark) 811, and EBECRYL (registered trademark) 812 (all of which are manufactured by DAICEL-ALLNEX LTD.);

polyether resins such as BLEMMER (registered trademark) ADE-400A and BLEMMER (registered trademark) ADP-400 (all of which are manufactured by NOF CORPORATION);

polycarbonate resins such as polycarbonate diol diacrylate (UBE INDUSTRIES, LTD.);

epoxy resins such as EBECRYL (registered trademark) 3708 (DAICEL-ALLNEX LTD.), CN120, CN120B60, CN120B80, and CN120E50 (all of which are manufactured by Sartomer Arkema Inc.), and HA7851 (Hitachi Chemical Co., Ltd.); and polybutadiene resins such as CN301, CN303, and CN307 (all of which are manufactured by Sartomer Arkema Inc.).

—Photopolymerization Initiator—

The core of the microcapsule may contain at least one photopolymerization initiator. That is, the microcapsule may contain at least one photopolymerization initiator in the interior thereof.

In a case where the core contains the photopolymerization initiator, and in a case where the ink composition is irradiated with the active energy rays, sensitivity with respect to active energy rays increases, and therefore an image having excellent film hardness is obtained.

Furthermore, in a case where the microcapsule contains a photopolymerization initiator in the interior thereof, it is possible to use a photopolymerization initiator which cannot be readily used in the related art because the photopolymerization initiator has high sensitivity but exhibits low dispersibility or solubility in water. Therefore, in a case where the microcapsule is adopted in the ink composition, a highly sensitive aqueous ink composition can be realized compared to the aqueous ink composition of the related art. In addition, in a case where the microcapsule contains the photopolymerization initiator in the interior thereof, a range of choice of the photopolymerization initiators to be used broadens, and hence a range of choice of the light source to be used also broadens. Consequently, the curing sensitivity can be further improved compared to the related art.

From the same viewpoint described above, it is preferable that any of the microcapsules contained in the ink composition A and the ink composition B contains the photopolymerization initiator within the microcapsules.

As the photopolymerization initiator capable of being contained in the interior of the core of the microcapsule (hereinafter, referred to as an internal photopolymerization initiator as well), known photopolymerization initiators can be appropriately selected.

The photopolymerization initiator is a compound generating a radical or a cation, which is a polymerization initiating species, by absorbing light (that is, active energy rays).

As the photopolymerization initiator, a known compound can be used. Preferable examples of the photopolymerization initiator include (a) carbonyl compound such as aromatic ketones, (b) acylphosphine oxide compound, (c) aromatic onium salt compound, (d) organic peroxide, (e) thio compound, (f) hexaarylbiimidazole compound, (g) ketoxime ester compound, (h) borate compound, (i) azinium compound, (j) metallocene compound, (k) active ester compound, (l) compound having carbon halogen bond, (m) alkylamine compound, and the like.

As the photopolymerization initiator, the core may contain one kind of the compounds (a) to (m), or two or more kinds thereof in combination.

Preferable examples of (a) carbonyl compound, (b) acylphosphine oxide compound, and (e) thio compound include the compounds having a benzophenone skeleton or a thioxanthone skeleton described in "RADIATION CURING IN POLYMER SCIENCE AND TECHNOLOGY", J. P. FOUASSIER, J. F. RABEK (1993), pp. 77~117, and the like.

More preferable examples of the compounds include the α-thiobenzophenone compound described in JP1972-6416B (JP-S47-6416B), the benzoin ether compound described in JP1972-3981B (JP-S47-3981B), the α-substituted benzoin compound described in JP1972-22326B (JP-S47-22326B), the benzoin derivative described in JP1972-23664B (JP-S47-23664B), the aryolphosphonic acid ester described in JP1982-30704A (JP-S57-30704A), the dialkoxybenzophenone described in JP1985-26483B (JP-S60-26483B), the benzoin ethers described in JP1985-26403B (JP-S60-26403B) and JP1987-81345A (JP-S62-81345A), the α-aminobenzophenones described in JP1989-34242B (JP-H01-34242B), U.S. Pat. No. 4,318,791A, and EP0284561A1, the p-di(dimethylaminobenzoyl)benzene described in JP1990-211452A (JP-H02-211452A), the thio-substituted aromatic ketone described in JP1986-194062A (JP-S61-194062A), the acylphosphine sulfide described in JP1990-9597B (JP-H02-9597B), the acylphosphine described in JP1990-9596B (JP-H02-9596B), the thioxanthones described in JP1988-61950B (JP-S63-61950B), the coumarins described in JP1984-42864B (JP-S59-42864B), the compound described in WO2015/158745A, and the like.

Furthermore, the photopolymerization initiator described in JP2008-105379A or JP2009-114290A is also preferable.

Examples of the commercially available product of the photopolymerization initiator include IRGACURE (registered trademark) 184, 369, 500, 651, 819, 907, 1000, 1300, 1700, and 1870, DAROCUR (registered trademark) 1173, 2959, 4265, and ITX, LUCIRIN (registered trademark) TPO (all of which are manufactured by BASF SE), ESACURE (registered trademark) KT037, KT046, KIP 150, and EDB (all of which are manufactured by Lamberti S.p.A.), H-Nu (registered trademark) 470 and 470X (all of which are manufactured by Spectra Group Limited, Inc.), Omnipol 9210 (manufactured by IGM Resins B. V.), SpeedCure 7040 (manufactured by Lambson Limited), and the like.

Among these photopolymerization initiators, as the photopolymerization initiator, from the viewpoint of sensitivity to UV light, at least one compound selected from (a) carbonyl compound and (b) acylphosphine oxide compound is more preferable, and specific examples thereof include bis(2,4,6-trimethylbenzoyl)-phenylphosphine oxide (for example, IRGACURE (registered trademark) 819 manufactured by BASF SE), 2-(dimethylamine)-1-(4-morpholinophenyl)-2-benzyl-1-butanone (for example, IRGACURE (registered trademark) 369 manufactured by BASF SE), 2-methyl-1-(4-methylthiophenyl)-2-morpholinopropan-1-one (for example, IRGACURE (registered trademark) 907 manufactured by BASF SE), 1-hydroxy-cyclohexyl-phenyl-ketone (for example, IRGACURE (registered trademark) 184 manufactured by BASF SE), 2-hydroxy-2-methyl-1-phenyl-propan-1-one (for example, IRGACURE (registered trademark) 1173 manufactured by BASF SE), 2,4,6-trimethylbenzoyl-diphenyl-phosphine oxide (for example, DAROCUR (registered trademark) TPO, LUCIRIN (registered trademark) TPO (all of which are manufactured by BASF SE)), and the like.

Among these, from the viewpoint of suitability for LED light, as the photopolymerization initiator, (b) acylphosphine oxide compound is preferable, and a monoacylphosphine oxide compound (particularly preferably 2,4,6-trimethyl-benzoyl-diphenyl-phosphine oxide) or a bisacylphosphine oxide compound (particularly preferably bis(2,4,6-trimethylbenzoyl)-phenylphosphine oxide) is more preferable.

In a case of producing the microcapsule, the photopolymerization initiator is dissolved as an oil-phase component together with the components constituting the microcapsule, a water-phase component is added to and mixed with the oil-phase component, followed by emulsification, and therefore the internal photopolymerization initiator can be incorporated into the core of the microcapsule.

The content of the photopolymerization initiator with respect to the total solid content of the microcapsule is preferably from 0.1% by mass to 25% by mass, more preferably from 0.5% by mass to 20% by mass, and even more preferably from 0.5% by mass to 15% by mass.

In a case where the core of the microcapsule contains the photopolymerization initiator, in regard to a ratio of a content of the photopolymerization initiator to the above-described polymerizable compound in the core, it is preferable that the content of the photopolymerization initiator is from 0.5% by mass to 25% by mass with respect the content of the polymerizable compound.

In a case where the content of the photopolymerization initiator in the core is 0.5% by mass or larger with respect the content of the polymerizable compound, the film hardness of the ink composition is further improved. Whereas in a case where the content of the photopolymerization initiator in the core is 25% by mass or smaller with respect the content of the polymerizable compound, the jetting properties of the ink composition are further improved.

From the same viewpoint described above, the content of the photopolymerization initiator in the core is preferably from 1% by mass to 50% by mass with respect the content of the polymerizable compound, more preferably from 1% by mass to 20% by mass, and even more preferably from 5% by mass to 10% by mass.

Particularly, any of the contents of the photopolymerization initiators contained within the microcapsules contained in the ink composition A and the ink composition B are preferably within the above-described range.

—Sensitizer—

The core of the microcapsule may contain at least one sensitizer.

In a case where the core of the microcapsule contains the sensitizer, the decomposition of the photopolymerization initiator by the irradiation with active energy rays can be further accelerated.

The sensitizer is a substance which becomes in an electron-excited state by absorbing specific active energy rays. By coming into contact with the photopolymerization initiator, the sensitizer in the electron-excited state performs an action such as electron transfer, energy transfer, or heating. As a result, the chemical change of the photopolymerization initiator, that is, the decomposition, the generation of a radical, an acid, or a base, or the like is accelerated.

Examples of the sensitizer include benzophenone, thioxanthone, isopropylthioxanthone, anthraquinone, a 3-acyl-coumarin derivative, terphenyl, styryl ketone, 3-(aroylmethylene) thiazoline, camphorquinone, eosin, rhodamine, erythrosine, and the like.

Furthermore, as the sensitizer, the compound represented by General Formula (i) described in JP2010-24276A and the compound represented by General Formula (I) described in JP1994-107718A (JP-H06-107718A) can also be suitably used.

Furthermore, the compounds described in WO2015/158745A, specifically tertiary aliphatic amines (for example, methyldiethanolamine, dimethylethanolamine, triethanolamine, triethylamine, and N-methylmorpholine); aromatic amines (for example, amyl para dimethylaminobenzoate, 2-butoxyethyl 4-(dimethylamino)benzoate, 2-(dimethylamino)ethyl benzoate, ethyl 4-(dimethylamino) benzoate, and 2-ethylhexyl 4-(dimethyl amino)); (meth) acrylated amines [for example, dialkylaminoalkyl (meth) acrylate (such as diethylaminoethyl acrylate) and N-alkylmorpholine (meth)acrylate (such as N-alkylmorpholine acrylate)], and the like can be suitably used.

Among the above compounds, as the sensitizer, from the viewpoints of the suitability for LED light and the reactivity with the photopolymerization initiator, at least one selected from thioxanthone, isopropylthioxanthone, and benzophenone is preferable, at least one selected from thioxanthone and isopropylthioxanthone is more preferable, and isopropylthioxanthone is even more preferable.

In a case where the core of the microcapsule contains the sensitizer, a content of the sensitizer is preferably 0.1% by mass to 25% by mass, more preferably 0.5% by mass to 20% by mass, and even more preferably 1% by mass to 15% by mass, with respect to the total solid content of the microcapsule.

(Shell of Microcapsule)

The microcapsule preferably includes the shell (hereinafter will also be simply referred to as "shell") having the three-dimensional cross-linked structure containing at least one bond selected from a urethane bond or a urea bond.

In the present specification, the term "three-dimensional cross-linked structure" refers to a three-dimensional network structure formed by cross-linking.

A case where the shell of the microcapsule has the three-dimensional cross-linked structure, contributes to improvement of dispersion stability and redispersibility in a case where the microcapsule is adopted in the ink composition.

The term "redispersibility" means the properties in which in a case where an aqueous liquid (for example, water, an aqueous solution, an aqueous dispersion, or the like) is supplied to a solidified product formed by the evaporation of water from the ink composition, the particles (in this case, microcapsules) in the solidified product are dispersed again in the aqueous liquid. Examples of the solidified product include a solidified product of the ink composition formed by an application head or an ink jet head.

Whether the shell of the microcapsule has the three-dimensional cross-linked structure is checked as below. The operation described below is performed under the condition of a liquid temperature of 25° C.

In addition, first, the colorant is removed from the ink composition by centrifugation, and then the following operation is performed on the ink composition from which the colorant is removed (that is, the aqueous dispersion of microcapsule).

A sample is collected from the aqueous dispersion. Tetrahydrofuran (THF) having a mass 100 times the mass of the total solid content in the sample is added to and mixed with the collected sample, thereby preparing a diluted solution. The obtained diluted solution is subjected to centrifugation under the condition of 80,000 rpm and 40 minutes. After the centrifugation, whether there are residues is checked by visual observation. In a case where there are residues, a redispersion is prepared by redispersing the residues in water. For the obtained redispersion, by using a wet-type particle size distribution measurement apparatus (LA-960, manufactured by HORIBA, Ltd.), the particle size distribution is measured by a light scattering method.

In a case where the particle size distribution can be checked by the operation described above, it is determined that the shell of the microcapsule has the three-dimensional cross-linked structure.

The three-dimensional cross-linked structure in the shell of the microcapsule can be formed by allowing, for example, a reaction between a tri- or higher functional isocyanate compound or a difunctional isocyanate compound and water or a compound having two or more active hydrogen groups.

Particularly, in a case where a raw material used at the time of manufacturing the microcapsule includes at least one kind of compound having three or more reactive groups (isocyanate groups or active hydrogen groups), a cross-linking reaction is three-dimensional and thus more effectively proceeds, and therefore a three-dimensional network structure is more effectively formed.

The three-dimensional cross-linked structure in the microcapsule is preferably a product formed by allowing a reaction between a tri- or higher functional isocyanate compound and water.

The three-dimensional cross-linked structure of the shell preferably contains Structure (1).

The three-dimensional cross-linked structure may include a plurality of Structures (1), and the plurality of Structures (1) may be the same as or different from each other.

Structure (1)

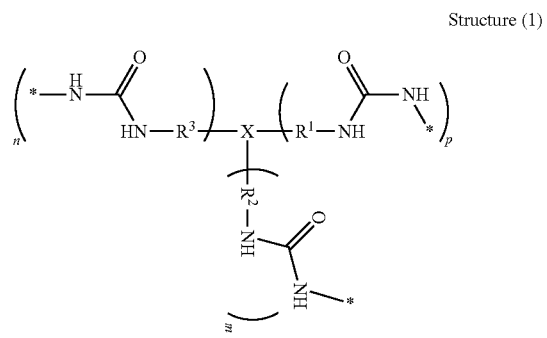

In the structure (1), X represents a (p+m+n)-valent organic group formed by linking at least two groups selected from the group consisting of a hydrocarbon group which may have a ring structure, —NH—, >N—, —C(=O)—, —O—, and —S—.

In Structure (1), $R^1$, $R^2$, and $R^3$ each independently represent a hydrocarbon group having 5 to 15 carbon atoms which may have a ring structure.

In Structure (1), * represents a binding position, each of p, m, and n is equal to or greater than 0, and p+m+n equals 3 or greater.

The total molecular weight of X, $R^1$, $R^2$, and $R^3$ is preferably less than 2,000, preferably less than 1,500, and more preferably less than 1,000. In a case where the total molecular weight of X, $R^1$, $R^2$, and $R^3$ is less than 2,000, the internal content rate of the compound contained in the interior of the core can be increased.

The hydrocarbon group in the organic group represented by X is preferably a linear or branched hydrocarbon group having 1 to 15 carbon atoms, and more preferably a linear or branched hydrocarbon group having 1 to 10 carbon atoms.

Examples of the ring structure that the hydrocarbon group in the organic group represented by X and the hydrocarbon group represented by $R^1$, $R^2$, and $R^3$ may have, include an alicyclic structure, an aromatic ring structure, and the like.

Examples of the alicyclic structure include a cyclohexane ring structure, a bicyclohexane ring structure, a bicyclodecane ring structure, an isobornene ring structure, a dicyclopentane ring structure, an adamantane ring structure, a tricyclodecane ring structure, and the like.

Examples of the aromatic ring structure include a benzene ring structure, a naphthalene ring structure, a biphenyl ring structure, and the like.

In Structure (1), p is equal to or greater than 0. p is preferably 1 to 10, more preferably 1 to 8, even more preferably 1 to 6, and particularly preferably 1 to 3.

In Structure (1), m is equal to or greater than 0, m is preferably 1 to 10, more preferably 1 to 8, even more preferably 1 to 6, and particularly preferably 1 to 3.

In Structure (1), n is equal to or greater than 0, n is preferably 1 to 10, more preferably 1 to 8, even more preferably 1 to 6, and particularly preferably 1 to 3.

In Structure (1), p+m+n is preferably an integer of 3 to 10, more preferably an integer of 3 to 8, and even more preferably an integer of 3 to 6.

The (p+m+n)-valent organic group represented by X is preferably a group represented by any one of Formulas (X-1) to (X-12).

(X-1)

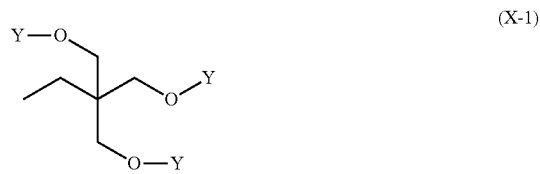

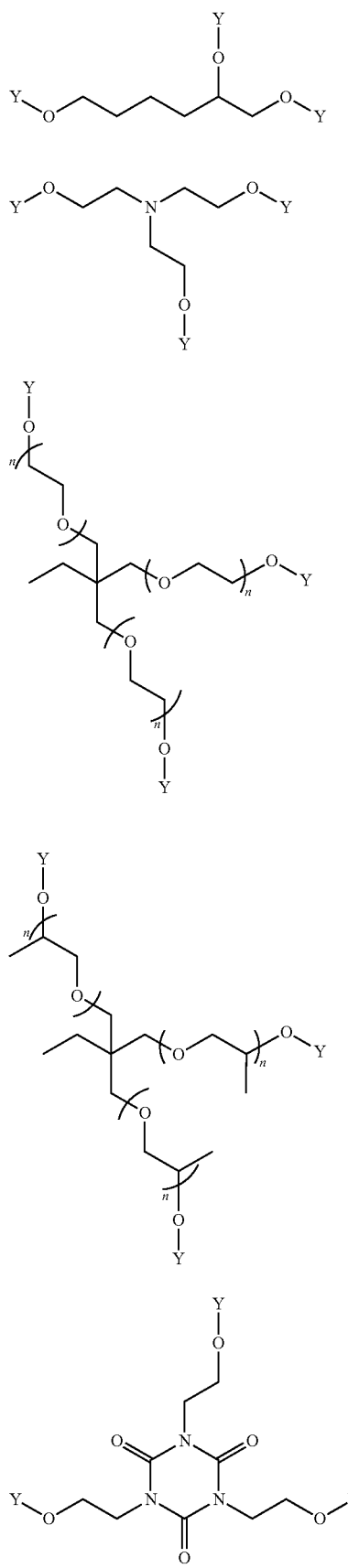
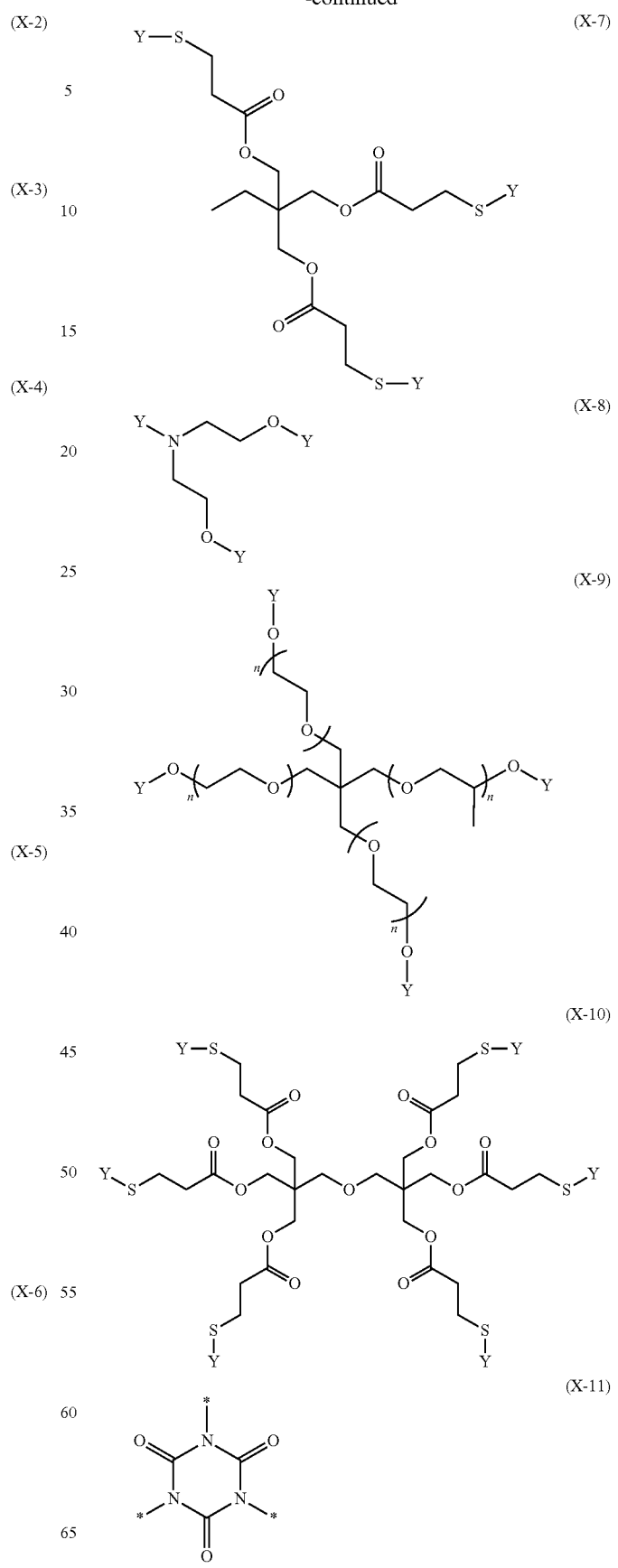

(X-12)

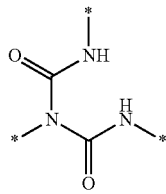

In Formulas (X-1) to (X-12), n represents an integer of 1 to 200, preferably represents an integer of 1 to 50, more preferably represents an integer of 1 to 15, and particularly preferably represents an integer of 1 to 8.

In Formula (X-11) to Formula (X-12), * represents a binding position.

In Formulas (X-1) to (X-10), Y represents (Y-1).

(Y-1)

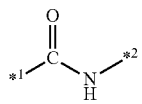

In (Y-1), *$^1$ represents a binding position in which (Y-1) is bonded to S or O in (X-1) to (X-10), and *$^2$ represents a binding position in which (Y-1) is bonded to R$^1$, R$^2$, or R$^3$ in Structure (1).

In Structure (1), R$^1$, R$^2$, and R$^3$ each independently represent a hydrocarbon group having 5 to 15 carbon atoms which may have a ring structure.

The hydrocarbon group represented by R$^1$, R$^2$, and R$^3$ may have a substituent, and examples of the substituent include a hydrophilic group capable of being contained in the shell, which is described below.

R$^1$, R$^2$, and R$^3$ preferably each independently represent a group represented by any one of (R-1) to (R-20). In (R-1) to (R-20), * represents a binding position.

(R-1)

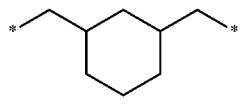

(R-2)

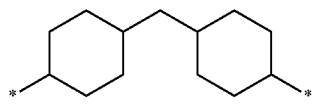

(R-3)

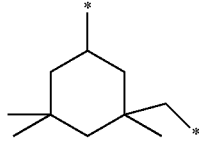

(R-4)

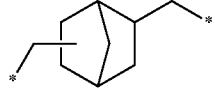

(R-5)

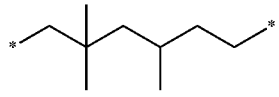

(R-6)

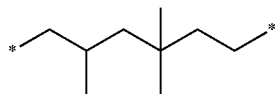

(R-7)

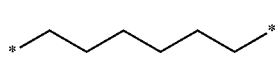

(R-8)

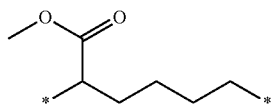

(R-9)

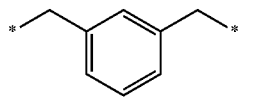

(R-10)

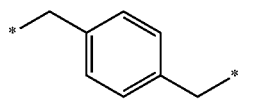

(R-11)

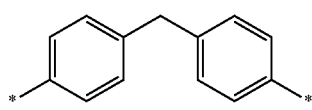

(R-12)

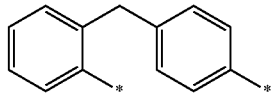

(R-13)

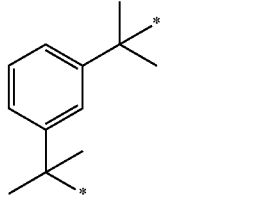

(R-14)

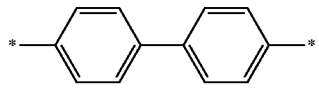

(R-15)

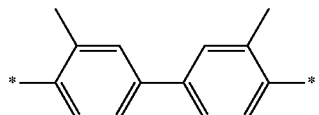

(R-16)

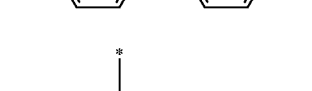

(R-17)

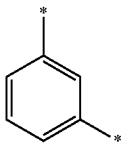

(R-18)

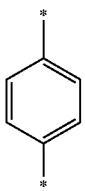

(R-19)

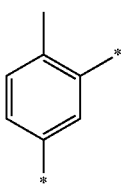

(R-20)

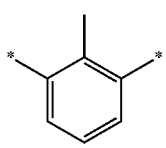

The content rate of Structure (1) in the shell with respect to the total mass of the shell is preferably 8% by mass to 100% by mass, more preferably 25% by mass to 100% by mass, and even more preferably 50% by mass to 100% by mass.

It is preferable that the shell includes, as Structure (1), at least one structure among Structure (2), Structure (3), and Structure (4) shown below.

Structure (2)

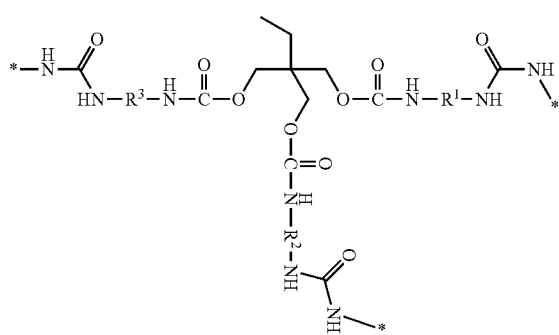

In Structure (2), $R^1$, $R^2$, and $R^3$ each independently represent a hydrocarbon group having 5 to 15 carbon atoms which may have a ring structure.

Each of the hydrocarbon groups represented by $R^1$, $R^2$, and $R^3$ in Structure (2) has the same definition as each of the hydrocarbon groups represented by $R^1$, $R^2$, and $R^3$ in Structure (1), and the preferable range thereof is also the same.

In Structure (2), * represents a binding position.

Structure (3)

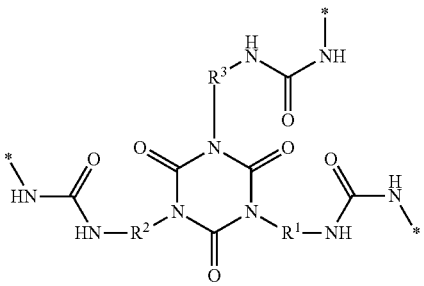

In Structure (3), $R^1$, $R^2$, and $R^3$ each independently represent a hydrocarbon group having 5 to 15 carbon atoms which may have a ring structure.

Each of the hydrocarbon groups represented by $R^1$, $R^2$, and $R^3$ in Structure (3) has the same definition as each of the hydrocarbon groups represented by $R^1$, $R^2$, and $R^3$ in Structure (1), and the preferable range thereof is also the same.

In Structure (3), * represents a binding position.

Structure (4)

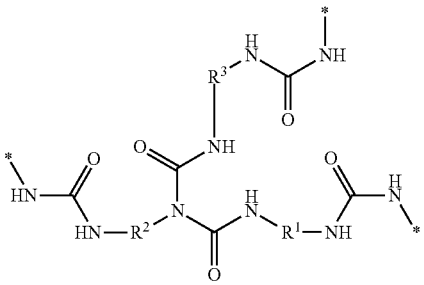

In Structure (4), $R^1$, $R^2$, and $R^3$ each independently represent a hydrocarbon group having 5 to 15 carbon atoms which may have a ring structure.

Each of the hydrocarbon groups represented by $R^1$, $R^2$, and $R^3$ in Structure (4) has the same definition as each of the hydrocarbon groups represented by $R^1$, $R^2$, and $R^3$ in Structure (1), and the preferable range thereof is also the same.

In Structure (4), * represents a binding position.

Specific examples of Structure (1) to Structure (4) include structures shown in the following Table 1.

TABLE 1

| | Structure (1) | | | | | | Corresponding |
|---|---|---|---|---|---|---|---|
| X | $R^1$ | $R^2$ | $R^3$ | p | n | m | structure |
| X-1 | R-1 | R-1 | R-1 | 1 | 1 | 1 | Structure (2) |
| X-1 | R-7 | R-7 | R-7 | 1 | 1 | 1 | Structure (2) |
| X-11 | R-1 | R-1 | R-1 | 1 | 1 | 1 | Structure (3) |
| X-11 | R-7 | R-7 | R-7 | 1 | 1 | 1 | Structure (3) |
| X-12 | R-7 | R-7 | R-7 | 1 | 1 | 1 | Structure (4) |

The three-dimensional cross-linked structure in the shell of the microcapsule can be formed by allowing, for example, a reaction between a tri- or higher functional isocyanate compound or a difunctional isocyanate compound and water or a compound having two or more active hydrogen groups.

Particularly, in a case where a raw material used at the time of manufacturing the microcapsule includes at least one kind of compound having three or more reactive groups (isocyanate groups or active hydrogen groups), a cross-linking reaction is three-dimensional and thus more effectively proceeds, and therefore a three-dimensional network structure is more effectively formed.

The three-dimensional cross-linked structure in the shell of the microcapsule is preferably a product formed by allowing a reaction between a tri- or higher functional isocyanate compound and water.

—Tri- or Higher Functional Isocyanate Compound—

The tri- or higher functional isocyanate compound is a compound having three or more isocyanate groups in a molecule. In the present disclosure, as a tri- or higher functional isocyanate compound, any one of a compound synthesized by the following method, and a known compound can be used. Examples of the isocyanate compound having three or more functional groups include an aromatic isocyanate compound having three or more functional groups, an aliphatic isocyanate compound having three or more functional groups, and the like.

Examples of the compounds known as such a compound include the compounds described in "Polyurethane Resin Handbook" (edited by Keiji Iwata, published from NIKKAN KOGYO SHIMBUN, LTD. (1987)).

As the isocyanate compound having three or more functional groups, a compound having three or more isocyanate groups in a molecule, specifically, a compound represented by Formula (X) is preferable.

$$X^1\text{−(NCO)}_n \qquad \text{Formula (X)}$$

In Formula (X), $X^1$ represents an n-valent organic group.

In Formula (X), n is equal to or greater than 3. n is preferably 3 to 10, more preferably 3 to 8, and even more preferably 3 to 6.

As the compound represented by Formula (X), a compound represented by Formula (11) is preferable.

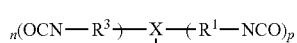

Formula (11)

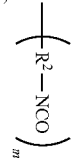

X, $R^1$, $R^2$, $R^3$, p, m, and n in Formula (11) have the same definition as X, $R^1$, $R^2$, $R^3$, p, m, and n in Structure (1) described above, and the preferable aspect thereof is also the same.

The isocyanate compound having three or more functional groups is preferably a compound derived from a difunctional isocyanate compound (a compound having two isocyanate groups in a molecule).

The isocyanate compound having three or more functional groups is preferably an isocyanate compound derived from at least one kind of compound selected from isophorone diisocyanate, hexamethylene diisocyanate, trimethylhexamethylene diisocyanate, 1,3-bis(isocyanatomethyl)cyclohexane, m-xylylene diisocyanate, and dicyclohexylmethane-4,4'-diisocyanate.

The phrase "derived from" means that a structure derived from the above-described isocyanate compound is contained using the above-described compound as a raw material.

As the isocyanate compound having three or more functional groups, for example, an isocyanate compound (adduct type) caused to have three or more functional groups as an adduct product (adduct) of a difunctional isocyanate compound (a compound having two or more isocyanate groups in a molecule) and a compound having three or more active hydrogen groups in a molecule such as polyol, polyamine, or polythiol having three or more functional groups, a trimer of a difunctional isocyanate compound (a biuret type or an isocyanurate type), and a compound having three or more isocyanate groups in a molecule such as a formalin condensate of benzene isocyanate are also preferable.

These tri- or higher functional isocyanate compounds are may be a mixture containing a plurality of compounds. It is preferable that a compound represented by Formula (11A) or Formula (11B) shown below is a main component of this mixture, and other components may also be contained in the mixture.

—Adduct Type—

The tri- or higher functional isocyanate compound of the adduct-type is preferably a compound represented by Formula (11A) or Formula (11B).

Formula (11A)

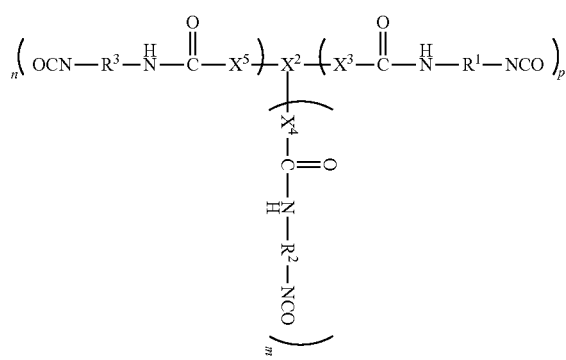

Formula (11B)

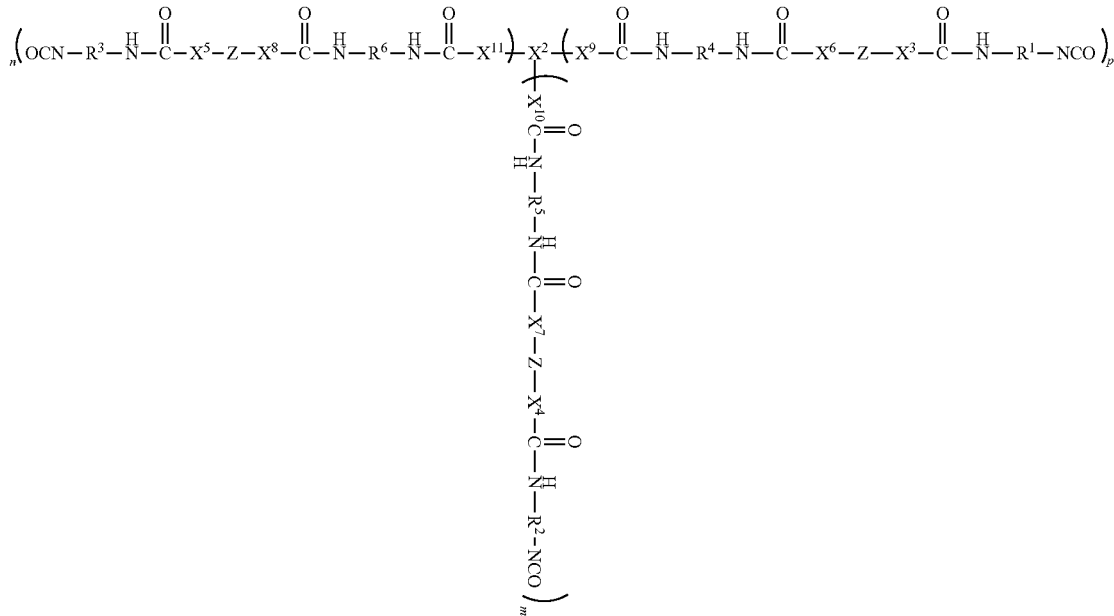

In Formula (11A) and Formula (11B), $X^2$ represents a (p+m+n)-valent organic group, each of p, m, and n is or greater, and p+m+n equals 3 or greater.

In Formula (11A) and Formula (11B), $X^3$ to $X^{11}$ each independently represent O, S, or NH.

In Formula (11A) and Formula (11B), $R^1$ to $R^6$ each independently represent a divalent organic group.

In Formula (11A) and Formula (11B), Z represents a divalent organic group.

In Formula (11A) and Formula (11B), $X^2$ is preferably a (p+m+n)-valent organic group formed by linking at least two groups selected from the group consisting of a hydrocarbon group which may have a ring structure, —NH—, >N—, —C(=O)—, —O—, and —S—.

In Formula (11A) and Formula (11B), p+m+n preferably equals 3 to 10, more preferably equals 3 to 8, and even more preferably equals 3 to 6.

In Formula (11A) and Formula (11B), $X^3$ to $X^{11}$ each independently preferably represent O or S, and more preferably represent O.

In Formula (11A) and Formula (11B), $R^1$ to $R^6$ each independently preferably represent a hydrocarbon group having 5 to 15 carbon atoms which may have a ring structure.

In Formula (11A) and Formula (11B), the preferable aspect of each of $R^1$ to $R^6$ is the same as the preferable aspect of $R^1$ in Structure (1).

In a case where $X^2$ in Formula (11A) and Formula (11B) is a hydrocarbon group that may have a ring structure, examples of the ring structure include an alicyclic structure, an aromatic ring structure, and the like.

Examples of the alicyclic structure include a cyclohexane ring structure, a bicyclohexane ring structure, a bicyclodecane ring structure, an isobornene ring structure, a dicyclopentane ring structure, an adamantane ring structure, a tricyclodecane ring structure, and the like.

Examples of the aromatic ring structure include a benzene ring structure, a naphthalene ring structure, a biphenyl ring structure, and the like.

In a case where each of $R^1$ to $R^6$ in Formula (11A) and Formula (11B) is a hydrocarbon group having 5 to 15 carbon atoms which may have a ring structure, examples of the ring structure include an alicyclic structure, an aromatic ring structure, and the like.

Examples of the alicyclic structure include a cyclohexane ring structure, a bicyclohexane ring structure, a bicyclodecane ring structure, an isobornene ring structure, a dicyclopentane ring structure, an adamantane ring structure, a tricyclodecane ring structure, and the like.

Examples of the aromatic ring structure include a benzene ring structure, a naphthalene ring structure, a biphenyl ring structure, and the like.

In Formula (11A) and Formula (11B), the (p+m+n)-valent organic group represented by $X^2$ is preferably a group represented by any one of (X2-1) to (X2-10).

(X2-1)

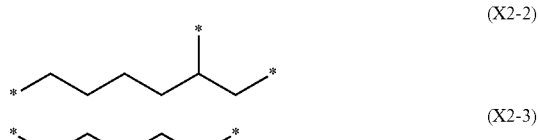

(X2-2)

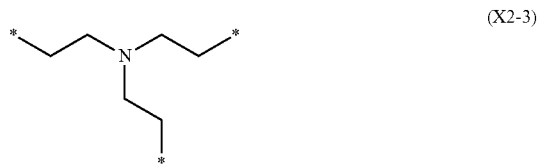

(X2-3)

(X2-4)
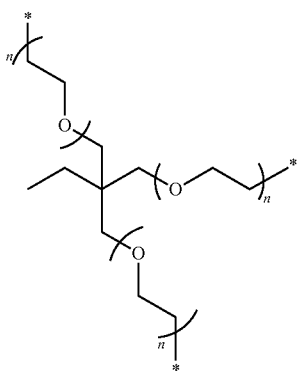

(X2-5)
(X2-6)
(X2-7)
(X2-8)
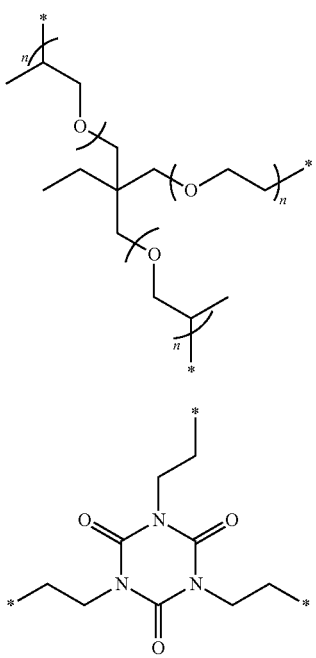
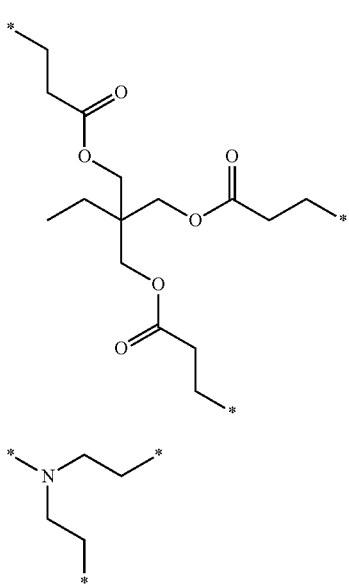

(X2-9)
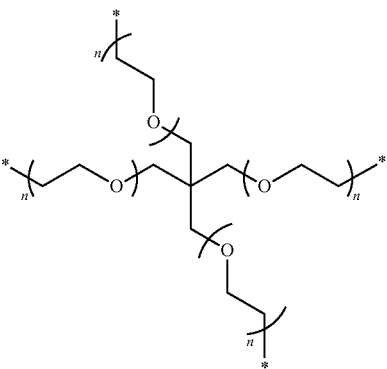

(X2-10)
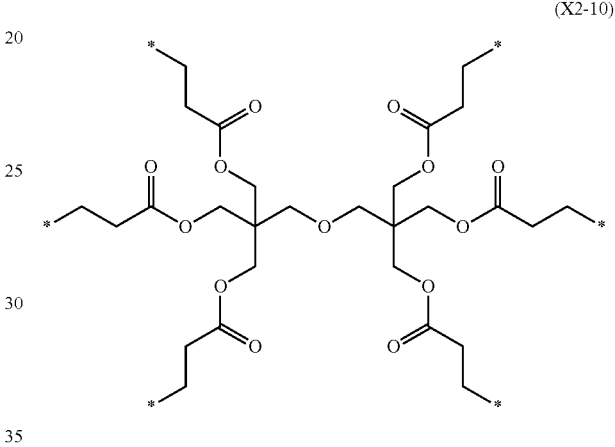

In Formula (X2-1) to Formula (X2-10), n represents an integer of 1 to 200. n preferably represents an integer of 1 to 50, more preferably represents an integer of 1 to 15, and particularly preferably represents an integer of 1 to 8.

In Formula (X2-1) to Formula (X2-10), * represents a binding position.

In Formula (11B), the divalent organic group represented by Z is preferably a hydrocarbon group, a group having a polyoxyalkylene structure, a group having a polycaprolactone structure, a group having a polycarbonate structure, or a group having a polyester structure.

The hydrocarbon group represented by Z may be a linear hydrocarbon group, a branched hydrocarbon group, or a cyclic hydrocarbon group.

The number of carbon atoms in the hydrocarbon group represented by Z is preferably 2 to 30.

In Formula (11A) and Formula (11B), $R^1$ to $R^6$ each independently preferably represent a group (R-1) to a group (R-20).

In Formula (11A) and Formula (11B), $R^1$ to $R^6$ each independently preferably represent a group (R-1) to a group (R-20).

In Formula (11A) and Formula (11B), $R^1$ to $R^6$ each independently more preferably represent any one of a group (R-3) derived from isophorone diisocyanate (IPDI), a group (R-7) derived from hexamethylene diisocyanate (HDI), a group (R-5) derived from trimethylhexamethylene diisocyanate (TMHDI), a group (R-9) derived from m-xylylene diisocyanate (XDI), a group (R-1) derived from 1,3-bis (isocyanatomethyl)cyclohexane, and a group (R-2) derived from dicyclohexylmethane 4,4'-diisocyanate.

As the compound represented by General Formula (11A), a compound represented by Formula (11A-1) is preferable.

Formula (11A-1)

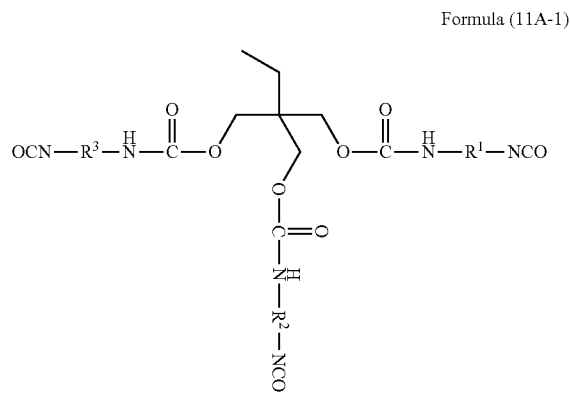

In Formula (11A-1), $R^1$, $R^2$, and $R^3$ have the same definition as $R^1$, $R^2$, and $R^3$ in Formula (11A), and the preferable aspect thereof is also the same.

The adduct-type isocyanate compound having three or more functional groups can be synthesized by reacting a compound, which will be described later, having three or more active hydrogen groups in a molecule with a difunctional isocyanate compound which will be described later. In the present specification, the active hydrogen group means a hydroxyl group, a primary amino group, a secondary amino group, or a mercapto group.

The adduct-type tri- or higher functional isocyanate compound can be obtained by, for example, heating (50° C. to 100° C.) a compound having three or more active hydrogen groups in a molecule and a difunctional isocyanate compound in an organic solvent while stirring, or by stirring the above compounds at a low temperature (0° C. to 70° C.) while adding a catalyst such as stannous octanoate thereto (Synthesis Scheme 1 shown below).

Generally, in regard to the number of moles (number of molecules) of the difunctional isocyanate compound reacted with the compound having three or more active hydrogen groups in a molecule, a difunctional isocyanate compound is used of which the number of moles (number of molecules) is equal to or higher than 60% of the number of moles (the equivalent number of active hydrogen groups) of the active hydrogen groups in the compound having three or more active hydrogen groups in a molecule. The number of moles of the difunctional isocyanate compound is preferably 60% to 500%, more preferably 60% to 300%, and even more preferably 80% to 200% of the number of moles of the active hydrogen groups.

Synthesis Scheme 1

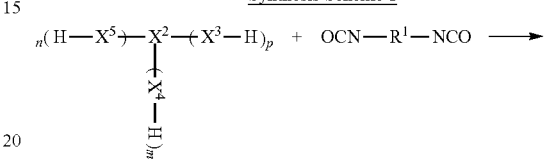

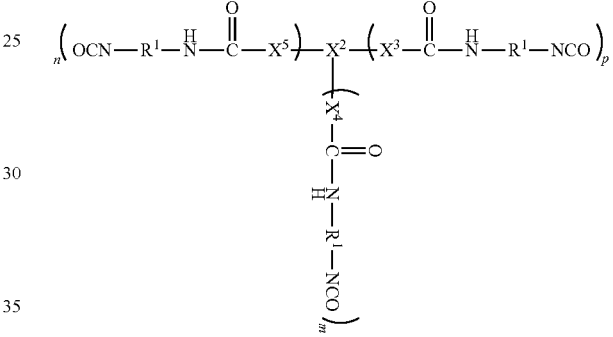

Furthermore, the adduct-type tri- or higher functional isocyanate compound can also be obtained by synthesizing an adduct (a prepolymer; "(PP)" shown in the synthesis scheme below) of a compound having two active hydrogen groups in a molecule and a difunctional isocyanate compound and then allowing the prepolymer to react with a compound having three or more active hydrogen groups in a molecule (Synthesis Scheme 2 shown below).

--Synthesis Scheme 2--

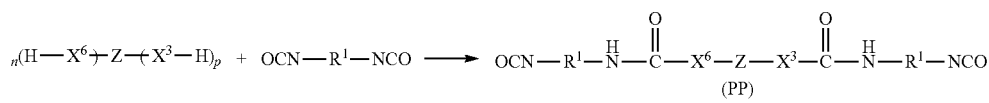

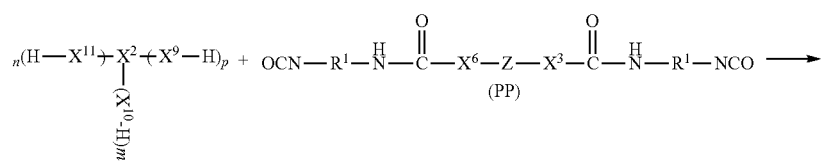

-continued

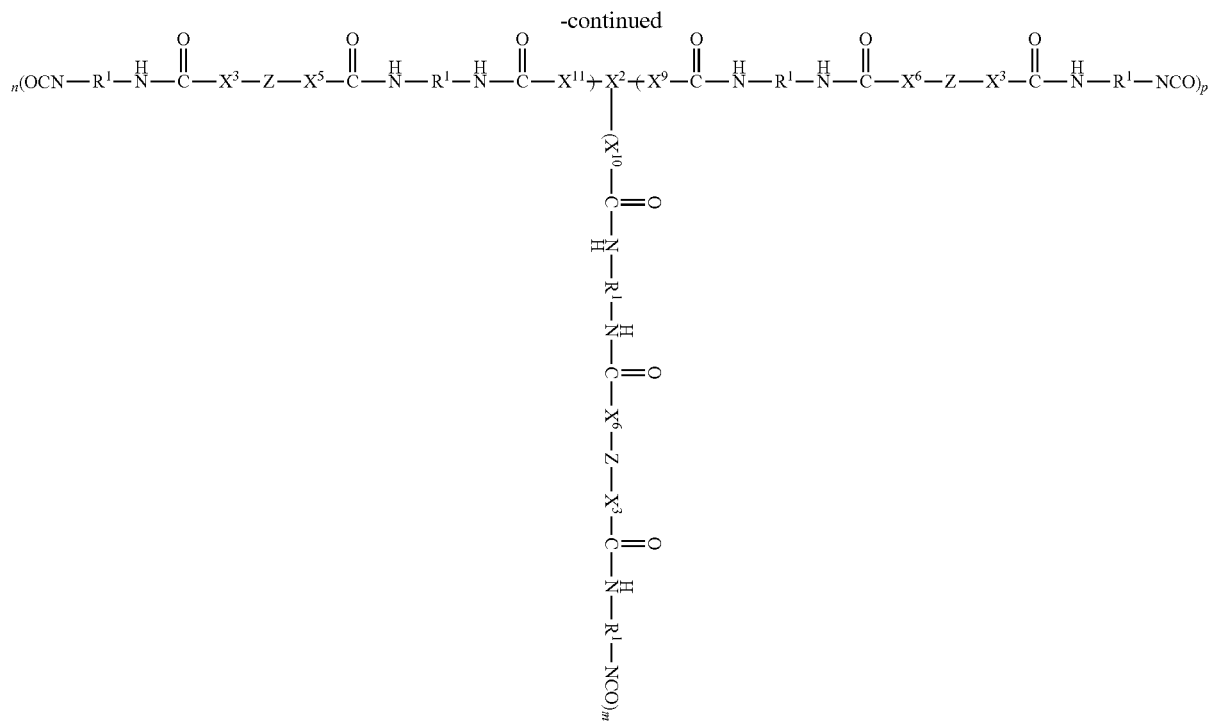

Examples of the difunctional isocyanate compound include a difunctional aromatic isocyanate compound, a difunctional aliphatic isocyanate compound, and the like.

Specific examples of the difunctional isocyanate compound include isophorone diisocyanate (IPDI), m-phenylene diisocyanate, p-phenylene diisocyanate, 2,6-tolylene diisocyanate, 2,4-tolylene diisocyanate (TDI), naphthalene-1,4-diisocyanate, diphenylmethane-4,4'-diisocyanate (MDI), 3,3'-dimethoxy-biphenyl diisocyanate, 3,3'-dimethyldiphenylmethane-4,4'-diisocyanate, m-xylylene diisocyanate (XDI), p-xylylene diisocyanate, 4-chloroxylylene-1,3-diisocyanate, 2-methylxylylene-1,3-diisocyanate, 4,4'-diphenylpropane diisocyanate, 4,4'-diphenylhexafluoropropane diisocyanate, trimethylene diisocyanate, hexamethylene diisocyanate (HDI), propylene-1,2-diisocyanate, butylene-1,2-diisocyanate, cyclohexylene-1,2-diisocyanate, cyclohexylene-1,3-diisocyanate, cyclohexylene-1,4-diisocyanate, dicyclohexylmethane-4,4'-diisocyanate, 1,4-bis(isocyanatomethyl)cyclohexane, 1,3-bis(isocyanatomethyl)cyclohexane (HXDI), norbomrnene diisocyanate (NBDI), trimethylhexamethylene diisocyanate (TMHDI), lysine diisocyanate, 1,3-bis(2-isocyanato-2-propyl)benzene, and the like.

Among these difunctional isocyanate compounds, compounds having structures represented by (I-1) to (I-24) shown below are preferable.

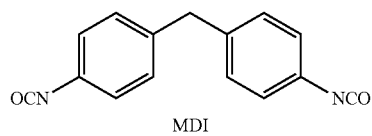
(I-1)

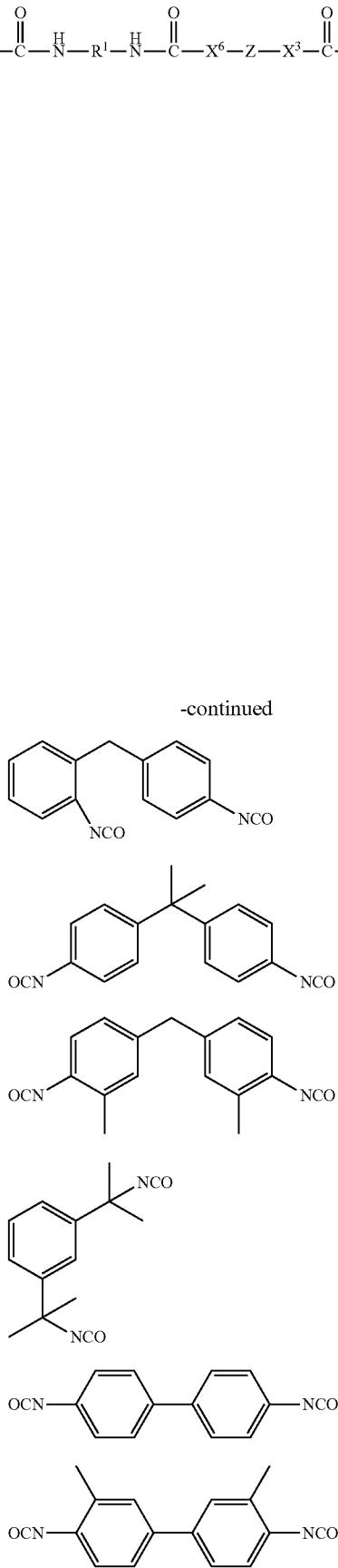

-continued

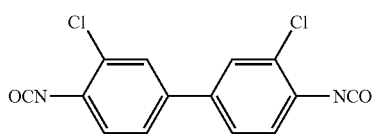
(I-8)

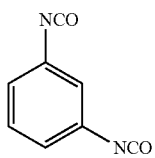
(I-9)

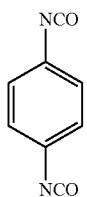
(I-10)

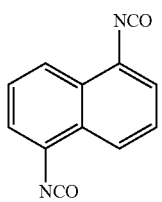
(I-11)

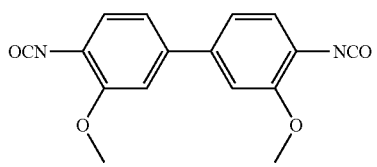
(I-12)

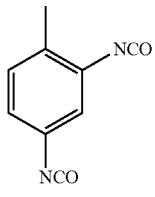

TDI
(I-13)      TDI
            (I-14)

One or a mixture of these structures

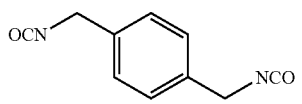
(I-15)

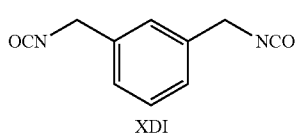
(I-16)

XDI

-continued

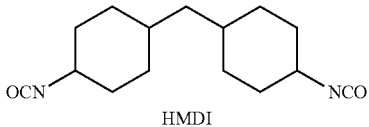
HMDI
(I-17)

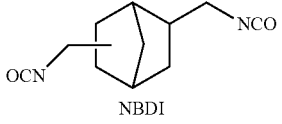
NBDI
(I-18)

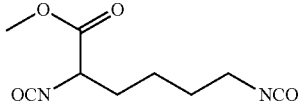
(I-19)

(I-20)

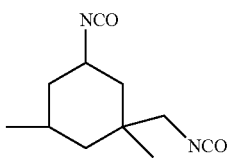
IPDI

HXDI
(I-21)

(I-22)      (I-23)

One or a mixture of these structures
TMHDI

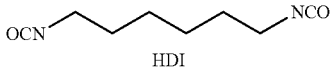
HDI
(I-24)

Among the difunctional isocyanate compounds, at least one selected from isophorone diisocyanate (IPDI), hexamethylene diisocyanate (HDI), trimethylhexamethylene diisocyanate (TMHDI), 1,3-bis(isocyanatomethyl)cyclohexane (HXDI), m-xylylene diisocyanate (XDI), and dicyclohexylmethane-4,4'-diisocyanate (HMDI) is preferable.

In addition, as the difunctional isocyanate compound, difunctional isocyanate compounds derived from the above compounds can also be used. Examples thereof include DURANATE (registered trademark) D101, D201, A101 (manufactured by Asahi Kasei Corporation) and the like.

The compound having three or more active hydrogen groups in a molecule is a compound having three or more groups, each of which is at least one kind of group selected from a hydroxyl group, a primary amino group, a secondary amino group, and a mercapto group, in a molecule. Examples of the compound include compounds having structures represented by (H-1) to (H-13) shown below. n in the compounds (H-4), (H-5), and (H-11) represents an integer selected from 1 to 100, for example.

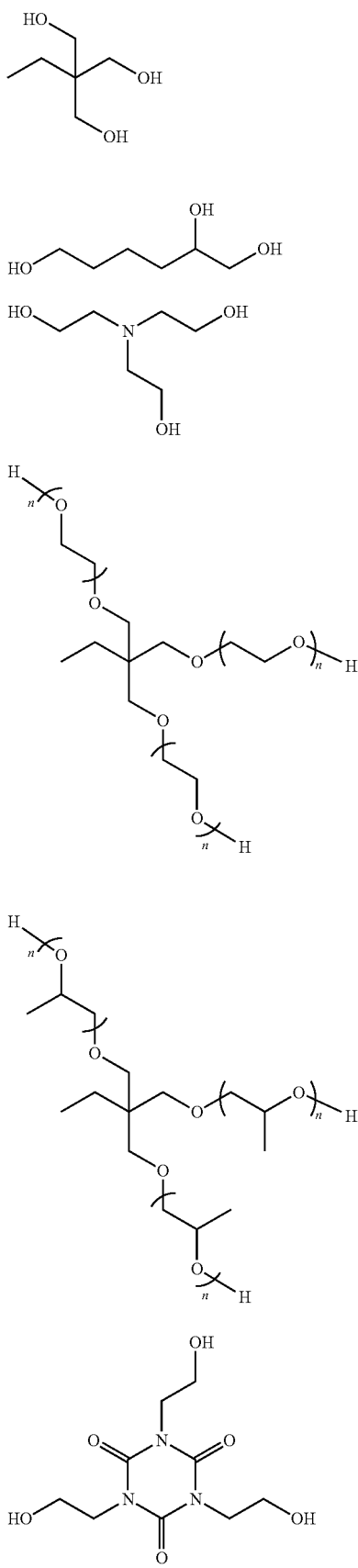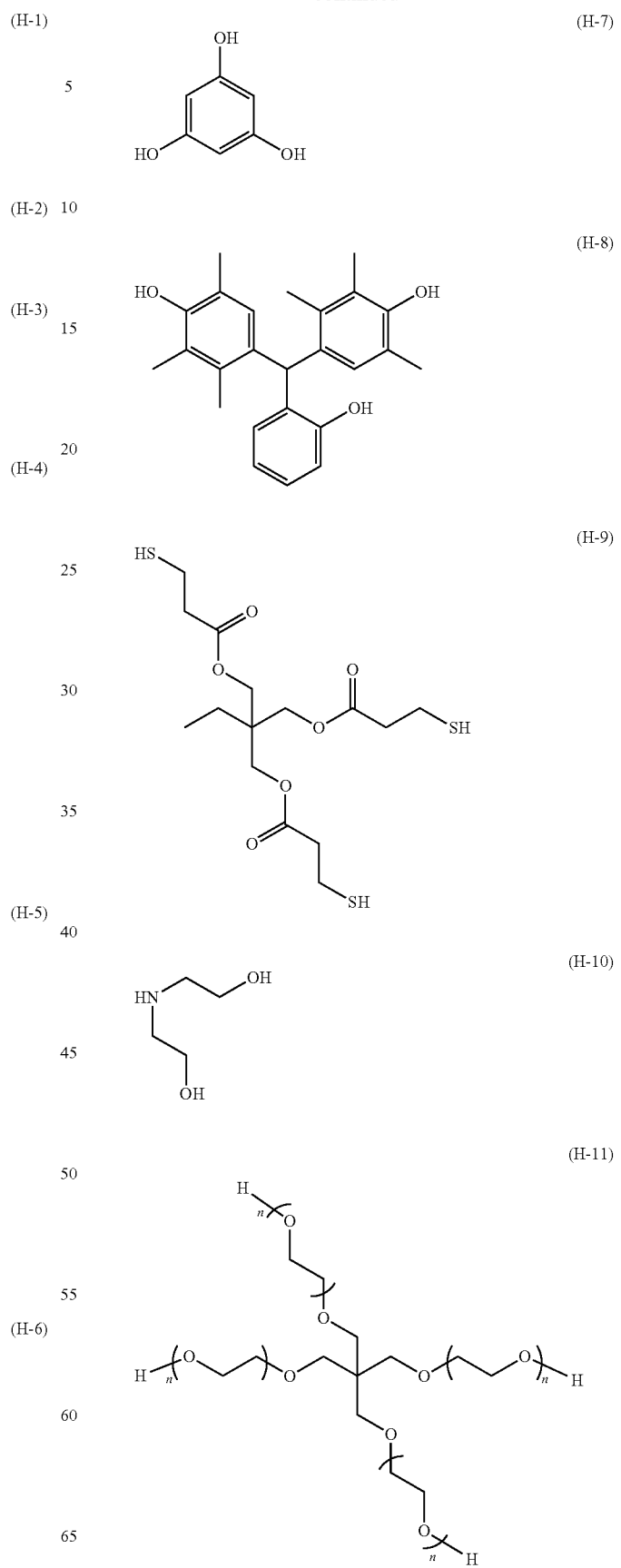

(H-12)

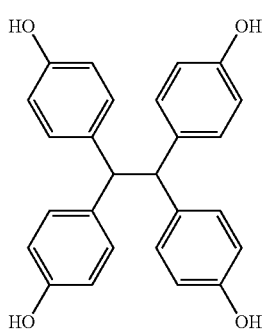

(H-13)

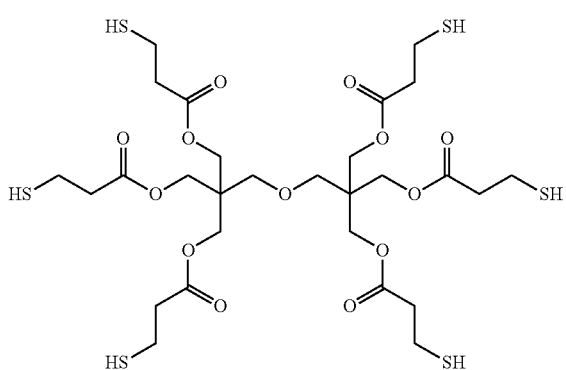

As the adduct-type tri- or higher functional isocyanate compound, a commercially available product on the market may be used.

Examples of the commercially available product include TAKENATE (registered trademark) D-102, D-103, D-103H, D-103M2, P49-75S, D-110, D-120N, D-140N, and D-160N (manufactured by Mitsui Chemicals, Inc.), DESMODUR (registered trademark) L75 and UL57SP (manufactured by Sumika Bayer Urethane Co., Ltd.), CORONATE (registered trademark) HL, HX, and L (manufactured by Nippon Polyurethane Industry Co., Ltd.), P301-75E (manufactured by Asahi Kasei Corporation.), and the like.

Among these adduct-type tri- or higher functional isocyanate compounds, at least one kind selected from D-110, D-120N, D-140N, and D-160N (manufactured by Mitsui Chemicals, Inc.) is more preferable.

—Biuret Type or Isocyanurate Type—

As the isocyanurate-type tri- or higher functional isocyanate compound, a compound represented by Formula (11C) is preferable.

As the biuret-type tri- or higher functional isocyanate compound, a compound represented by Formula (11D) is preferable.

Formula (11C)

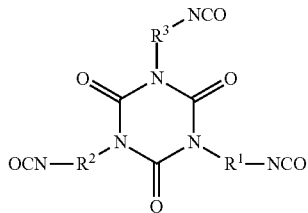

Formula (11D)

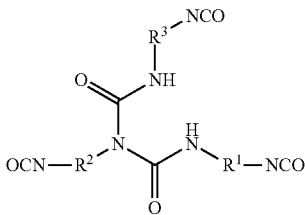

In Formula (11C) and Formula (11D), $R^1$, $R^2$, and $R^3$ each independently represent a divalent organic group.

In Formula (11C) and Formula (11D), $R^1$, $R^2$, and $R^3$ each independently preferably represent an alkylene group having 1 to 20 carbon atoms which may have a substituent, a cycloalkylene group having 1 to 20 carbon atoms which may have a substituent, or an arylene group having 1 to 20 carbon atoms which may have a substituent.

In Formula (11C) and Formula (11D), $R^1$, $R^2$, and $R^3$ each independently particularly preferably represent a group selected from the groups represented by (R-1) to (R-20) described above.

In Formula (11C) and Formula (11D), $R^1$ to $R^3$ each independently more preferably represent any one of the group (R-3) derived from isophorone diisocyanate (IPDI), the group (R-7) derived from hexamethylene diisocyanate (HDI), the group (R-5) derived from trimethylhexamethylene diisocyanate (TMHDI), the group (R-9) derived from m-xylylene diisocyanate (XDI), the group (R-1) derived from 1,3-bis(isocyanatomethyl)cyclohexane, and the group (R-2) derived from dicyclohexylmethane 4,4'-diisocyanate.

As the biuret-type tri- or higher functional isocyanate compound, a commercially available product on the market may be used. Examples of the commercially available product include TAKENATE (registered trademark) D-165N and NP 1100 (manufactured by Mitsui Chemicals, Inc.), DESMODUR (registered trademark) N3200 (Sumika Bayer Urethane Co., Ltd.), DURANATE (registered trademark) 24A-100 (manufactured by Asahi Kasei Corporation.), and the like.

In addition, as the isocyanurate-type tri- or higher functional isocyanate compound, a commercially available product on the market may be used. Examples of the commercially available product include TAKENATE (registered trademark) D-127, D-170N, D-170HN, D-172N, and D-177N (manufactured by Mitsui Chemicals, Inc.), SUMIDUR N3300, DESMODUR (registered trademark) N3600, N3900, and Z4470BA (manufactured by Sumika Bayer Urethane Co., Ltd.), CORONATE (registered trademark) HX and HK (manufactured by Nippon Polyurethane Industry Co., Ltd.), DURANATE (registered trademark) TPA-100, TKA-100, TSA-100, TSS-100, TLA-100, and TSE-100 (manufactured by Asahi Kasei Corporation.), and the like.

Among these tri- or higher functional isocyanate compounds of the biuret-type and the isocyanurate-type, Duranate (registered trademark) 24A-100 (manufactured by Asahi Kasei Corporation.), D-120N and D-127 (manufactured by Mitsui Chemicals, Inc.), TKA-100, TSS-100, and TSE-100 (manufactured by Asahi Kasei Corporation.) are more preferable.

(Water or Compound Having Two or More Active Hydrogen Groups)

The shell of the microcapsule is formed by allowing a reaction between the aforementioned tri- or higher functional isocyanate compound with water or a compound having two or more active hydrogen groups.

As a compound to be reacted with the tri- or higher functional isocyanate compound, generally, water can be used. By allowing the tri- or higher functional isocyanate compound to react with water, a three-dimensional cross-linked structure having a urea bond is formed.

In addition, examples of the compound to be reacted with the tri- or higher functional isocyanate compound includes, other than water, a compound having two or more active hydrogen group. Examples of the compound having two or more active hydrogen groups include a compound having a hydroxy group (—OH), an amino group (—NH), and a thiol group (—SH) in the molecule, and the like. Specific examples thereof include a polyfunctional alcohol, a polyfunctional phenol, a polyfunctional amine having a hydrogen atom on a nitrogen atom, a polyfunctional thiol, and the like.

By reacting the isocyanate compound having three or more functional groups with a polyfunctional alcohol or a polyfunctional phenol, a three-dimensional cross-linked structure having a urethane bond is formed.

By reacting the isocyanate compound having three or more functional groups with a polyfunctional amine having a hydrogen atom on a nitrogen atom, a three-dimensional cross-linked structure having a urea bond is formed.

Specific examples of the polyfunctional alcohol include propylene glycol, glycerin, trimethylolpropane, 4,4',4"-trihydroxytriphenylmethane, and the like.

Specific examples of the polyfunctional amine include diethylene triamine, tetraethylene pentamine, lysine, and the like.

Specific examples of the polyfunctional thiol include 1,3-propanedithiol, 1,2-ethanedithiol, and the like.

Specific examples of the polyfunctional phenol include bisphenol A and the like.

One kind of these compounds may be used alone, or two or more kinds thereof may be used in combination.

The compound having two or more active hydrogen groups also includes the aforementioned compound having three or more active hydrogen groups in the molecule.

—Hydrophilic Group Capable of Being Contained in Shell—

The shell of the microcapsule preferably has at least one hydrophilic group.

In a case where the shell has the hydrophilic group, dispersibility in an aqueous medium is further improved. Therefore, in a case where the microcapsule is used for ink, jetting property and dispersion stability of an ink composition can be further improved.

In addition, in a case where the microcapsule has the hydrophilic group in the shell, hydrophilicity of the microcapsule is improved, and therefore redispersibility becomes excellent.

The hydrophilic group is present in the shell as a part of the three-dimensional cross-linked structure.

Herein, "hydrophilic group is present as a part of the three-dimensional cross-linked structure" means that a covalent bond is formed between the hydrophilic group and a portion of the three-dimensional cross-linked structure other than the hydrophilic group.

A covalent bond between the hydrophilic group and a portion other than the hydrophilic group of the three-dimensional cross-linked structure is preferably a urethane bond or a urea bond, and is more preferably a urea bond.

Examples of the hydrophilic group capable of being present in the shell include an anionic group, a nonionic group, and the like. More specific examples thereof include a carboxylic acid group, a salt of a carboxylic acid group, a phosphonic acid group, a salt of a phosphonic acid group, a phosphate ester group, a salt of a phosphate ester group, a phosphoric acid group, a salt of a phosphoric acid group, a sulfonic acid group, a salt of a sulfonic acid group, a sulfuric acid group, a salt of a sulfuric acid group, a group having a polyether structure (for example, polyethylene oxide, polypropylene oxide, and the like), a group having a betaine structure, an ammonium group, a sulfonium group, a phosphonium group, and the like. In the present specification, "hydrophilic group" is distinguished from the above-described active hydrogen group (a hydroxyl group, a primary amino group, a secondary amino group, and a mercapto group). The salt of a carboxylic acid group, the salt of a sulfonic acid group, the salt of a sulfuric acid group, the salt of a phosphonic acid group, and the salt of phosphoric acid group described above may be the salts formed by neutralization in the process of manufacturing the microcapsule. The shell of the microcapsule may have only one kind of the hydrophilic group or may have two or more kinds thereof.

The hydrophilic group capable of being introduced into the shell is preferably at least one kind selected from a group having a polyether structure, a carboxylic acid group, and a salt of a carboxylic acid group.

A method for introducing the hydrophilic group into the shell of the microcapsule will be described.

The introduction of a hydrophilic group into the shell can be performed by allowing a reaction between the aforementioned tri- or higher functional isocyanate compound, water or a compound having two or more active hydrogen groups, and a compound having a hydrophilic group.

In addition, the introduction of the hydrophilic group into the shell of the microcapsule can be carried out as follows. First, a difunctional isocyanate compound is allowed to react with a compound having a hydrophilic group so as to produce an isocyanate compound into which the hydrophilic group is introduced, next, "the isocyanate compound into which the hydrophilic group is introduced" is allowed to react with a compound having two or more active hydrogen groups so as to produce a tri- or higher functional isocyanate compound into which the hydrophilic group is introduced, and next, "the tri- or higher functional isocyanate compound into which the hydrophilic group is introduced" is allowed to react with water or a compound having two or more active hydrogen groups.

—Compound Having Hydrophilic Group—

Examples of the compound having the hydrophilic group include amino acids such as α-amino acids (specifically, lysine, alanine, arginine, asparagine, aspartic acid, cysteine, glutamine, glutamic acid, glycine, histidine, isoleucine, leucine, methionine, phenylalanine, proline, serine, threonine, tryptophan, tyrosine, and valine). Specific examples of the compound having the hydrophilic group, other than α-amino acid are as below.

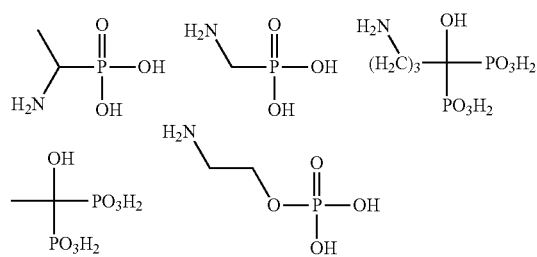

-continued

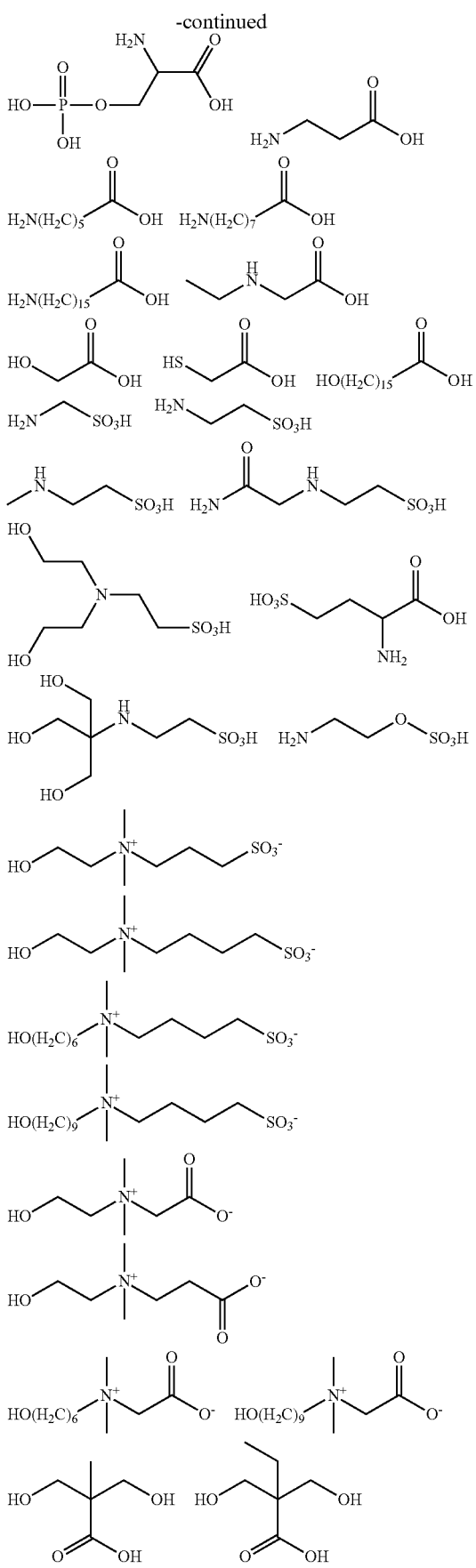

In a case where the compound having the anionic group is used as the compound having the hydrophilic group, the compound having the anionic group may be used by neutralizing at least some of the anionic group by using an inorganic base such as sodium hydroxide or potassium hydroxide; an organic base such as triethylamine, or the like.

Among the compound having the hydrophilic group, as a compound having a nonionic group, a compound having a polyether structure is preferable, and a compound having a polyoxyalkylene chain is more preferable.

Specific examples of the compound having a polyoxyalkylene chain include polyethylene oxide, polypropylene oxide, polytetramethylene oxide, polystyrene oxide, polycyclohexylene oxide, a polyethylene oxide-polypropylene oxide block copolymer, a polyethylene oxide-polypropylene oxide random copolymer, and the like.

Among these compounds having a polyoxyalkylene chain, polyethylene oxide, polypropylene oxide, and a polyethylene oxide-polypropylene oxide block copolymer are preferable, and polyethylene oxide is more preferable.

Furthermore, as the compound having a polyether structure, a polyethylene oxide monoether compound (examples of the monoether include monomethyl ether, monoethyl ether, and the like) and a polyethylene oxide monoester compound (examples of the monoester include a monoacetic acid ester, a mono(meth)acrylic acid ester, and the like) are also preferable.

—Isocyanate Compound into which Hydrophilic Group is Introduced—

In addition, as described above, for introducing a hydrophilic group into the shell, an isocyanate compound into which a hydrophilic group is introduced can also be used.

The isocyanate compound into which a hydrophilic group is introduced is preferably a reaction product between a compound having a hydrophilic group, isophorone diisocyanate (IPDI), hexamethylene diisocyanate (HDI), trimethylhexamethylene diisocyanate (TMHDI), 1,3-bis(isocyanatomethyl)cyclohexane (HXDI), m-xylylene diisocyanate (XDI), or dicyclohexylmethane-4,4'-diisocyanate (HMDI).

In a case where the group having a polyether structure is introduced into the shell, as the isocyanate compound into which the hydrophilic group is introduced, an adduct (such as TAKENATE D-116N manufactured by Mitsui Chemicals, Inc.) of trimethylolpropane (TMP), m-xylylene diisocyanate (XDI), and polyethylene glycol monomethyl ether is preferable.

In a case of introducing a carboxy group or a salt thereof into the shell, as the isocyanate compound into which the hydrophilic group is introduced, it is preferable to use a reaction product (that is, isocyanate compound containing a carboxy group or a salt thereof) between 2,2-bis(hydroxymethyl)propionic acid (DMPA) or a salt of thereof and isophorone diisocyanate (IPDI).

As the salt of a carboxy group, a sodium salt, a potassium salt, a triethylamine salt, or a dimethylethanolamine salt is preferable, and a sodium salt or a triethylamine salt is more preferable.

In a case of using the compound having a hydrophilic group for introducing a hydrophilic group into the shell, an added amount of the compound having a hydrophilic group is preferably 0.1% by mass to 50% by mass, more preferably 0.1% by mass to 45% by mass, even more preferably 0.1% by mass to 40% by mass, even more preferably 1% by mass to 35% by mass, and even more preferably 3% by mass to 30% by mass, with respect to the total solid content of the microcapsule.

—Polymerizable Group Capable of Being Contained in Shell—

The microcapsule contains the polymerizable compound (that is, the compound having the polymerizable group) in the core, which means that the microcapsule has the polymerizable group, but in addition to the polymerizable group of the polymerizable compound contained in the core, the shell of the microcapsule may have the polymerizable group.

In a case where the shell of the microcapsule has the polymerizable group, the microcapsules adjacent to each other are bonded to each other by irradiation with active energy rays, and therefore an image having excellent film hardness can be formed.

A method for introducing the polymerizable group into the shell of the microcapsule will be described.

Examples of a method for introducing the polymerizable group into the shell of the microcapsule include a method in which in a case of forming the three-dimensional cross-linked structure containing at least one bond selected from a urethane bond and a urea bond, the above-described tri- or higher functional isocyanate compound, water or the above-described compound having two or more active hydrogen groups, and the monomer for introducing the polymerizable group, are allowed to react with each other;
a method in which in a case of producing the above-described tri- or higher functional isocyanate compound, first, the above-described difunctional isocyanate compound and the monomer for introducing the polymerizable group are allowed to react with each other so as to produce an isocyanate compound into which the polymerizable group is introduced, and subsequently, the isocyanate compound into which the polymerizable group is introduced is allowed to react with water or the above-described compound having two or more active hydrogen groups;
a method in which in a case of producing the microcapsule, the monomer for introducing the polymerizable group is dissolved in an oil-phase component together with the components constituting the microcapsule, and a water-phase component is mixed with the oil-phase component, followed by emulsification and dispersion; and the like.

Examples of the polymerizable compound used for introducing a polymerizable group into the microcapsule include a compound which has at least one active hydrogen group and has an ethylenically unsaturated bond on at least one terminal thereof.

The compound which has at least one active hydrogen group and has an ethylenically unsaturated bond on at least one terminal thereof can be represented by Structural Formula (a).

$$L^1Lc_mZ_n \quad \text{Formula (a)}$$

In Structural Formula (a), $L^1$ represents an (m+n)-valent linking group, m and n each independently represent an integer selected from 1 to 100, Lc represents a monovalent ethylenically unsaturated group, and Z represents an active hydrogen group.

$L^1$ is preferably an aliphatic group having a valency of 2 or higher, an aromatic group having a valency of 2 or higher, a heterocyclic group having a valency of 2 or higher, —O—, —S—, —NH—, —N<, —CO—, —SO—, —SO$_2$—, or a combination of these.

m and n each independently preferably represent 1 to 50, more preferably represent 2 to 20, even more preferably represent 3 to 10, and particularly preferably represent 3 to 5.

Examples of the monovalent ethylenically unsaturated group represented by Lc include an allyl group, a vinyl group, an acryloyl group, a methacryloyl group, and the like.

Z is preferably OH, SH, NH, or NH$_2$, more preferably OH or NH$_2$, and even more preferably OH.

Examples of the compound which has at least one active hydrogen group and has an ethylenically unsaturated bond on at least one terminal thereof will be shown below, but the present invention is not limited to the structures thereof. n in the compounds (a-3) and (a-14) represents an integer selected from 1 to 90, for example.

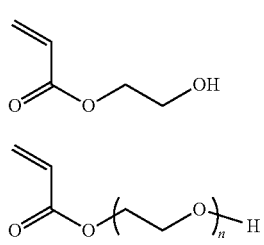

(a-1)

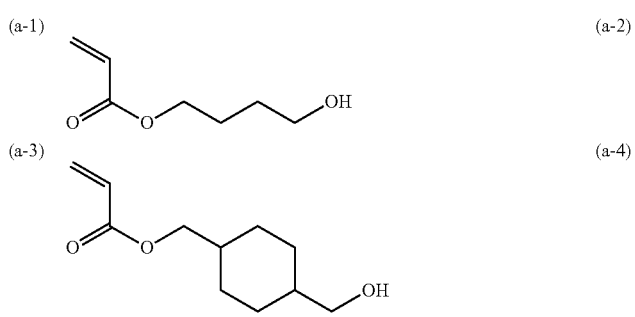

(a-2)

(a-3)

(a-4)

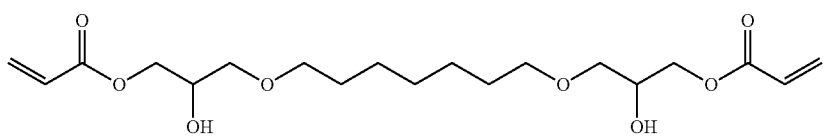

(a-5)

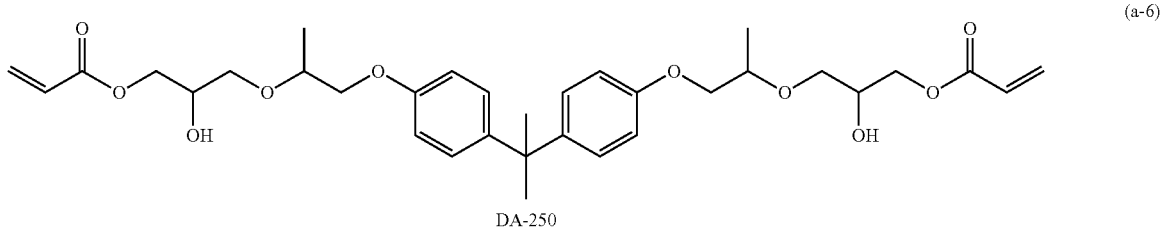

(a-6)

DA-250

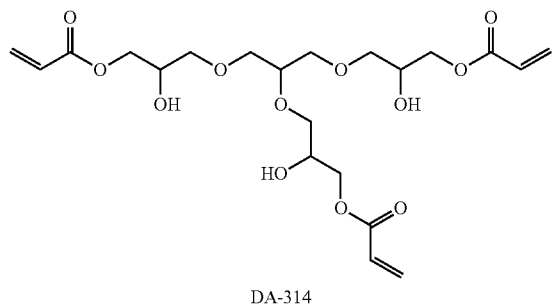
DA-314 (a-7)
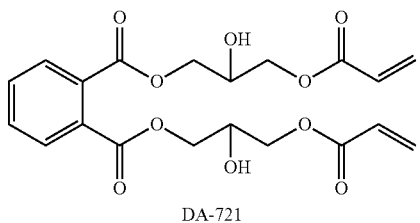
DA-721 (a-8)
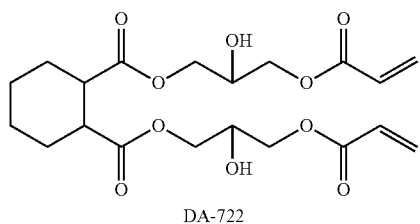
DA-722 (a-9)
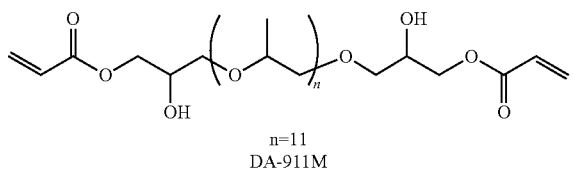
n=11
DA-911M (a-10)
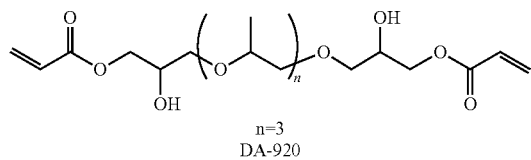
n=3
DA-920 (a-11)
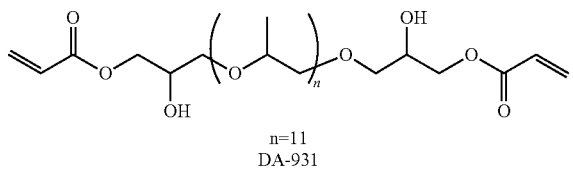
n=11
DA-931 (a-12)
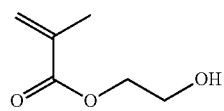
(a-13)
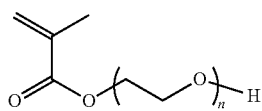
(a-14)
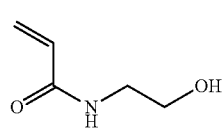
(a-15)
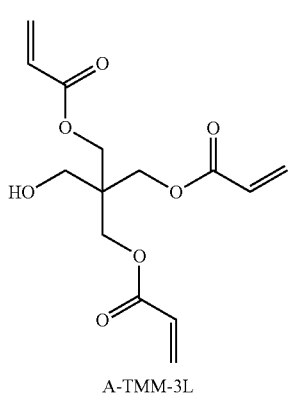
A-TMM-3L (a-16)

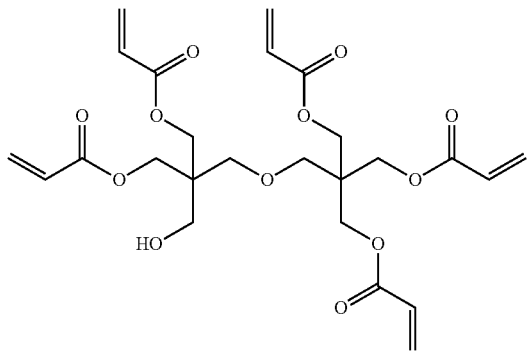

SR399E

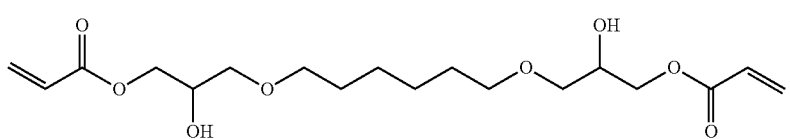

(a-17)

(a-18)

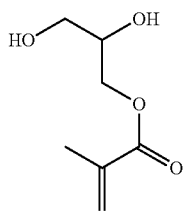

(a-19)

As the compound which has at least one active hydrogen group and has an ethylenically unsaturated bond on at least one terminal thereof, commercially available products may also be used. Examples thereof include acrylates such as hydroxyethyl acrylate (manufactured by OSAKA ORGANIC CHEMICAL INDUSTRY LTD), 4-hydroxybutyl acrylate, 1,4-cyclohexanedimethanol monoacrylate (manufactured by Nippon Kasei Chemical Co., Ltd), BLEMMER (registered trademark) AE-90U (n=2), AE-200 (n=4.5), AE-400 (n=10), AP-150 (n=3), AP-400 (n=6), AP-550 (n=9), AP-800 (n=13) (manufactured by NOF CORPORATION), and DENACOL (registered trademark) ACRYLATE DA-212, DA-250, DA-314, DA-721, DA-722, DA-911M, DA-920, DA-931 (manufactured by Nagase ChemteX Corporation), 2-hydroxyethyl methacrylate (manufactured by KYOEISHA CHEMICAL Co., LTD), methacrylates such as BLEMMER (registered trademark) PE-90 (n=2), PE-200 (n=4.5), PE-350 (n=8), PP-1000 (N=4 to 6), PP-500 (n=9), and PP-800 (n=13) (manufactured by NOF CORPORATION), A-TMM-3L (manufactured by SHIN-NAKAMURA CHEMICAL CO., LTD.), and SR-399E (manufactured by Sartomer Arkema Inc.), acrylamide (manufactured by KJ Chemicals Corporation), and the like.

Among these compounds which have at least one active hydrogen group and have an ethylenically unsaturated bond on at least one terminal thereof, hydroxyethyl acrylate (manufactured by OSAKA ORGANIC CHEMICAL INDUSTRY LTD), AE-400 (n=10), AP-400 (n=6) (manufactured by NOF CORPORATION), DENACOL (registered trademark) ACRYLATE DA-212 (manufactured by Nagase ChemteX Corporation), PP-500 (n=9) (manufactured by NOF CORPORATION), A-TMM-3L (manufactured by SHIN-NAKAMURA CHEMICAL CO., LTD.), and SR-399E (manufactured by Sartomer Arkema Inc.) are preferable.

The introduction of a polymerizable group into the microcapsule can be performed, for example, in a manner shown in Synthesis Scheme 3 described below in which an isocyanate compound into which a polymerizable group is introduced is prepared by reacting the isocyanate group of the tri- or higher functional isocyanate compound with the active hydrogen group of the compound which has at least one active hydrogen group and has an ethylenically unsaturated bond on at least one terminal thereof, and the prepared isocyanate compound into which a polymerizable group is introduced is reacted with the aforementioned compound having two or more active hydrogen groups.

-Synthesis Scheme 3-

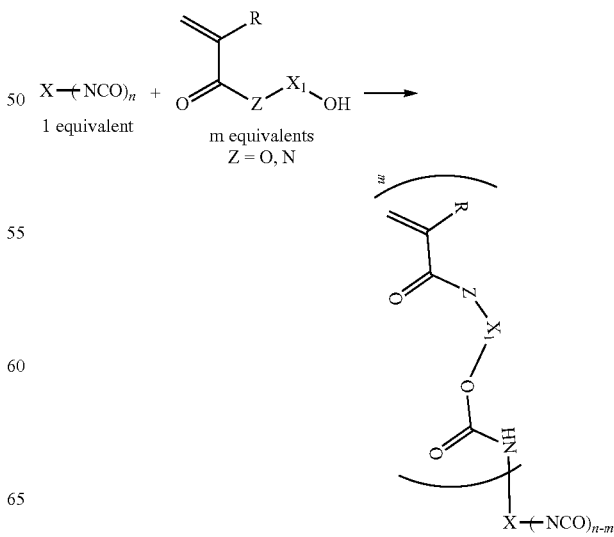

In the synthesis scheme 3, X and n are the same as X and n in Formula (I), $X_1$ represents a divalent linking group, R represents a hydrogen atom or a methyl group, and Z represents an oxygen atom (O) or a nitrogen atom (N).

One kind of monomer for introducing a polymerizable group may be used alone, or two or more kinds thereof may be used in combination.

At the time of manufacturing the isocyanate compound into which a polymerizable group is introduced, the polyisocyanate (that is, the isocyanate compound having three or more functional groups) and the polymerizable group-introduced monomer are reacted with each other, such that the number of moles of the active hydrogen group of the polymerizable group-introduced monomer preferably becomes 1% to 30% (more preferably becomes 2% to 25% and even more preferably becomes 3% to 20%) of the number of moles of the isocyanate group of the polyisocyanate.

In the isocyanate compound into which a polymerizable group is introduced, the average number of functional groups of the isocyanate group is equal to or smaller than 3 in some cases. However, even in these cases, as long as the raw materials for forming the shell contain at least one tri- or higher functional isocyanate compound, the shell having the three-dimensional cross-linked structure can be formed.

—Physical Properties of Microcapsule—

A volume average particle diameter of the microcapsule is preferably 0.01 µm to 10.0 µm, more preferably 0.01 µm to 5 µm, and even more preferably 0.05 µm to 1 µm, from the viewpoint of the dispersibility of the microcapsule in a case where the ink composition is adopted.

The volume average particle diameter of the microcapsule can be measured by a light scattering method. In the present specification, as the volume average particle diameter, a value measured using a wet-type particle size distribution measurement apparatus, LA-960 (manufactured by HORIBA, Ltd.) is used.

The solid content of the microcapsule is preferably contained by 1% by mass to 50% by mass, more preferably contained by 3% by mass to 40% by mass, and even more preferably contained by 5% by mass to 30% by mass with respect to the total mass of the ink composition, from the viewpoints of dispersibility and ease of film formation.

The content of the microcapsule is a value also including solid components such as the polymerizable compound contained in the core of the microcapsule, the photopolymerization initiator and the sensitizer which may be contained in the core.

The total solid content of the microcapsule is preferably 50% by mass or more, more preferably 60% by mass or more, even more preferably 70% by mass or more, and still more preferably 80% by mass or more, with respect to the total solid content of the ink composition. An upper value of the total solid content of the microcapsule is preferably 99% by mass or less, and more preferably 95% by mass or less with respect to the total solid content of the ink composition.

The term "total solid content" of the ink composition refers to a total amount from which a dispersion medium in the ink composition (water, the high boiling solvent, and the like) is excluded.

~Formation of Microcapsule~

A method for manufacturing the microcapsule is not particularly limited.

As the method for manufacturing the microcapsule, a manufacturing method of an embodiment to be described later is preferable from the above-described viewpoint of easily obtaining the microcapsule.

In one embodiment of the method for manufacturing the microcapsule, a method including a preparation step of mixing the oil-phase component containing the tri- or higher functional isocyanate compound, the polymerizable compound, and the organic solvent, with the water-phase component containing water, and emulsifying and dispersing the mixture so as to prepare an aqueous dispersion of the microcapsule, is preferable.

In the preparation step, it is preferable that the oil-phase component further contains the photopolymerization initiator, and at least one of the oil-phase component or the water-phase component contains the compound having the hydrophilic group.

—Preparation Step—

The preparation step is preferably the step of mixing the oil-phase component containing the tri- or higher functional isocyanate compound, the polymerizable compound, and the organic solvent, with the water-phase component containing water, and emulsifying and dispersing the mixture so as to prepare the aqueous dispersion of the microcapsule.

In the preparation step, it is preferable that the oil-phase component further contains the photopolymerization initiator, and at least one of the oil-phase component or the water-phase component contains the compound having the hydrophilic group.

As described above, the oil-phase component and the water-phase component are mixed so as to be emulsified and dispersed, and therefore the above-described microcapsule can be formed.

Herein, an aspect further including the photopolymerization initiator as the oil-phase component and the compound having the hydrophilic group as the water-phase component will be described.

The oil-phase component used in the preparation step contains the tri- or higher functional isocyanate compound, the polymerizable compound, the photopolymerization initiator, and the organic solvent.

The water-phase component used in the preparation step contains water and the compound having the hydrophilic group.

In the preparation step, the microcapsule including: the shell that has the hydrophilic group and the three-dimensional cross-linked structure containing at least one bond selected from a urethane bond or a urea bond; and the core that is in the interior of the shell and contains the polymerizable compound and the photopolymerization initiator, is formed. The formed microcapsule is a dispersoid in the manufactured aqueous dispersion.

Meanwhile, water in the water-phase component is a dispersion medium in manufactured the aqueous dispersion.

In more detail regarding the formation of the shell, the shell having the three-dimensional cross-linked structure containing a urea bond is formed by a reaction between a tri- or higher functional isocyanate compound and water. In addition, a case where the tri- or higher functional isocyanate compound contains a urethane bond (for example, a case of the tri- or higher functional isocyanate compound obtained by using a polyfunctional alcohol as raw material), means that the three-dimensional cross-linked structure of the shell contains a urethane bond.

In addition, a neutralizer is added to water phase, and a hydrophilic group of the compound having the hydrophilic group may be neutralized by the neutralizer. The compound having the hydrophilic group also relates to the reaction for forming the shell, and therefore a case in which the hydrophilic group is neutralized means that the neutralized hydrophilic group (for example, a salt of an acid group in a case where the hydrophilic group is the acid group) is introduced into the three-dimensional cross-linked structure of the shell. A salt of the neutralized hydrophilic group is excellent for the effect of dispersing the microcapsule in water. A degree of neutralization of the hydrophilic group can be adjusted according to an amount of neutralizer, and the like.

Examples of the neutralizer include sodium hydroxide, potassium hydroxide, triethanolamine, and the like.

In a case where the oil-phase component contains the isocyanate compound having the polymerizable group, the isocyanate compound having the polymerizable group also relates to the reaction for forming the shell, and therefore the polymerizable group is introduced into the shell (that is, the shell having the polymerizable group is formed).

Examples of the organic solvent contained in the oil-phase component include ethyl acetate, methyl ethyl ketone, and the like.

It is preferable that at least some of the organic solvent is removed during the formation process of the microcapsule or after the formation of the microcapsule.

The detailed description of the tri- or higher functional isocyanate compound contained in the oil-phase component is as described above.

The detailed description of the isocyanate compound having the polymerizable group, which is contained in the oil-phase component, and the polymerizable compound is as described above.

The detailed description of the photopolymerization initiator contained in the oil-phase component is as described above.

If necessary, the oil-phase component may contain other components in addition to the aforementioned components.

Examples of the other components include the above-described sensitizer, and the like.

The sensitizer can be contained in the core of the microcapsule by being incorporated into the oil-phase component.

The detailed description of the compound having the hydrophilic group, which is contained in the water-phase component is as described above.

If necessary, the water-phase component may contain other components in addition to the aforementioned components.

Examples of the other components include surfactants to be described later.

In the above-described manufacturing method, a total amount obtained by subtracting an amount of the organic solvent and the water from an amount of the oil-phase component and the water-phase component, corresponds to a total solid content of the manufactured microcapsule.

The content of the polymerizable compound in the oil-phase component is preferably 30% by mass to 75% by mass, more preferably 35% by mass to 65% by mass, and even more preferably 35% by mass to 60% by mass with respect to the above solid content.

The content of the photopolymerization initiator in the oil-phase component is preferably 0.1% by mass to 25% by mass, more preferably 0.5% by mass to 20% by mass, and even more preferably 0.5% by mass to 15% by mass with respect to the above solid content.

The ratio of the photopolymerization initiator to the polymerizable compound is preferably 0.5% by mass to 25% by mass, more preferably 1% by mass to 20% by mass, and even more preferably 5% by mass to 10% by mass on the mass basis.

The amount of the tri- or higher functional isocyanate compound in the oil-phase component is not particularly limited, and for example, is preferably 5% by mass to 50% by mass, more preferably 10% by mass to 40% by mass, and even more preferably 15% by mass to 30% by mass with respect to the above total solid content.

In a case where the oil-phase component contains a polymerizable isocyanate compound, the amount of the polymerizable compound in the oil-phase component is not particularly limited, and is preferably 0.1% by mass to 50% by mass with respect to the amount of the total solid content, for example.

The amount of the organic solvent is not particularly limited and is appropriately set according to the type and amount of the components contained in the oil-phase component and the like.

The amount of the compound having the hydrophilic group in the water-phase component is not particularly limited, and is preferably 0.01% by mass to 1% by mass with respect to the above total solid content, for example.

An amount of the neutralizer in the water-phase component is not particularly limited as long as the degree of neutralization of the hydrophilic group can be set to a desired value, and is appropriately set according to the types of the compound having the hydrophilic group, which is contained in the water-phase component, an amount, and the like.

The amount of water is not particularly limited, and is appropriately selected according to the type and amount of the components contained in the oil-phase component and the like.

The components contained in the oil-phase component need to be simply mixed together. All of the components may be mixed together at the same time, or the components may be mixed together by being divided into several groups.

A case of each component contained in the water-phase component is similar to the case of the oil-phase component, and as long as each component is mixed, all components may be mixed at once, or each component may be divided so as to be mixed separately.

The method for mixing the oil-phase component with the water-phase component is not particularly limited, and examples thereof include mixing by stirring.

A method for emulsifying the mixture obtained by mixing is not particularly limited and examples thereof include emulsification by an emulsification device (for example, a disperser and the like) such as a homogenizer.

The rotation speed of the disperser used for the emulsification is 5,000 rpm to 20,000 rpm for example, and preferably 10,000 rpm to 15,000 rpm.

The rotation time during the emulsification is 1 minute to 120 minutes for example, preferably 3 minutes to 60 minutes, more preferably 3 minutes to 30 minutes, and even more preferably 5 minutes to 15 minutes.

The emulsification during the preparation step may be carried out while heating.

By carrying out the emulsification while heating, the reaction for forming the microcapsule by the emulsification can further effectively proceed. In addition, by carrying out the emulsification while heating, at least some of the organic solvent contained as the oil-phase component can be easily removed from the mixture.

The heating temperature in the case of carrying out the emulsification while heating (that is, reaction temperature) is preferably 35° C. to 70° C. and more preferably 40° C. to 60° C.

In addition, the preparation step may have an emulsification stage of emulsifying a mixture (at a temperature of lower than 35° C., for example), and a heating stage of heating the emulsion obtained in the emulsification stage (at a temperature of 35° C. or higher, for example).

According to the aspect in which the preparation step has the emulsification stage and the heating stage, the shell having more firm three-dimensional cross-linked structure is formed, and therefore it is possible to produce the aqueous dispersion by which a film having excellent hardness can be formed.

In the aspect in which the preparation step has the emulsification stage and the heating stage, preferable ranges of a heating temperature and a heating time in the heating stage are respectively the same as preferable ranges of a heating temperature and a heating time in a case of carrying out the emulsification while heating.

In addition to the above-described manufacturing method of the above-described embodiment (hereinafter, will also be referred to as "the manufacturing method of the first embodiment"), the aqueous dispersion of the microcapsule can be manufactured by methods (2) to (4), for example.

(2) A manufacturing method including a preparation step of mixing the oil-phase component containing the tri- or higher functional isocyanate compound, the polymerizable compound, the photopolymerization initiator, the compound having the hydrophilic group, the neutralizer, and the organic solvent, with the water-phase component containing water, and emulsifying and dispersing the mixture so as to prepare an aqueous dispersion (hereinafter, will also be referred to as "the manufacturing method of the second embodiment"), (3) A manufacturing method including a preparation step of mixing the oil-phase component containing the tri- or higher functional isocyanate compound, the polymerizable compound, the photopolymerization initiator, the compound having the hydrophilic group, and the organic solvent, with the water-phase component containing water and the neutralizer, and emulsifying and dispersing the mixture so as to prepare an aqueous dispersion (hereinafter, will also be referred to as "the manufacturing method of the third embodiment"), and (4) A manufacturing method including a preparation step of mixing the oil-phase component containing the tri- or higher functional isocyanate compound, the polymerizable compound, the photopolymerization initiator, the neutralizer, and the organic solvent, with the water-phase component containing water and the compound having the hydrophilic group, and emulsifying and dispersing the mixture so as to prepare an aqueous dispersion (hereinafter, will also be referred to as "the manufacturing method of the fourth embodiment").

In any one of the manufacturing methods of the above-described second to fourth embodiments, in the preparation step, as same as the case of the manufacturing method of the first embodiment, the oil-phase component is mixed with the water-phase component, the obtained mixture is emulsified and dispersed, and thereby forming the microcapsule including the shell having the three-dimensional cross-linked structure containing the hydrophilic group and at least one bond selected from a urethane bond or a urea bond, and including the core that is in the interior of the shell and contains the polymerizable compound and the photopolymerization initiator. The formed microcapsule is a dispersoid in the manufactured aqueous dispersion, and water in the water-phase component is a dispersion medium in the manufactured aqueous dispersion.

In the production methods of the second and third embodiments, the amount of the compound having the hydrophilic group in the oil-phase component is not particularly limited, and for example, is preferably 0.01% by mass to 1% by mass with respect to the above total solid content.

In the production methods of the fourth embodiments, the amount of the compound having the hydrophilic group in the water-phase component is not particularly limited, and for example, is preferably 0.01% by mass to 1% by mass with respect to the above total solid content.

In the production methods of the second and fourth embodiments, an amount of the neutralizer in the oil-phase component or the water-phase component is not particularly limited as long as the degree of neutralization of the hydrophilic group can be set to a desired value, and is appropriately set according to the types of the compound having the hydrophilic group, which is contained in the oil-phase component or the water-phase component, an amount, and the like. The same applies to an amount of the neutralizer in the water-phase component in the production method of the third embodiment.

—Other Steps—

The method for manufacturing the microcapsule of the above-described embodiment may include steps other than the preparation step as necessary.

Examples of the other steps include a step of adding other components.

The other components to be added include components to be described later as other components that can be contained in the ink composition.

(Water)

The ink composition contains water.

A content of water is not particularly limited, but is preferably 30% by mass to 99% by mass, more preferably 40% by mass to 95% by mass, and even more preferably 50% by mass to 90% by mass.

(Photopolymerization Initiator Capable of Being Contained in the Exterior of Microcapsule)

The ink composition may contain the photopolymerization initiator in the exterior of the microcapsule.

The ink composition containing the photopolymerization initiator in the exterior of the microcapsule makes effective improvement of a polymerization reaction between the microcapsules possible, and therefore the film having further strong film hardness can be formed. Furthermore, in the case where the ink composition is irradiated with the active energy rays (light), the polymerization reaction proceeds with high efficiency even with respect to active energy rays (light) having low exposure illuminance (for example, 40 mJ/cm$^2$ to 70 mJ/cm$^2$).

Examples of the photopolymerization initiator capable of being contained in the exterior of the microcapsule include the same photopolymerization initiator as described above (that is, the photopolymerization initiator that may be contained in the interior of the microcapsule).

As the photopolymerization initiator capable of being contained in the exterior of the microcapsule, a water-soluble or water-dispersible photopolymerization initiator is preferable. From this viewpoint, examples thereof include DAROCUR (registered trademark) 1173, IRGACURE (registered trademark) 2959, IRGACURE (registered trademark) 754, DAROCUR (registered trademark) MBF, IRGACURE (registered trademark) 819DW, and IRGACURE (registered trademark) 500 (all of which are manufactured by BASF SE), the acylphosphine oxide compound described in WO2014/095724A, the photopolymerization initiator described in WO86/05778A, and the like.

The term "water-soluble" refers to a property in which in a case where the resin is dried for 2 hours at 105° C., the amount of the resin dissolving in 100 g of distilled water having a temperature of 25° C. exceeds 1 g.

Furthermore, the term "water-dispersible" refers to a property in which the resin is water-insoluble but is dispersed in water. The term "water-insoluble" herein refers to a property in which in a case where the resin is dried for 2 hours at 105° C., the amount of the resin dissolving in 100 g of distilled water having a temperature of 25° C. is equal to or smaller than 1 g.

(Sensitizer Capable of Being Contained in the Exterior of Microcapsule)

The ink composition may contain the sensitizer in the exterior of the microcapsule.

In a case where the ink composition contains the sensitizer in the exterior of the microcapsule, the decomposition of the photopolymerization initiator by the irradiation with active energy rays can be further accelerated.

Examples of the sensitizer capable of being contained in the exterior of the microcapsule include the same sensitizer as described above (that is, the sensitizer that may be contained in the interior of the microcapsule).

(Other Additives)

If necessary, the ink composition may contain other components in addition to the components described above. Hereinafter, the other components will be described below.

—Surfactant—

The ink composition may contain a surfactant. The surfactant used in the ink composition is distinguished from a surfactant used in a case of manufacturing the microcapsule.

Examples of the surfactant include a nonionic surfactant, a cationic surfactant, an anionic surfactant, and the like, all of which may be used as the surfactant. It is preferable that a content of the anionic surfactant is 1% by mass or less with respect to the total mass of the ink composition.

In the case where the content of the anionic surfactant is 1% by mass or less in the ink composition, aggregation of the colorant in the ink composition is suppressed and the jetting properties of the ink composition become excellent. From the same viewpoint thereof, the content of anionic surfactant is preferably 0.5% by mass or less, more preferably 0.1% by mass or less, and even more preferably 0% by mass (that is, not containing anionic surfactant).

Examples of the surfactant include a higher fatty acid salt, alkyl sulfate, alkyl ester sulfate, alkyl sulfonate, alkylbenzene sulfonate, sulfosuccinate, naphthalene sulfonate, alkyl phosphate, polyoxyalkylene alkyl ether phosphate, polyoxyalkylene alkyl phenyl ether, polyoxyethylene polyoxypropylene glycol, glycerin ester, sorbitan ester, polyoxyethylene fatty acid amide, amine oxide, and the like.

From the viewpoint of the dispersibility of the microcapsule, the surfactant is preferably alkyl sulfate having an alkyl chain length of 8 to 18, more preferably at least one kind of surfactant selected from sodium dodecyl sulfate (SDS, alkyl chain length: 12) and sodium cetyl sulfate (SCS, alkyl chain length: 16), and even more preferably sodium cetyl sulfate (SCS).

In addition, examples of surfactants other than the above-described surfactant include those described in JP1987-173463A (JP-S62-173463A) and JP1987-183457A (JP-S62-183457A). Examples of other surfactants include nonionic surfactants such as polyoxyethylene alkyl ethers, polyoxyethylene alkyl allyl ethers, acetylene glycols, polyoxyethylene/polyoxypropylene block copolymers, and siloxanes.

In addition, examples of the surfactant include an organic fluoro compound.

The organic fluoro compound is preferably hydrophobic. Examples of the organic fluoro compound include a fluorine-based surfactant, an oil-like fluorine-based compound (for example, fluorine oil), a solid-like fluorine compound resin (for example tetrafluoroethylene resin), and those described in JP1982-9053B (JP-S57-9053B) (the eighth column to the seventeenth column) and JP1987-135826A (JP-S62-135826A).

—Polymerization Inhibitor—

From the viewpoint of increasing storage stability, a polymerization inhibitor may be added. Examples of the polymerization inhibitor include p-methoxyphenol, quinones such as hydroquinone and methoxybenzoquinone, phenothiazine, catechols, alkyl phenols, alkyl bisphenols, zinc dimethyldithiocarbamate, copper dimethyldithiocarbamate, copper dibutyldithiocarbamate, copper salicylate, thiodipropionic acid esters, mercaptobenzimidazole, phosphites, and the like, and p-methoxyphenol, catechols, and quinones are preferable, and hydroquinone, benzoquinone, p-methoxyphenol, TEMPO, TEMPOL, cupferron A1, tris(N-nitroso-N-phenylhydroxylamine)aluminum salt, and the like are particularly preferable.

—Ultraviolet Absorber—

An ultraviolet absorber may be used in the ink composition from the viewpoints of improving weather fastness of the obtained image and preventing fading.

Examples of the ultraviolet absorber include known ultraviolet absorbers such as a benzotriazole-based compound, a benzophenone-based compound, a triazine-based compound, a benzoxazole-based compound, and the like.

—Preferable Physical Properties of Ink Composition—

In a case where the liquid temperature of the ink composition set to 25° C. to 50° C., the viscosity thereof is preferably 50 mPa·s or less, more preferably 3 mPa·s to 15 mPa·s, and even more preferably 3 mPa·s to 13 mPa·s. Particularly, as the ink composition, it is preferable that the viscosity of the liquid at 25° C. is 50 mPa·s or less. In a case where the viscosity of the liquid is within the above range, in a case of adopting the aqueous dispersion for ink jet recording, a high level of jetting stability can be realized.

As the viscosity of the ink composition, a value measured using a viscometer (VISCOMETER TV-22, manufactured by TOKI SANGYO CO., LTD) is used.

[Substrate]

The substrate is preferably a non-permeable substrate from the viewpoint that the effect of the ink jet recording method of the present disclosure becomes more remarkable.

The term "non-permeable" of the non-permeable substrate means that absorption of water contained in the ink composition is small or there is no absorption, and specifically means that an absorption amount of water is 0.3 g/m$^2$ or less.

The absorption amount of water of the substrate is obtained by maintaining a state, at 25° C. for 1 minute, where an area with size of 100 mm×100 mm on an image recording surface of the non-permeable substrate comes into contact with water, obtaining a mass of absorbed water, and calculating an absorption amount per unit area.

Examples of the substrate include a metal plate (for example, aluminum, zinc, copper, and the like), a plastic film (for example, films of a polyvinyl chloride resin, cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, polyvinyl acetal, and the like), and the like.

Among these, a nonabsorbent substrate can be suitably used as the substrate. As the nonabsorbent substrate, a plastic substrate such as polyvinyl chloride, polyethylene terephthalate, and polyethylene is preferable, a polyvinyl chloride resin substrate is more preferable, and a polyvinyl chloride resin sheet or film is even more preferable.

The ink jet recording method of the present disclosure may be used for recording an image on the substrate other than the plastic substrates.

Examples of the substrate other than the plastic substrates include a textile substrate.

Examples of a material of the textile substrate include natural fibers such as cotton, silk, hemp, wool; chemical fibers such as viscose rayon and lyocell; synthetic fibers such as polyester, polyamide, and acryl; a mixture of at least two types selected from the group consisting of the natural fibers, the chemical fibers, and the synthetic fibers; and the like.

As the textile substrate, a textile substrate disclosed in paragraphs 0039 to 0042 of WO2015/158592A may be used.

~Jetting Method~

In the ink jet recording method, an ink jet recording device to be used is not particularly limited, and a known ink jet recording device by which an intended resolution is achieved can be arbitrary selected and used. That is, any of known ink jet recording devices including commercially available products can perform jetting of the ink composition A and the ink composition B on the substrate in the image forming method.

Examples of the ink jet recording device include a device including an ink supply system, a temperature sensor, and heating means.

The ink supply system includes, for example, a base tank containing the ink composition A and the ink composition B, supply piping, an ink supply tank disposed immediately before an ink jet head, a filter, and a piezo-type ink jet head. The piezo-type ink jet head can be driven such that it can jet multi-sized dots preferably having a size of 1 pl to 100 pl and more preferably having a size of 8 pl to 30 pl, preferably at a resolution of 320 dots per inch (dpi)×320 dpi to 4,000 dpi×4,000 dots per inch (dpi), more preferably at a resolution of 400 dpi×400 dpi to 1,600 dpi×1,600 dpi, and even more preferably at a resolution of 720 dpi×720 dpi. dpi represents the number of dots per 2.54 cm (1 inch).

In the ink application step, it is desirable that the ink composition A and the ink composition B to be jetted have a constant temperature, and therefore the ink jet recording device preferable includes a means for stabilizing a temperature of the ink composition A and the ink composition B. As parts required to have a constant temperature, piping from an ink tank (intermediate tank in a case where there is the intermediate tank) to an injection surface of a nozzle, and all members are the targets thereof. That is, heat insulation and warming can be performed on parts from an ink supplying tank to an ink jet head.

A method for controlling the temperature is not particularly limited, and for example, it is preferable that a plurality of temperature sensors are provided on each of piping parts so as to control heating according to a flow rate of the ink composition A and the ink composition B and environment temperature. The temperature sensor can be provided in the vicinity of the nozzle of the ink supplying tank and the ink jet head. In addition, it is preferable that a head unit to be heated is thermally shielded or insulated so that the main device is not affected by temperature from the outside air. In order to shorten a startup time of a printer which is required for heating or to reduce the loss of thermal energy, it is preferable to perform thermal insulation from other parts and to reduce the heat capacity of the entire heating unit.

<Heating Step>

The ink jet recording method includes a step of heating the ink composition A and the ink composition B which have been jetted on the substrate.

In the heating and drying step, in the ink composition A and the ink composition B have been jetted on the substrate, water is evaporated by a heating means, and thus the concentration of the high boiling solvent in the ink composition A and the ink composition B is improved. For this reason, the zeta potential is lowered in both the ink composition A and the ink composition B, charge repulsion of the microcapsules dispersed by charge repulsion on a surface becomes weak, and thus the microcapsules aggregate. As a result, since the ink composition A and the ink composition B are thickened, the ink composition A and the ink composition B are fixed on the substrate.

In this case, since the absorbance of the ink composition A and the ink composition B and the concentration of the high boiling solvent satisfy Formula (1) and Formula (2), in the ink composition B which contains the carbon black and in which the destruction of the microcapsules due to heating is likely to occur, the microcapsules can aggregate before the destruction of the microcapsules occur. Therefore, it is possible to fix the ink composition B while suppressing a change in shape of the liquid droplet in the substrate of the ink composition B.

In regard to the heating, a method therefore is not limited as long as water can be evaporated. For example, the ink composition may be heated by being irradiated with the infrared rays, may be heated by applying hot air to the ink composition, or may be heated by placing the ink composition in a heated atmosphere, and a composition of these may be adopted. As the heating method, from the viewpoint of more remarkably exhibiting the effect of the present disclosure, it is preferable to heat the ink composition by being irradiated with the infrared rays.

The heating means is not particularly limited, and it is possible to use, for example, an infrared irradiation device (infrared lamp or the like), a heat drum, a warm air blower, a thermal oven, heat plate heating, and the like.

Among these, it is preferable to use the infrared irradiation device from the viewpoint of more remarkably exhibiting the effect of the present disclosure.

In the case of using the infrared irradiation device, a peak wavelength of the infrared rays is, for example, preferably 800 nm to 1400 nm, more preferably 800 nm to 1000 nm, and even more preferably 800 nm to 900 nm.

In the case of using the infrared irradiation device, illuminance of an exposure surface of the infrared rays is, for example, preferably, 10 mJ/cm$^2$ to 2000 mJ/cm$^2$, and more preferably 20 mJ/cm$^2$ to 1000 mJ/cm$^2$.

In the case of using the infrared irradiation device, a time from landing of the ink to the irradiation with the infrared rays is, for example, preferably 0.01 seconds to 120 seconds, and more preferably 0.01 seconds to 60 seconds.

A time for the irradiation with the infrared rays is not particularly limited. In addition, the irradiation with the infrared rays may be performed once or plural times.

The time for the irradiation with the infrared rays is preferably from 0.05 to 10 seconds, more preferably from 0.1 to 5 seconds, and even more preferably from 0.15 to 3 seconds, per one time.

In a case where the time for the irradiation with the infrared rays is 0.05 seconds or longer, the reproducibility of thin lines is improved. On the other hand, in a case where the time for the irradiation is 10 seconds or shorter, the granularity is further improved.

Examples of the infrared irradiation device include a halogen heater, a ceramic heater, and the like.

The heating temperature in the heating step is preferably equal to or higher than 40° C., more preferably about 40° C. to 150° C., and even more preferably about 40° C. to 80° C. The drying and heating time can be appropriately set in consideration of compositions of the ink composition A and the ink composition B to be used and a printing rate.

In the heating step, it is preferable to perform the heating on the ink composition A and the ink composition B under the same conditions.

The phrase "perform the heating under the same condition" means that the heating is performed on the ink composition A and the ink composition B without changing conditions such as types of a heat source, a heating temperature, and a scanning speed in the heating step. By performing the heating under the same conditions, it is not necessary to change the heat source according to each ink composition, and the productivity of ink jet recording is further improved.

In addition, the heating may be started at the same time for the ink composition A and the ink composition B, or may be started at different timings. It is preferable to start the heating at the same time from the viewpoint of the productivity of ink jet recording.

<Irradiation Step>

The ink jet recording method preferably includes a step of irradiating, with light (active energy rays), the ink composition A and the ink composition B which have been heated by the above-described heating step. The ink composition A and the ink composition B which have been heated by the heating step mean the ink composition A and the ink composition B which have undergone the heating step, and a state where the ink composition A and the ink composition B are heated and thus a temperature thereof has raised may be adopted, or a state where the temperature has decreased after the lapse of time after completion of the heating may be adopted.

The irradiation step is not limited as long as it is a step of irradiating, with the active energy rays, the ink composition A and the ink composition B which have been subjected to the heating step.

By irradiating the ink composition A and the ink composition B with the active energy rays, a polymerization reaction of the microcapsules in the ink composition A and the ink composition B proceeds, and therefore it becomes possible to improve the film hardness and the like of the image.

Examples of the active energy rays that can be used in the irradiation step include ultraviolet rays (UV light), visible rays, electron beams, and the like. Among these, ultraviolet rays (UV light) is preferable.

The peak wavelength of the active energy rays (light) depends on an absorption property of a sensitizer that is used as necessary, but is preferably 200 nm to 405 nm, more preferably 220 nm to 390 nm, and even more preferably 220 nm to 385 nm, for example.

In a case where the photopolymerization initiator and the sensitizer are not used in combination, the peak wavelength is preferably 200 nm to 310 nm and more preferably 200 nm to 280 nm, for example.

At the time of the irradiation with the active energy rays (light), it is suitable to perform the irradiation with the illuminance of the exposure surface of 10 mJ/cm² to 2,000 mJ/cm² for example, and preferably 20 mJ/cm² to 1,000 mJ/cm².

As the light source for generating the active energy rays (light), a mercury lamp, a metal halide lamp, a UV fluorescent lamp, a gas laser, a solid-state laser, and the like are widely known.

Furthermore, industrially and environmentally, it is extremely useful to substitute the aforementioned light sources with a semiconductor ultraviolet light-emitting device.

Among the semiconductor ultraviolet light-emitting devices, a light emitting diode (preferably UV-LED) and a laser diode (preferably UV-LD) are compact, have long service life and high efficiency, and incur low costs, and thus are expected as a light source.

As the light source, a metal halide lamp, an ultra-high pressure mercury lamp, a high-pressure mercury lamp, a medium-pressure mercury lamp, a low-pressure mercury lamp, LED, or a blue-violet laser is preferable.

In a case where a sensitizer and a photopolymerization initiator are used in combination, among the above light sources, an ultra-high pressure mercury lamp that can radiate light having a wavelength of 365 nm, 405 nm, or 436 nm, a high-pressure mercury lamp that can radiate light having a wavelength of 365 nm, 405 nm, or 436 nm, or LED that can radiate light having a wavelength of 355 nm, 365 nm, 385 nm, 395 nm, or 405 nm is more preferable, and LED that can radiate light having wavelength of 355 nm, 365 nm, 385 nm, 395 nm, or 405 nm is most preferable.

As the irradiation conditions and the basic irradiation method, the irradiation conditions and the irradiation method disclosed in JP1985-132767A (JP-S60-132767A) can also be applied. Specifically, a method in which a light source is provided on both sides of a head unit including a device for jetting the ink composition and the head unit as well as the light source are scanned by a so-called shuttle method, or a method in which the irradiation is performed by a separate light source that is not associated with driving is preferable.

The irradiation with the active energy rays may be performed after a certain period of time after the ink composition has landed and heated. A time from after heating to the irradiation with the active energy rays is preferably from 0.01 seconds to 120 seconds, and more preferably from 0.01 seconds to 60 seconds.

A time for the irradiation with the active energy ray is not particularly limited. In addition, the irradiation with the active energy may be performed once or plural times.

The time for the irradiation with the active energy rays is preferably from 0.05 to 10 seconds, more preferably from 0.1 to 5 seconds, and even more preferably from 0.15 to 3 seconds, per one time.

In a case where the time for the irradiation is 0.05 seconds or longer, the film hardness of the image is improved. On the other hand, in a case where the time for the irradiation is 10 seconds or shorter, productivity is improved.

In the irradiation step, it is preferable to perform the light irradiation on the ink composition A and the ink composition B under the same conditions.

The phrase "perform the light irradiation under the same condition" means that the light irradiation is performed on the ink composition A and the ink composition B without changing conditions such as types of a light source, light amount, and an irradiation speed in the irradiation step.

By performing the light irradiation under the same conditions, it is not necessary to change the light source according to each ink composition, and the productivity of ink jet recording is further improved.

In addition, the light irradiation on the ink composition A and the ink composition B may be carried out at the same time, may be carried out continuously, or may be carried out separately. From the viewpoint of the productivity of ink jet recording, it is preferable to perform the light irradiation at the same time or continuously.

<<Ink Jet Recording Method with Four Color Ink Composition>>

In the above-described ink jet recording method of the present disclosure, images may be recorded using four color ink compositions.

In this case, in the ink jet recording method, the ink composition A is a liquid that contains three different kinds of coloration pigments of an ink composition A1 that contains the microcapsule having at least the polymerizable compound within the microcapsule, the high boiling solvent, water, and a copper phthalocyanine-based pigment, an ink composition A2 that contains the microcapsule having at least the polymerizable compound within the microcapsule, the high boiling solvent, water, and a quinacridone-based pigment, and an ink composition A3 that contains the microcapsule having at least the polymerizable compound within the microcapsule, the high boiling solvent, water, and a monoazo-based pigment, the method including a step of jetting the ink composition A1, the ink composition A2, the ink composition A3, and the ink composition B on the substrate; and a step of heating the ink composition A1, the ink composition A2, the ink composition A3, and the ink composition B, which have been jetted on the substrate, in which it is preferable that the absorbance $ABS_{A1}$ of the ink composition A1, the absorbance $ABS_{A2}$ of the ink composition A2, the absorbance $ABS_{A3}$ of the ink composition A3, and the absorbance $ABS_B$ of the ink composition B satisfy Formula (5), Formula (6), and Formula (7), and the concentration $M_A$ of the high boiling solvent contained in the ink composition A1, the concentration $M_{A2}$ of the high boiling solvent contained in the ink composition A2, the concentration $M_{A3}$ of the high boiling solvent contained in the ink composition A3, and the concentration $M_B$ of the high boiling solvent contained in the ink composition B satisfy Formula (8), Formula (9), and Formula (10).

$$ABS_{A1} < ABS_B \quad \text{Formula (5)}$$

$$ABS_{A2} < ABS_B \quad \text{Formula (6)}$$

$$ABS_{A3} < ABS_B \quad \text{Formula (7)}$$

$$M_{A1} < M_B \quad \text{Formula (8)}$$

$$M_{A2} < M_B \quad \text{Formula (9)}$$

$$M_{A3} < M_B \quad \text{Formula (10)}$$

In Formula (5), Formula (6), and Formula (7), $ABS_{A1}$, $ABS_{A2}$, $ABS_{A3}$, and $ABS_B$ respectively represent an average value of the absorbance of each of the ink composition A1, the ink composition A2, the ink composition A3, and the ink composition B in wavelengths of 800 nm to 1400 nm.

In Formula (8), Formula (9), and Formula (10), $M_{A1}$, $M_{A2}$, $M_{A3}$, or $M_B$ represents the concentration of the high boiling solvent contained in the ink composition A1, the ink composition A2, the ink composition A3, or the ink composition B with respect to a total mass of each ink composition on the mass basis.

The absorbance in wavelengths of 800 nm to 1400 nm can be measured by the above-described method.

The condition in which the absorbance $ABS_{A1}$ of the ink composition A1 and the absorbance $ABS_B$ of the ink composition B, the absorbance $ABS_{A2}$ of the ink composition A2 and the absorbance $ABS_B$ of the ink composition B, and the absorbance $ABS_{A3}$ of the ink composition A3 and the absorbance $ABS_B$ of the ink composition B satisfy Formula (5), Formula (6), and Formula (7) (that is, the absorbance of ink composition A is smaller than that of the ink composition B) indicates that, in a case where infrared rays of the same light amount (light having wavelengths of 800 nm to 1400 nm) are injected into the ink composition A1, the ink composition A2, the ink composition A3, and the ink composition B, a temperature of the composition is unlikely to be increased on the ink composition A1, the ink composition A2, and the ink composition A3 sides, and a temperature of the composition is likely to be increased on the ink composition B side.

The $M_{A1}$, the $M_{A2}$, the $M_{A3}$, or the $M_B$ satisfies Formula (8), Formula (9), and Formula (10), and therefore the zeta potential of the ink composition is likely to be lowered in the ink composition B side compared to the ink composition A1, the ink composition A2, and the ink composition A3 in a case where the ink composition A1, the ink composition A2, the ink composition A3, and the ink composition B are heated, and thus the microcapsules tend to aggregate easily. As a result, the microcapsules can aggregate before the destruction of the microcapsules in the ink composition B occurs, and therefore the color bleeding can be suppressed.

Each of the components contained in the ink composition A1, the ink composition A2, the ink composition A3, and the ink composition B are the same as those of the ink composition A and ink composition B, and preferable aspect thereof is also the same.

EXAMPLES

Hereinafter, the embodiment of the present disclosure will be more specifically described based on examples, but the embodiment of the present disclosure is not limited to the following examples as long as the gist of the embodiment of the present disclosure is maintained. Unless otherwise specified, "part" is on a mass basis.

[Manufacture of Microcapsule Dispersion]

—Preparation of Oil-Phase Component—

4.58 g of TAKENATE D-120 N (tri- or higher functional isocyanate compound, solid content of 75% by mass, Mitsui Chemicals, Inc.), 6.9 g of TAKENATE D-116 N (isocyanate compound having an ethylene oxide group as a hydrophilic group, solution of 50% by mass ethyl acetate, Mitsui Chemicals, Inc.), 5.14 g of the following isocyanate compound having a carboxy group (isocyanate compound having a carboxy group as a hydrophilic group, solid content of 35% by mass), 3.5 g of SR399E (dipentaerythritol pentaacrylate, pentafunctional polymerizable compound, Sartomer Arkema Inc.), 3.5 g of SR833S (tricyclodecanedimethanol diacrylate, difunctional polymerizable compound, Sartomer Arkema Inc.), and 0.48 g of IRGACURE (registered trademark) 819 (photopolymerization initiator, BASF SE, bisacylphosphine oxide) were dissolved in 20 g of ethyl acetate to obtain an oil-phase component.

—Synthesis of Isocyanate Compound Having Carboxy Group—

45 g of 2,2-bis(hydroxymethyl)propionic acid (DMPA), 223.72 g of isophorone diisocyanate (IPDI), and 499.05 g of ethyl acetate (AcOEt) were put into a three-neck flask and heated to 50° C. Then, 0.7677 g of NEOSTANN U-600 was added thereto and reacted for 3 hours, thereby obtaining an isocyanate compound having a carboxy group (isocyanate compound having a hydrophilic group).

—Water-Phase Component—

8.08 g of an aqueous solution of 1% by mass sodium hydroxide was dissolved in 35 g of distilled water, and therefore a water-phase component was obtained.

The oil-phase component was mixed with the water-phase component, the obtained mixture was emulsified and dispersed using a homogenizer for 12 minutes at 12,000 rpm, thereby obtaining an emulsion.

The obtained emulsion was stirred at 400 rpm at 45° C., and distilled water and ethyl acetate were distilled off. Stirring was further continued for 12 hours to 30 hours, and the solid content was adjusted to 25% by mass with water to obtain a microcapsule dispersion (hereinafter, will also be referred to as "MC dispersion").

The microcapsule includes: the shell that has the hydrophilic group and the three-dimensional cross-linked structure containing at least one bond selected from a urethane bond or a urea bond; and the core that contains the difunctional polymerizable compound, the pentafunctional polymerizable compound, and the photopolymerization initiator.

Herein, the content of the photopolymerization initiator contained within the microcapsule is 6.9% by mass with respect to a total content of the polymerizable compound contained within the microcapsule.

<Checking Whether MC dispersion Contains Microcapsule>

Whether the MC dispersion obtained above contains a microcapsule was checked by the following method. The operation described below was performed under the condition of a liquid temperature of 25° C.

From the MC dispersion obtained as above, a sample was collected. Tetrahydrofuran (THF) having a mass 100 times the mass of the total solid content (microcapsule in the present example) in the sample was added to and mixed with the collected sample, thereby preparing a diluted solution of the MC dispersion. The obtained diluted solution was subjected to centrifugation (80,000 rpm, 40 minutes). After centrifugation, the presence or absence of a residue was checked by visual observation. In a case where a residue was checked, water was added to the residue, and the resultant was stirred for 1 hour by using a stirrer so as to redisperse the residue in water, thereby obtaining a redispersion. For the obtained redispersion, by using a wet-type particle size distribution measurement apparatus (LA-960, manufactured by HORIBA, Ltd.), the particle size distribution was measured by a light scattering method. In a case where the particle size distribution was checked by the operation described above, it was determined that the MC dispersion contained the microcapsule.

<Volume Average Dispersed Particle Diameter of Microcapsule>

When the volume average dispersing particle diameter of the microcapsule obtained as above was measured by a light scattering method, the diameter was 0.15 µm.

The measurement of the volume average particle diameter by the light scattering method was carried out by using a wet-type particle size distribution measurement apparatus, LA-960 (manufactured by HORIBA, Ltd.).

<Checking Whether Core Contains Photopolymerization Initiator>

In the MC dispersion obtained as above, whether the core of the microcapsule contains the photopolymerization initiator was checked by measuring an internal content rate (% by mass) of the photopolymerization initiator. The details thereof are as described below. The operation described below was performed under the condition of a liquid temperature of 25° C.

From the MC dispersion, two samples (hereinafter, referred to as "sample 1A" and "sample 2A") of the same mass were collected.

Tetrahydrofuran (THF) having a mass 100 times the mass of the total solid content in the sample 1A was added to and mixed with the sample 1A, thereby preparing a diluted solution. The obtained diluted solution was subjected to centrifugation under the condition of 80,000 rpm and 40 minutes. The supernatant (hereinafter, referred to as "supernatant 1A") generated by the centrifugation was collected. The mass of the photopolymerization initiator contained in the collected supernatant 1A was measured using a liquid chromatography device "Waters 2695" of WATERS. The obtained mass of the photopolymerization initiator was taken as "total amount of photopolymerization initiator".

Furthermore, the sample 2A was subjected to centrifugation under the same conditions as in the centrifugation performed on the aforementioned diluted solution. The supernatant (hereinafter, referred to as "supernatant 2A") generated by the centrifugation was collected. The mass of the photopolymerization initiator contained in the collected supernatant 2A was measured using the aforementioned liquid chromatography device. The obtained mass of the photopolymerization initiator was taken as "amount of free photopolymerization initiator".

Based on the "total amount of photopolymerization initiator" and the "amount of free photopolymerization initiator", the internal content rate (% by mass) of the photopolymerization initiator was determined according to the following equation.

Internal content rate (% by mass) of photopolymerization initiator=((total amount of photopolymerization initiator−amount of free photopolymerization initiator)/total amount of photopolymerization initiator)×100

As the results, in the microcapsule, the internal content rate was 99% by mass or higher, and therefore it was confirmed that the core contained the photopolymerization initiator.

<Checking Whether Core Contains Polymerizable Compound>

In the MC dispersion obtained as above, whether the core of the microcapsule contains the polymerizable compound was checked by measuring an internal content rate (% by mass) of the polymerizable compound.

Whether or not the polymerizable compound was contained was checked by the same method as the method used for checking whether the photopolymerization initiator was contained in the interior.

As the results, in the microcapsule, the internal content rate was 99% by mass or higher, and therefore it was confirmed that the core contained the polymerizable compound. The internal content rate of the polymerizable compound referred herein is a value obtained by a total amount of the di- or lower functional polymerizable compound and the tri- or higher functional polymerizable compound.

[Preparation of Ink Composition]

Using the MC dispersion produced as above, each component was mixed to become black inks (K1 to K8) in Table 2, and magenta inks (M1 to M3), cyan inks (C1 to C5), and yellow inks (Y1 To Y3) in Table 3, and therefore ink compositions of each color were prepared.

In regard to the ink compositions of each color, the ink composition was prepared by mixing each component, followed by stirring for 1 hour with a stirrer, and filtering with a filter having a pore size of 1.5 μm (PVDF 5 μm filter, Millex (registered trademark)-SV, diameter of 25 mm, manufactured by Millipore).

Absorbance ABS (800 nm to 1400 nm) of the ink compositions of each color was measured by placing a diluted solution obtained by diluting the ink composition with ultrapure water by 1000 times by mass into a quartz cell having an optical path length of 0.2 mm, and the ultrapure water was added in a control cell. The measurement was carried out under the following conditions using a spectrophotometer V-7200 (manufactured by JASCO Corporation). Then, an average value of the absorbance ABS of each ink composition was calculated by averaging the measured absorbance at 800 nm to 1400 nm using Mathematical Formula (A).

The average values of the absorbance ABS of the ink compositions of each color are shown in Tables 2 and 3.

—Condition—

Measurement wavelength: 800 nm to 1400 nm

Measurement interval: every 1 nm $$ABS(800\text{-}1400) = \frac{\sum_{\lambda=800}^{601} ABS(\lambda)}{601} \quad \text{Formula (A)}$$

TABLE 2

|  | Black ink | | | | | | | |
|---|---|---|---|---|---|---|---|---|
|  | K1 | K2 | K3 | K4 | K5 | K6 | K7 | K8 |
| Black pigment liquid | 17.9 | 11.4 | 21.4 | 17.9 | 17.9 | 17.9 | 17.9 | 17.9 |
| MC dispersion | 45.0 | 45.0 | 45.0 | 45.0 | 45.0 | 45.0 | 45.0 | 45.0 |
| Propylene glycol Boiling point 188° C. | 6.5 | 7.0 | 6.0 | 5.0 | 9.0 | 4.0 | — | — |
| Triethylene glycol Boiling point 276° C. | 6.5 | 7.1 | 6.0 | 5.0 | 9.0 | 4.0 | — | — |
| Propylene glycol-1-monobutyl ether Boiling point 170° C. | — | — | — | — | — | — | 13.0 | — |
| Glycerin Boiling point 290° C. | — | — | — | — | — | — | — | 13.0 |
| Capstone FS-31 | 0.3 | 0.3 | 0.3 | 0.3 | 0.3 | 0.3 | 0.3 | 0.3 |
| Water | 23.8 | 29.2 | 21.3 | 26.8 | 18.8 | 28.8 | 23.8 | 23.8 |
| Concentration of colorant (% by mass) | 2.5 | 1.6 | 3.0 | 2.5 | 2.5 | 2.5 | 2.5 | 2.5 |
| Concentration of high boiling solvent (% by mass) | 13.0 | 14.1 | 12.0 | 10.0 | 18.0 | 8.0 | 13.0 | 13.0 |
| Average value of ABS | 601.26 | 384.81 | 721.52 | 601.26 | 801.26 | 601.26 | 601.26 | 601.26 |

TABLE 3

|  | Cyan ink | | | | | Magenta ink | | | Yellow ink | | |
|---|---|---|---|---|---|---|---|---|---|---|---|
|  | C1 | C2 | C3 | C4 | C5 | M1 | M2 | M3 | Y1 | Y2 | Y3 |
| Magenta pigment liquid | — | — | — | — | — | 38.6 | 42.9 | 34.3 | — | — | — |
| Cyan pigment liquid | 17.1 | 21.4 | 12.9 | 17.1 | 17.1 | — | — | — | — | — | — |
| Yellow pigment liquid | — | — | — | — | — | — | — | — | 22.5 | 26.3 | 18.8 |
| MC dispersion | 45.0 | 45.0 | 45.0 | 45.0 | 45.0 | 45.0 | 45.0 | 45.0 | 45.0 | 45.0 | 45.0 |
| Propylene glycol Boiling point 188° C. | 4.0 | 4.0 | 3.6 | — | — | 4.4 | 4.5 | 4.3 | 4.2 | 4.2 | 4.2 |
| Triethylene glycol Boiling point 276° C. | 4.0 | 4.0 | 3.6 | — | — | 4.4 | 4.5 | 4.2 | 4.1 | 4.1 | 4.1 |
| Propylene glycol-1-monobutyl ether Boiling point 170° C. | — | — | — | 8.0 | — | — | — | — | — | — | — |
| Glycerin Boiling point 290° C. | — | — | — | — | 8.0 | — | — | — | — | — | — |
| Capstone FS-31 | 0.3 | 0.3 | 0.3 | 0.3 | 0.3 | 0.3 | 0.3 | 0.3 | 0.3 | 0.3 | 0.3 |
| Water | 29.6 | 25.3 | 34.6 | 29.6 | 29.6 | 7.3 | 2.8 | 11.9 | 23.9 | 20.2 | 27.7 |
| Concentration of colorant (% by mass) | 2.4 | 3.0 | 1.8 | 2.4 | 2.4 | 5.4 | 6.0 | 4.8 | 3.6 | 4.2 | 3.0 |
| Concentration of high boiling solvent (% by mass) | 8.0 | 8.0 | 7.2 | 8.0 | 8.0 | 8.8 | 9.0 | 8.5 | 8.3 | 8.3 | 8.3 |
| Average value of ABS | 15.32 | 19.15 | 11.49 | 15.32 | 15.32 | 36.77 | 40.85 | 32.68 | 20.50 | 23.91 | 17.08 |

Details of the components in Tables 2 and 3 are as below.

Black pigment dispersion liquid: Projet Black APD1000 (trade name), FUJIFILM Imaging Colorants, Inc, concentration of carbon black of 14% by mass Yellow pigment dispersion liquid: Projet Yellow APD1000 (trade name), FUJIFILM Imaging Colorants, Inc, pigment yellow 74, concentration of monoazo pigment of 16% by mass Magenta pigment dispersion liquid: Projet Magenta APD1000 (trade name), FUJIFILM Imaging Colorants, Inc, concentration of quinacridone-based pigment of 14% by mass Cyan pigment dispersion liquid: Projet Cyan APD1000 (trade name), FUJIFILM Imaging Colorants, Inc, concentration of copper phthalocyanine-based pigment of 14% by mass MC dispersion: concentration of microcapsule of 25% by mass Capstone FS-31: fluorine-based surfactant, manufactured by DuPont, solid content of 25% by mass Examples 1 to 21 and Comparative Examples 1 to 3

Using the ink compositions of each color prepared as above, image recording was carried out by the ink jet recording method of the examples or the comparative examples and evaluated. Details are as follows.

<Image Recording and Evaluation>

As shown in Tables 4 to 7, the ink composition of each color was prepared as an ink set of a combination of the ink composition A (shown as Solution A in Tables 4 to 7) and the ink composition B (shown as Solution B in Tables 4 to 7). Image recording was carried out using each ink set, and the following evaluations were carried out. The results are shown in Tables 4 to 7.

(Preparation of Sample for Evaluation)

The ink composition A and the ink composition B were jetted on a polyvinyl chloride substrate (AVERY 400 GLOSS WHITE PERMANENT (trade name), manufactured by Avery Dennison) using an ink jet printer equipped with two ink jet heads connected to a storage tank filled with the ink composition A and the ink composition B of the ink set obtained by combinations shown in Tables 4 to 7, the infrared irradiation device (having a peak wavelength at a region of wavelengths of 800 nm to 1400 nm, ADPHOS NIR, manufactured by Adphos, Inc.), and an ultraviolet exposure device (peak wavelength of 254 nm, long-life amalgam lamp, manufactured by Heraeus).

Jetting conditions were set so that a resolution of the image after recording was 1200 dpi×900 dpi (dot per inch), the jetting was performed from the two heads, and the image shown in FIG. 1 was recorded. The image shown in FIG. 1 has a thin line portion 1 (setting width: 1 mm, length: 10 cm) for color bleeding evaluation and a solid image portion 2 for abrasion resistance evaluation. In addition, in FIG. 1, A is a portion recorded by the ink composition A, and B is a portion recorded by the ink composition B.

0.1 seconds after the time when the ink landed on the substrate, heating was carried out with the infrared irradiation device under conditions of the a surface temperature of the substrate at 70° C. for 0.2 seconds on the image recorded portion, and after 30 seconds of the heating, and light irradiation was performed on the image recorded portion by the ultraviolet exposure device, and therefore samples for evaluation each having an exposure amount of light of 300 mJ/cm$^2$ at an irradiated portion.

(1. Image Quality)

In the samples for evaluation prepared by performing the light irradiation at 300 mJ/cm$^2$ as described above, the width of the thin line portion 1 of the formed image was measured, and image quality was evaluated according to the following evaluation standard. The evaluation of the width of the thin line portion 1 was carried out on a portion having a larger deviation from a set value 1 mm among the thin line portion 1 formed by the ink composition A and the ink composition B. The width of the thin line portion 1 is an average value measured at any three points of the thin line portion 1.

As the width of the thin line portion 1 became thicker with respect to the set value 1 mm, the color bleeding was weakened, and as the width became thinner with respect to the set value 1 mm, the granularity was weakened.

—Evaluation Standard—

A: Each of the width of the thin line portion of the ink composition A and the ink composition B is 1 mm.

B: Each of the width of the thin line portion of the ink composition A and the ink composition B is 0.9 mm to 1.1 mm.

C: Each of the width of the thin line portion of the ink composition A and the ink composition is less than 0.9 mm or more than 1.1 mm.

(2. Abrasion Resistance)

In the samples for evaluation prepared by performing the light irradiation at 300 mJ/cm$^2$ as described above, using a cotton moistened with ultrapure water, a Gakushin test was conducted on a solid image portion of the formed image under the following conditions so as to straddle a boundary portion between the portion recorded with the ink composition A and the portion recorded with the ink composition B of the solid image portion, and the abrasion resistance was evaluated according to the following evaluation standard. In the evaluation, a result of a portion having an inferior evaluation result among the portion recorded with the ink composition A and the portion recorded with the ink composition B was adopted. In the following evaluation standard, portions with the evaluation results of 3, 4, and 5 were judged to be an acceptable range.

—Condition—

Equipment: AB-301, a Gakushin-type rubbing fastness tester, TESTER SANGYO CO., LTD.

Test load: 200 g

Number of reciprocations: 3 times, 5 times, 10 times, 15 times, and 20 times

—Evaluation Standard—

5: The image was not peeled off from the substrate even with 20 reciprocations.

4: The image was peeled off from the substrate with 15 reciprocations.

3: The image was peeled off from the substrate with 10 reciprocations.

2: The image was peeled off from the substrate with 5 reciprocations.

1: The image was peeled off from the substrate with 3 reciprocations.

(3. Jetting Properties)

Figure 2:
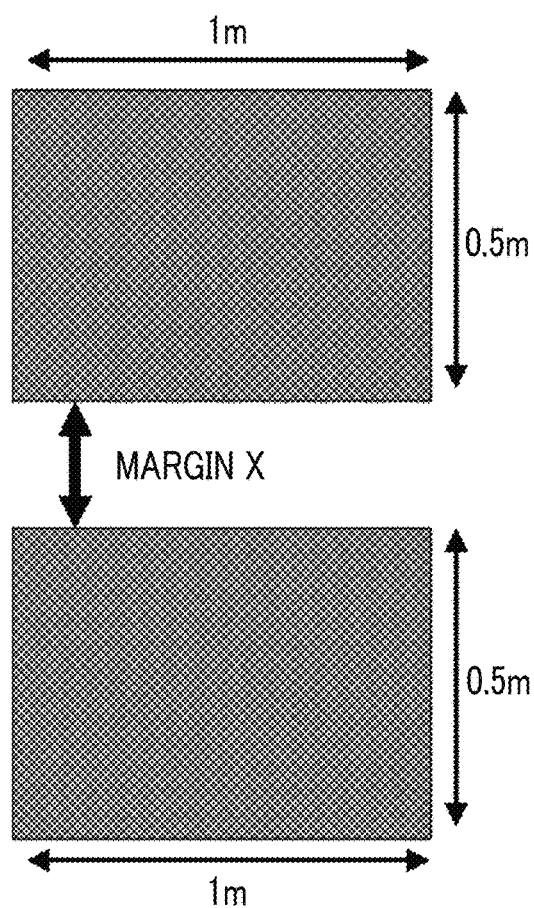
FIG. 2 is a view showing an image for evaluating jetting properties in the examples.

With the ink set shown in Tables 4 to 7, a pattern in which an image with 1 m×0.5 m size was arranged with a certain margin was recorded on the same substrate using the same ink jet printer as that of the preparation of the sample for evaluation under the same jetting conditions, as shown in FIG. 2. The image was recorded by transporting the substrate in a longitudinal direction of FIG. 2 and scanning the head in a lateral direction. The exposure amount of light was 300 mJ/cm$^2$.

The image shown in FIG. 2 is an image in which squares (1 cm×1 cm) recorded by the ink composition A and the ink composition B are alternately arranged, and has a margin X.

The margin X was adjusted in a length so that a rest time became 2, 3, 4, or 5 seconds (time at which no jetting is performed).

The recorded image was visually observed and the jetting properties were evaluated according to the following evaluation standard. In the following evaluation standard, portions with the evaluation results of 3, 4, and 5 were judged to be an acceptable range.

—Evaluation Standard—

5: Even in a case where the margin X is equivalent to 5 seconds, no missing in the image was found.

4: There was no missing in the image until a case where the margin X was equivalent to 4 seconds.

3: There was no missing in the image until a case where the margin X was equivalent to 3 seconds.

2: The quality of the image deteriorated in a case where the margin X was equivalent to 3 seconds.

1: The quality of the image deteriorated in a case where the margin X was equivalent to 2 seconds.

(4. Color Development)

With the ink set shown in Tables 4 to 7, a solid image of each ink composition with 2 cm×2 cm size was recorded on the same substrate using the same ink jet printer as that of the preparation of the sample for evaluation under the same jetting conditions. The exposure amount of light was 300 mJ/cm$^2$.

Reflection density (saturation) of the image of each ink composition was measured with a colorimeter (SpectroEye, X-Rite Inc.).

The color development was evaluated on the reflection density (saturation) of the image of the ink composition A and the reflection density (saturation) of the image of the ink composition B obtained by the measurement according to the following evaluation standard. An evaluation result of a lower score was adopted. In addition, in the following evaluation standard, portions with the evaluation results of 3, 4, and 5 were judged to be an acceptable range.

—Evaluation Standard—

5: The saturation of cyan is 60 or more, the saturation of magenta is 75 or more, the saturation of yellow is 90 or more, or the density of black is 2.0 or more.

4: The saturation of cyan is less than 60 and 58 or more, the saturation of magenta is less than 75 and 72.5 or more, the saturation of yellow is less than 90 and 85 or more, or the density of black is less than 2.0 and 1.9 or more.

3: The saturation of cyan is less than 58 and 56 or more, the saturation of magenta is less than 72.5 and 70 or more, the saturation of yellow is less than 85 and 80 or more, or the density of black is less than 1.9 and 1.8 or more.

2: The saturation of cyan is less than 56 and 54 or more, the saturation of magenta is less than 70 and 67.5 or more, the saturation of yellow is less than 80 and 75 or more, or the density of black is less than 1.8 and 1.7 or more.

1: The saturation of cyan is less than 54, the saturation of magenta is less than 67.5, the saturation of yellow is less than 75, or the density of black is less than 1.7.

TABLE 4

| | | Example 1 | | Example 2 | | Example 3 | | Example 4 | |
|---|---|---|---|---|---|---|---|---|---|
| | | Ink set | | | | | | | |
| | | A liquid C1 | B liquid K1 | A liquid C1 | B liquid K2 | A liquid C1 | B liquid K3 | A liquid C1 | B liquid K4 |
| $ABS_A$ or $ABS_B$ (800-1400 nm) | | 15.32 | 601.26 | 15.32 | 384.81 | 15.32 | 721.51 | 15.32 | 601.26 |
| $M_A$ or $M_B$ (% concentration) | | 8.0 | 13.0 | 8.0 | 14.1 | 8.0 | 12.0 | 8.0 | 10.0 |
| $(1 + 0.01 \times (ABS_B/ABS_A)) \times M_A$ | | 11.1 | $M_B =$ | 10.0 | $M_B =$ | 11.8 | $M_B =$ | 11.1 | $M_B =$ |
| $(1 + 0.015 \times (ABS_B/ABS_A)) \times M_A$ | | 12.7 | 13.0 | 11.0 | 14.1 | 13.7 | 12.0 | 12.7 | 10.0 |
| $(1 + 0.03 \times (ABS_B/ABS_A)) \times M_A$ | | 17.4 | | 14.0 | | 19.3 | | 17.4 | |
| $(1 + 0.04 \times (ABS_B/ABS_A)) \times M_A$ | | 20.6 | | 16.0 | | 23.1 | | 20.6 | |
| Relationship between $ABS_A$, $ABS_B$, $M_A$, and $M_B$ | | Formula (4) | | Formula (3) | | Formula (3) | | Formula (2) | |
| Image quality evaluation | Width of thin line portion (mm) | 1.0 | 1.0 | 1.0 | 0.9 | 1.0 | 1.1 | 1.0 | 1.1 |
| | Evaluation result | A | | B | | B | | B | |
| Film evaluation | Abrasion resistance | 5 | | 5 | | 5 | | 5 | |
| Jetting evaluation | | 5 | | 4 | | 4 | | 4 | |
| Color development | | 5 | | 4 | | 5 | | 5 | |

| | | Example 5 | | Comparative Example 1 | | Example 6 | | Example 7 | |
|---|---|---|---|---|---|---|---|---|---|
| | | Ink set | | | | | | | |
| | | A liquid C1 | B liquid K5 | A liquid C1 | B liquid K6 | A liquid C2 | B liquid K1 | A liquid C3 | B liquid K1 |
| $ABS_A$ or $ABS_B$ (800-1400 nm) | | 15.32 | 601.26 | 15.32 | 601.26 | 19.15 | 601.26 | 11.49 | 601.26 |
| $M_A$ or $M_B$ (% concentration) | | 8.0 | 18.0 | 8.0 | 8.0 | 8.0 | 13.0 | 7.2 | 13.0 |
| $(1 + 0.01 \times (ABS_B/ABS_A)) \times M_A$ | | 11.1 | $M_B =$ | 11.1 | $M_B =$ | 10.5 | $M_B =$ | 11.0 | $M_B =$ |
| $(1 + 0.015 \times (ABS_B/ABS_A)) \times M_A$ | | 12.7 | 18.0 | 12.7 | 8.0 | 11.8 | 13.0 | 12.9 | 13.0 |
| $(1 + 0.03 \times (ABS_B/ABS_A)) \times M_A$ | | 17.4 | | 17.4 | | 15.5 | | 18.5 | |
| $(1 + 0.04 \times (ABS_B/ABS_A)) \times M_A$ | | 20.6 | | 20.6 | | 18.0 | | 22.3 | |
| Relationship between $ABS_A$, $ABS_B$, $M_A$, and $M_B$ | | Formula (3) | | — | | Formula (4) | | Formula (4) | |
| Image quality evaluation | Width of thin line portion (mm) | 1.0 | 0.9 | 1.0 | 1.2 | 1.0 | 1.0 | 1.0 | 1.0 |
| | Evaluation result | B | | C | | A | | A | |
| Film evaluation | Abrasion resistance | 3 | | 5 | | 5 | | 5 | |

TABLE 4-continued

| | | | | |
|---|---|---|---|---|
| Jetting evaluation | 4 | 2 | 4 | 5 |
| Color development | 5 | 5 | 5 | 4 |

$M_A < M_B$ Formula (2)

$(1 + 0.01 \times (ABS_B/ABS_A)) \times M_A < M_B < (1 + 0.04 \times (ABS_B/ABS_A)) \times M_A$ Formula (3)

$(1 + 0.015 \times (ABS_B/ABS_A)) \times M_A < M_B < (1 + 0.03 \times (ABS_B/ABS_A)) \times M_A$ Formula (4)

In a case where Formula (4) is satisfied, Formula (3) and Formula (2) are also satisfied, and in a case where Formula (3) is satisfied, Formula (2) is also satisfied.

The description Formula (2) in the table shows that only Formula (2) is satisfied.

TABLE 5

| | | Example 8 | | Example 9 | | Example 10 | | Comparative Example 2 | | Example 11 | | Example 12 | |
|---|---|---|---|---|---|---|---|---|---|---|---|---|---|
| | | \multicolumn{14}{c}{Ink set} |
| | | A liquid M1 | B liquid K1 | A liquid M1 | B liquid K4 | A liquid M1 | B liquid K5 | A liquid M1 | B liquid K6 | A liquid M2 | B liquid K1 | A liquid M3 | B liquid K1 |
| $ABS_A$ or $ABS_B$ (800-1400 nm) | | 36.77 | 601.26 | 36.77 | 601.26 | 36.77 | 601.26 | 36.77 | 601.26 | 40.85 | 601.26 | 32.68 | 601.26 |
| $M_A$ or $M_B$ (% concentration) | | 8.8 | 13.0 | 8.8 | 10.0 | 8.8 | 18.0 | 8.8 | 8.0 | 9.0 | 13.0 | 8.5 | 13.0 |
| $(1 + 0.01 \times (ABS_B/ABS_A)) \times M_A$ | | 10.2 | $M_B =$ 13.0 | 10.2 | $M_B =$ 10.0 | 10.2 | $M_B =$ 18.0 | 10.2 | $M_B =$ 8.0 | 10.3 | $M_B =$ 13.0 | 10.1 | $M_B =$ 13.0 |
| $(1 + 0.015 \times (ABS_B/ABS_A)) \times M_A$ | | 11.0 | | 11.0 | | 11.0 | | 11.0 | | 11.0 | | 10.8 | |
| $(1 + 0.03 \times (ABS_B/ABS_A)) \times M_A$ | | 13.1 | | 13.1 | | 13.1 | | 13.1 | | 13.0 | | 13.2 | |
| $(1 + 0.04 \times (ABS_B/ABS_A)) \times M_A$ | | 14.6 | | 14.6 | | 14.6 | | 14.6 | | 14.3 | | 14.8 | |
| Relationship between $ABS_A$, $ABS_B$, $M_A$, and $M_B$ | | \multicolumn{2}{c|}{Formula (4)} | \multicolumn{2}{c|}{Formula (2)} | \multicolumn{2}{c|}{Formula (2)} | \multicolumn{2}{c|}{—} | \multicolumn{2}{c|}{Formula (3)} | \multicolumn{2}{c}{Formula (4)} |
| Image quality evaluation | Width of thin line portion (mm) | 1.0 | 1.0 | 1.0 | 1.1 | 1.0 | 0.9 | 1.0 | 1.2 | 1.0 | 1.0 | 1.0 | 1.0 |
| | Evaluation result | \multicolumn{2}{c|}{A} | \multicolumn{2}{c|}{B} | \multicolumn{2}{c|}{B} | \multicolumn{2}{c|}{C} | \multicolumn{2}{c|}{A} | \multicolumn{2}{c}{A} |
| Film evaluation | Abrasion resistance | \multicolumn{2}{c|}{5} | \multicolumn{2}{c|}{5} | \multicolumn{2}{c|}{3} | \multicolumn{2}{c|}{5} | \multicolumn{2}{c|}{5} | \multicolumn{2}{c}{5} |
| Jetting evaluation | | \multicolumn{2}{c|}{5} | \multicolumn{2}{c|}{4} | \multicolumn{2}{c|}{4} | \multicolumn{2}{c|}{2} | \multicolumn{2}{c|}{4} | \multicolumn{2}{c}{5} |
| Color development | | \multicolumn{2}{c|}{5} | \multicolumn{2}{c|}{5} | \multicolumn{2}{c|}{5} | \multicolumn{2}{c|}{5} | \multicolumn{2}{c|}{5} | \multicolumn{2}{c}{4} |

$M_A < M_B$ Formula (2)

$(1 + 0.01 \times (ABS_B/ABS_A)) \times M_A < M_B < (1 + 0.04 \times (ABS_B/ABS_A)) \times M_A$ Formula (3)

$(1 + 0.015 \times (ABS_B/ABS_A)) \times M_A < M_B < (1 + 0.03 \times (ABS_B/ABS_A)) \times M_A$ Formula (4)

In a case where Formula (4) is satisfied, Formula (3) and Formula (2) are also satisfied, and in a case where Formula (3) is satisfied, Formula (2) is also satisfied.

The description Formula (2) in the table shows that only Formula (2) is satisfied.

TABLE 6

| | | Example 13 | | Example 14 | | Example 15 | | Comparative Example 3 | | Example 16 | | Example 17 | |
|---|---|---|---|---|---|---|---|---|---|---|---|---|---|
| | | \multicolumn{14}{c}{Ink set} |
| | | A liquid Y1 | B liquid K1 | A liquid Y1 | B liquid K4 | A liquid Y1 | B liquid K5 | A liquid Y1 | B liquid K6 | A liquid Y2 | B liquid K1 | A liquid Y3 | B liquid K1 |
| $ABS_A$ or $ABS_B$ (800-1400 nm) | | 20.50 | 601.26 | 20.50 | 601.26 | 20.50 | 601.26 | 20.50 | 601.26 | 23.91 | 601.26 | 17.08 | 601.26 |
| $M_A$ or $M_B$ (% concentration) | | 8.3 | 13.0 | 8.3 | 10.0 | 8.3 | 18.0 | 8.3 | 8.0 | 8.3 | 13.0 | 8.3 | 13.0 |
| $(1 + 0.01 \times (ABS_B/ABS_A)) \times M_A$ | | 10.7 | $M_B =$ 13.0 | 10.7 | $M_B =$ 10.0 | 10.7 | $M_B =$ 18.0 | 10.7 | $M_B =$ 8.0 | 10.4 | $M_B =$ 13.0 | 11.2 | $M_B =$ 13.0 |
| $(1 + 0.015 \times (ABS_B/ABS_A)) \times M_A$ | | 12.0 | | 12.0 | | 12.0 | | 12.0 | | 11.4 | | 12.7 | |
| $(1 + 0.03 \times (ABS_B/ABS_A)) \times M_A$ | | 15.6 | | 15.6 | | 15.6 | | 15.6 | | 14.6 | | 17.1 | |
| $(1 + 0.04 \times (ABS_B/ABS_A)) \times M_A$ | | 18.0 | | 18.0 | | 18.0 | | 18.0 | | 16.6 | | 20.0 | |
| Relationship between $ABS_A$, $ABS_B$, $M_A$, and $M_B$ | | \multicolumn{2}{c|}{Formula (4)} | \multicolumn{2}{c|}{Formula (2)} | \multicolumn{2}{c|}{Formula (2)} | \multicolumn{2}{c|}{—} | \multicolumn{2}{c|}{Formula (4)} | \multicolumn{2}{c}{Formula (4)} |
| Image quality evaluation | Width of thin line portion (mm) | 1.0 | 1.0 | 1.0 | 1.1 | 1.0 | 0.9 | 1.0 | 1.2 | 1.0 | 1.0 | 1.0 | 1.0 |
| | Evaluation result | \multicolumn{2}{c|}{A} | \multicolumn{2}{c|}{B} | \multicolumn{2}{c|}{B} | \multicolumn{2}{c|}{C} | \multicolumn{2}{c|}{A} | \multicolumn{2}{c}{A} |
| Film evaluation | Abrasion resistance | \multicolumn{2}{c|}{5} | \multicolumn{2}{c|}{5} | \multicolumn{2}{c|}{3} | \multicolumn{2}{c|}{5} | \multicolumn{2}{c|}{5} | \multicolumn{2}{c}{5} |

TABLE 6-continued

|  | Example 13 | | Example 14 | | Example 15 | | Comparative Example 3 | | Example 16 | | Example 17 | |
|---|---|---|---|---|---|---|---|---|---|---|---|---|
| Ink set | | | | | | | | | | | | |
|  | A liquid Y1 | B liquid K1 | A liquid Y1 | B liquid K4 | A liquid Y1 | B liquid K5 | A liquid Y1 | B liquid K6 | A liquid Y2 | B liquid K1 | A liquid Y3 | B liquid K1 |
| Jetting evaluation | 5 | | 4 | | 4 | | 2 | | 4 | | 5 | |
| Color development | 5 | | 5 | | 5 | | 5 | | 5 | | 4 | |

$M_A < M_B$ Formula (2)
$(1 + 0.01 \times (ABS_B/ABS_A)) \times M_A < M_B < (1 + 0.04 \times (ABS_B/ABS_A)) \times M_A$ Formula (3)
$(1 + 0.015 \times (ABS_B/ABS_A)) \times M_A < M_B < (1 + 0.03 \times (ABS_B/ABS_A)) \times M_A$ Formula (4)
In a case where Formula (4) is satisfied, Formula (3) and Formula (2) are also satisfied, and in a case where Formula (3) is satisfied, Formula (2) is also satisfied.
The description Formula (2) in the table shows that only Formula (2) is satisfied.

TABLE 7

|  | Example 18 | | Example 19 | | Example 20 | |
|---|---|---|---|---|---|---|
| Ink set | | | | | | |
|  | A liquid C1 | B liquid K1 | A liquid C4 | B liquid K7 | A liquid C5 | B liquid K8 |
| $ABS_A$ or $ABS_B$ (800-1400 nm) | 15.32 | 601.26 | 15.32 | 601.26 | 15.32 | 601.26 |
| $M_A$ or $M_B$ (% concentration) | 8.0 | 13.0 | 8.0 | 13.0 | 8.0 | 13.0 |
| Boiling point of high boiling solvent (° C.) | 188 276 | 188 | 170 | 170 | 290 | 290 |
| $(1 + 0.01 \times (ABS_B/ABS_A)) \times M_A$ | 11.1 | $M_B =$ | 11.1 | $M_B =$ | 11.1 | $M_B =$ |
| $(1 + 0.015 \times (ABS_B/ABS_A)) \times M_A$ | 12.7 | 13.0 | 12.7 | 13.0 | 12.7 | 13.0 |
| $(1 + 0.03 \times (ABS_B/ABS_A)) \times M_A$ | 17.4 | | 17.4 | | 17.4 | |
| $(1 + 0.04 \times (ABS_B/ABS_A)) \times M_A$ | 20.6 | | 20.6 | | 20.6 | |
| Relationship between $ABS_A$, $ABS_B$, $M_A$, and $M_B$ | Formula (4) | | Formula (4) | | Formula (4) | |
| Image quality evaluation — Width of thin line portion (mm) | 1.0 | 1.0 | 1.0 | 1.0 | 1.0 | 1.0 |
| Image quality evaluation — Evaluation result | A | | A | | A | |
| Film evaluation — Abrasion resistance | 5 | | 5 | | 3 | |
| Jetting evaluation | 5 | | 4 | | 5 | |
| Color development | 5 | | 5 | | 5 | |

$M_A < M_B$ Formula (2)
$(1 + 0.01 \times (ABS_B/ABS_A)) \times M_A < M_B < (1 + 0.04 \times (ABS_B/ABS_A)) \times M_A$ Formula (3)
$(1 + 0.015 \times (ABS_B/ABS_A)) \times M_A < M_B < (1 + 0.03 \times (ABS_B/ABS_A)) \times M_A$ Formula (4)
In a case where Formula (4) is satisfied, Formula (3) and Formula (2) are also satisfied, and in a case where Formula (3) is satisfied, Formula (2) is also satisfied.
The description Formula (2) in the table shows that only Formula (2) is satisfied.

$$M_A < M_B \quad \text{Formula (2)}$$

$$(1+0.01\times(ABS_B/ABS_A))\times M_A < M_B < (1+0.04\times(ABS_B/ABS_A))\times M_A \quad \text{Formula (3)}$$

$$(1+0.015\times(ABS_B/ABS_A))\times M_A < M_B < (1+0.03\times(ABS_B/ABS_A))\times M_A \quad \text{Formula (4)}$$

In a case where Formula (4) is satisfied, Formula (3) and Formula (2) are also satisfied, and in a case where Formula (3) is satisfied, Formula (2) is also satisfied.
The description Formula (2) in the table shows that only Formula (2) is satisfied.

It is understood based on Tables 4 to 7 that the evaluation results of the color bleeding, granularity, abrasion resistance, jetting properties, and color development are excellent in the examples. Based on the above description, it can be said that the examples are the ink jet recording method in which the color bleeding is suppressed.

<Image Recording with Four Colors and Evaluation>

Each ink composition was jetted on a polyvinyl chloride substrate (AVERY 400 GLOSS WHITE PERMANENT (trade name), manufactured by Avery Dennison) using an ink jet printer equipped with the four ink jet heads connected to a storage tank filled with the ink compositions (A1 liquid, A2 liquid, A3 liquid, and B liquid) of each color of the combination shown in Table 8, the infrared irradiation device (having a peak wavelength at a region of wavelengths of 800 nm to 1400 nm, ADPHOS NIR, manufactured by Adphos, Inc.), and an ultraviolet exposure device (peak wavelength of 254 nm, long-life amalgam lamp, manufactured by Heraeus).

Figure 3:
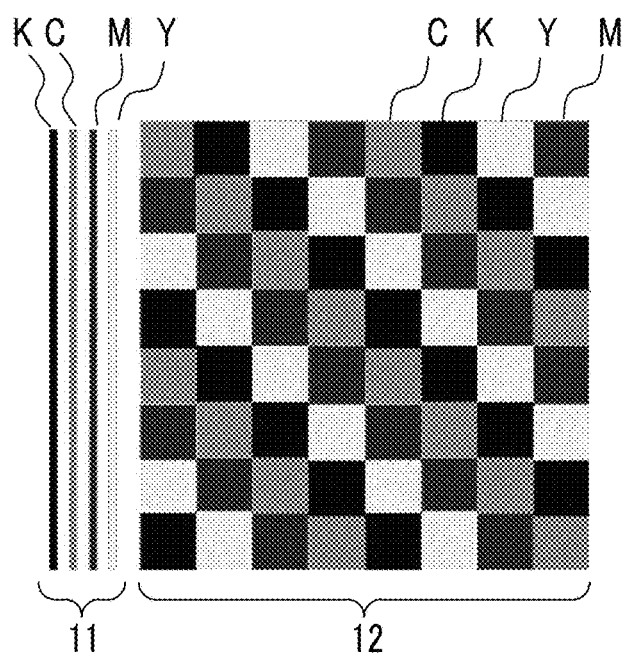
FIG. 3 is a view showing an image of a sample for four color evaluation in the examples.

Jetting conditions were set so that a resolution of the image after recording was 1200 dpi×900 dpi (dot per inch), the jetting was performed from the four heads, and the image shown in FIG. 3 was recorded. The image shown in FIG. 3 has a thin line portion 11 (setting width: 1 mm, length: 10 cm) for color bleeding evaluation and a solid image portion 12 for abrasion resistance evaluation.

0.1 seconds after recording the image, heating was carried out with the infrared irradiation device under conditions at 70° C. for 0.2 seconds on the image recorded portion, and furthermore, light irradiation was performed on the image recorded portion by the ultraviolet exposure device, and therefore samples for evaluation each having an exposure amount of light of 300 mJ/cm² at an irradiated portion.

The above-described evaluations of 1. color bleed, 2. abrasion resistance, 3. jetting properties, and 4. color development were performed on the sample for four color evaluation. The evaluation results are shown in Table 7.

Figure 4:
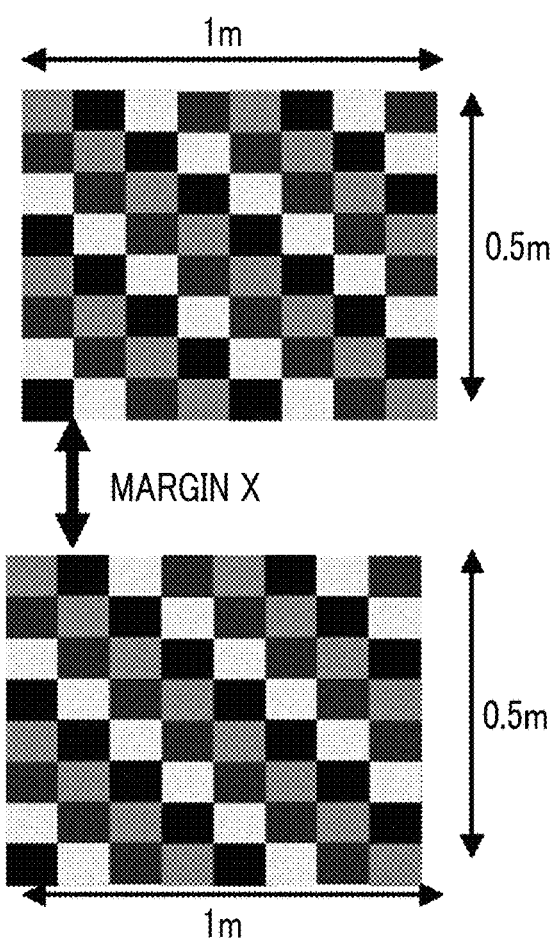
FIG. 4 is a view showing an image for evaluating jetting properties of four colors in the examples.

The "3. jetting properties" was performed by recording the image shown in FIG. 4 on the substrate. The image shown in FIG. 4 is an image in which squares recorded by ink compositions of cyan (C), magenta (M), yellow (Y), and black (K) are arranged in order, and has a margin X. The margin X is as described above.

TABLE 8

|  | Example 21 | | | |
|---|---|---|---|---|
| Ink set | A1 liquid C1 | A2 liquid M1 | A3 liquid Y1 | B liquid K1 |
| $ABS_{A1}$, $ABS_{A2}$, $ABS_{A3}$, or $ABS_B$ (800-1400 nm) | 15.32 | 36.77 | 20.50 | 601.26 |
| $M_A$ or $M_B$ (% concentration) | 8.0 | 8.8 | 8.3 | 13.0 |
| $(1 + 0.01 \times (ABS_B/ABS_A)) \times M_A$ | 11.1 | 10.2 | 10.7 | $M_B$ = |
| $(1 + 0.015 \times (ABS_B/ABS_A)) \times M_A$ | 12.7 | 11.0 | 12.0 | 13.0 |
| $(1 + 0.03 \times (ABS_B/ABS_A)) \times M_A$ | 17.4 | 13.1 | 15.6 | |
| $(1 + 0.04 \times (ABS_B/ABS_A)) \times M_A$ | 20.6 | 14.6 | 18.0 | |
| Relationship between $ABS_A$, $ABS_B$, $M_A$, and $M_B$ | Formula (4) | Formula (4) | Formula (4) | — |
| Image quality evaluation Evaluation result | | | A | |
| Film evaluation Abrasion resistance | | | A | |
| Jetting evaluation | | | A | |
| Color development | | | A | |

$$M_A < M_B \quad \text{Formula (2)}$$

$$(1+0.01\times(ABS_B/ABS_A))\times M_A < M_B < (1+0.04\times(ABS_B/ABS_A))\times M_A \quad \text{Formula (3)}$$

$$(1+0.015\times(ABS_B/ABS_A))\times M_A < M_B < (1+0.03\times(ABS_B/ABS_A))\times M_A \quad \text{Formula (4)}$$

In a case where Formula (4) is satisfied, Formula (3) and Formula (2) are also satisfied, and in a case where Formula (3) is satisfied, Formula (2) is also satisfied.

The description Formula (2) in the table shows that only Formula (2) is satisfied.

It is understood based on Table 8 that the evaluation results of the color bleeding, granularity, abrasion resistance, jetting properties, and color development are excellent. Based on the above description, it can be said that the examples are the ink jet recording method in which the color bleeding is suppressed.

The entire content of JP2016-087064A filed on Apr. 25, 2016 is incorporated into the present specification by reference.

All of the documents, the patent applications, and the technical standards described in the present specification are incorporated into the present specification by reference, as if each of the documents, the patent applications, and the technical standards is specifically and independently described by reference.

What is claimed is:

1. An ink jet recording method, comprising:
   jetting, on a substrate, an ink composition A that contains a microcapsule having a polymerizable compound within the microcapsule, a high boiling solvent, water, and a colorant, and an ink composition B that contains a microcapsule having a polymerizable compound within the microcapsule, a high boiling solvent, water, and carbon black; and
   heating the ink composition A and the ink composition B, which have been jetted on the substrate,
   wherein an absorbance $ABS_A$ of the ink composition A and an absorbance $ABS_B$ of the ink composition B satisfy Formula (1), and a concentration $M_A$ of the high boiling solvent contained in the ink composition A and a concentration $M_B$ of the high boiling solvent in the ink composition B satisfy Formula (2), $$ABS_A < ABS_B \quad \text{Formula (1)}$$

$$M_A < M_B \quad \text{Formula (2)}$$

wherein, in Formula (1), $ABS_A$ and $ABS_B$ respectively represent an average value of the absorbance of the ink composition A and the ink composition B at wavelengths of from 800 nm to 1400 nm,
wherein, in Formula (2), $M_A$ and $M_B$ respectively represent the concentration of the high boiling solvent contained in the ink composition A and the concentration of the high boiling solvent contained in the ink composition B, with respect to a total mass of each ink composition, and
wherein $ABS_A$, $ABS_B$, $M_A$, and $M_B$ satisfy Formula (3):

$$\{1+0.01\times(ABS_B/ABS_A)\}*M_A < M_B < \{1+0.04*(ABS_B/ABS_A)\}*MA \quad \text{Formula (3)}.$$

2. The ink jet recording method according to claim 1, wherein heating the ink composition A and the ink composition B comprises heating by irradiation with infrared rays.

3. The ink jet recording method according to claim 1, wherein $M_A$ is from 5% by mass to 12% by mass with respect to the total mass of the ink composition A, and $M_B$ is from 7% by mass to 15% by mass with respect to the total mass of the ink composition B.

4. The ink jet recording method according to claim 1, wherein heating the ink composition A and the ink composition B comprises heating the ink composition A and the ink composition B under the same conditions.

5. The ink jet recording method according to claim 1, wherein the ink composition A contains 4.0% by mass to 6.0% by mass of a quinacridone-based pigment with respect to the total mass of the ink composition A, as the colorant, and the ink composition B contains 1.5% by mass to 2.5% by mass of the carbon black with respect to the total mass of the ink composition B.

6. The ink jet recording method according to claim 1, wherein the ink composition A contains 1.7% by mass to 3.1% by mass of a copper phthalocyanine-based pigment with respect to the total mass of the ink composition A, as the colorant, and the ink composition B contains 1.5% by mass to 2.5% by mass of the carbon black with respect to the total mass of the ink composition B.

7. The ink jet recording method according to claim 1, wherein the ink composition A contains 3.0% by mass to 4.4% by mass of a monoazo-based pigment with respect to the total mass of the ink composition A, as the colorant, and the ink composition B contains 1.5% by mass to 2.5% by mass of the carbon black with respect to the total mass of the ink composition B.

8. The ink jet recording method according to claim 1, wherein any of the high boiling solvents contained in the ink composition A and the ink composition B is a water-soluble solvent with a boiling point of 180° C. to 280° C.

9. The ink jet recording method according to claim 1, wherein each of the microcapsules contained in the ink composition A and the ink composition B contains a photopolymerization initiator.

10. The ink jet recording method according to claim 1, further comprising:
light irradiating the ink composition A and the ink composition B, which have been heated in the heating.

11. The ink jet recording method according to claim 1, wherein the ink composition A contains an ink composition A1 that contains the microcapsule having the polymerizable compound within the microcapsule, the high boiling solvent, water, and a copper phthalocyanine-based pigment, an ink composition A2 that contains the microcapsule having the polymerizable compound within the microcapsule, the high boiling solvent, water, and a quinacridone-based pigment, and an ink composition A3 that contains the microcapsule having the polymerizable compound within the microcapsule, the high boiling solvent, water, and a monoazo-based pigment,
in the jetting, the ink composition A1, the ink composition A2, the ink composition A3, and the ink composition B are jetted on the substrate,
in the heating, the ink composition A1, the ink composition A2, the ink composition A3, and the ink composition B, which have been jetted on the substrate, are heated, and
an absorbance $ABS_{A1}$ of the ink composition A1, an absorbance $ABS_{A2}$ of the ink composition A2, an absorbance $ABS_{A3}$ of the ink composition A3, and the absorbance $ABS_B$ of the ink composition B satisfy Formula (5), Formula (6), and Formula (7), and a concentration $M_{A1}$ of the high boiling solvent contained in the ink composition A1, a concentration $M_{A2}$ of the high boiling solvent contained in the ink composition A2, a concentration $M_{A3}$ of the high boiling solvent contained in the ink composition A3, and the concentration $M_B$ of the high boiling solvent contained in the ink composition B satisfy Formula (8), Formula (9), and Formula (10):

$$ABS_{A1} < ABS_B \quad \text{Formula (5)}$$

$$ABS_{A2} < ABS_B \quad \text{Formula (6)}$$

$$ABS_{A3} < ABS_B \quad \text{Formula (7)}$$

$$M_{A1} < M_B \quad \text{Formula (8)}$$

$$M_{A2} < M_B \quad \text{Formula (9)}$$

$$M_{A3} < M_B \quad \text{Formula (10)}$$

wherein, in Formula (5), Formula (6), and Formula (7), $ABS_{A1}$, $ABS_{A2}$, $ABS_{A3}$, and $ABS_B$ respectively represent an average value of the absorbance of each of the ink composition A1, the ink composition A2, the ink composition A3, and the ink composition B at wavelengths of 800 nm to 1400 nm, and wherein, in Formula (8), Formula (9), and Formula (10), $M_{A1}$, $M_{A2}$, $M_{A3}$, and $M_B$ respectively represent the concentration of the high boiling solvent contained in the ink composition A1, the ink composition A2, the ink composition A3, and the ink composition B, with respect to a total mass of each ink composition.

12. The ink jet recording method according to claim 1, wherein the absorbance of each ink composition is an absorbance thereof before jetting.

13. The ink jet recording method according to claim 1, wherein the high boiling solvent comprises at least one selected from the group consisting of propylene glycol, triethylene glycol, propylene glycol-1-monobutyl ether, glycerin, 2-pyrrolidone, diethylene glycol, triethylene glycol, dipropylene glycol, 1,2-hexanediol, diethylene glycol monoethyl ether, and diethylene glycol diethyl ether.

14. An ink jet recording, comprising:
jetting, on a substrate, an ink composition A that contains a microcapsule having a polymerizable compound within the microcapsule, a high boiling solvent, water, and a colorant, and an ink composition B that contains a microcapsule having a polymerizable compound within the microcapsule, a high boiling solvent, water, and carbon black; and
heating the ink composition A and the ink composition B, which have been jetted on the substrate,
wherein an absorbance $ABS_A$ of the ink composition A and an absorbance $ABS_B$ of the ink composition B satisfy Formula (1), and a concentration $M_A$ of the high boiling solvent contained in the ink composition A and a concentration $M_B$ of the high boiling solvent in the ink composition B satisfy Formula (2), $$ABS_A < ABS_B \quad \text{Formula (1)}$$

$$M_A < M_B \quad \text{Formula (2)}$$

wherein, in Formula (1), $ABS_A$ and $ABS_B$ respectively represent an average value of the absorbance of the ink composition A and the ink composition B at wavelengths of from 800 nm to 1400 nm,
wherein, in Formula (2), $M_A$ and $M_B$ respectively represent the concentration of the high boiling solvent contained in the ink composition A and the concentration of the high boiling solvent contained in the ink composition B, with respect to a total mass of each ink composition, and
wherein $ABS_A$, $ABS_B$, $M_A$, and $M_B$ satisfy Formula (4):

$$\{1+0.015*(ABS_B/ABS_A)\} \times MA < MB < \{1+0.03*(ABS_B/ABS_A)\}*MA \quad \text{Formula (4).}$$

* * * * *